(12) United States Patent
Infalt et al.

(10) Patent No.: US 12,041,928 B1
(45) Date of Patent: Jul. 23, 2024

(54) PORTABLE TREESTAND AND CLIMBING STICK SYSTEM WITH BEVELED TREE ENGAGING STRUCTURES

(71) Applicant: HBTek, Inc., Lannon, WI (US)

(72) Inventors: Daniel M. Infalt, Helenville, WI (US); Mario Trafficante, Jr., Sussex, WI (US)

(73) Assignee: HBTek, Inc., Lannon, WI (US)

( * ) Notice: Subject to any disclaimer, the term of this patent is extended or adjusted under 35 U.S.C. 154(b) by 1028 days.

(21) Appl. No.: 16/943,830

(22) Filed: Jul. 30, 2020

Related U.S. Application Data

(60) Continuation-in-part of application No. 16/141,579, filed on Sep. 25, 2018, now Pat. No. 10,973,224, which is a division of application No. 15/997,463, filed on Jun. 4, 2018, now Pat. No. 11,779,009.

(60) Provisional application No. 62/622,960, filed on Jan. 28, 2018, provisional application No. 62/548,384, filed on Aug. 21, 2017.

(51) Int. Cl.
*A01M 31/02* (2006.01)
*E06C 1/34* (2006.01)
*E06C 1/38* (2006.01)

(52) U.S. Cl.
CPC ............. *A01M 31/02* (2013.01); *E06C 1/34* (2013.01); *E06C 1/38* (2013.01); *E06C 1/381* (2013.01)

(58) Field of Classification Search
CPC ........ A01M 31/02; A63B 27/00; A63B 27/02; A63B 27/04; E06C 1/34; E06C 1/38; E06C 1/381
See application file for complete search history.

(56) References Cited

U.S. PATENT DOCUMENTS

| | | | | |
|---|---|---|---|---|
| 1,275,392 A | * | 8/1918 | Collins | A01M 31/02 248/217.1 |
| 4,830,143 A | * | 5/1989 | Fisher | A01M 31/02 248/230.8 |
| 5,355,974 A | * | 10/1994 | Miller | A01M 31/02 182/187 |
| 5,518,083 A | * | 5/1996 | Blennert | A01M 31/02 248/282.1 |
| 6,431,315 B1 | * | 8/2002 | Lewis | A63B 27/00 182/136 |

(Continued)

OTHER PUBLICATIONS

U.S. Appl. No. 15/997,463, filed Jun. 4, 2018, by HBTek, Inc.: Office Action dated Dec. 21, 2021.
U.S. Appl. No. 15/997,463, Office Action dated Dec. 21, 2021.

*Primary Examiner* — Colleen M Chavchavadze
(74) *Attorney, Agent, or Firm* — Larry E. Henneman, Jr.; Henneman & Associates, PLC

(57) ABSTRACT

A climbing system includes a treestand and a plurality of climbing sticks. The treestand includes a monolithic platform formed from strengthened material. Each of the climbing sticks includes a frame having a plurality of weight-reduction apertures formed therethrough. Tree engaging structures include ramped surfaces to facilitate smooth downward sliding on a tree. Methods of manufacturing a treestand and climbing sticks are also disclosed. The method of manufacturing a treestand includes providing a solid, strengthened piece of material and removing portions of the material to form openings between structural supports. The method of manufacturing a climbing stick includes providing a frame and forming a plurality of weight-reduction apertures therethrough.

18 Claims, 42 Drawing Sheets

(56) References Cited

U.S. PATENT DOCUMENTS

| | | | | |
|---|---|---|---|---|
| 6,681,892 | B2* | 1/2004 | Husband | E06C 1/34 |
| | | | | 182/187 |
| 8,556,035 | B1* | 10/2013 | Kendall | E06C 1/381 |
| | | | | 182/189 |
| 8,869,938 | B2* | 10/2014 | Bassett | A01M 31/02 |
| | | | | 182/120 |
| 9,151,112 | B2* | 10/2015 | Niemela | E06C 1/10 |
| 9,732,556 | B2* | 8/2017 | Priest | E06C 1/381 |
| 11,533,904 | B2* | 12/2022 | Walter | A45F 3/26 |
| 2003/0221909 | A1 | 12/2003 | Wolford | |
| 2007/0151803 | A1 | 7/2007 | D'Acquisto | |
| 2011/0114416 | A1* | 5/2011 | Mayhew | A01M 31/02 |
| | | | | 182/107 |
| 2012/0125715 | A1* | 5/2012 | Furseth | E06C 7/081 |
| | | | | 72/253.1 |
| 2018/0215304 | A1 | 8/2018 | Jevaney et al. | |
| 2021/0205667 | A1* | 7/2021 | Garis | E06C 1/34 |
| 2021/0244237 | A1 | 8/2021 | Barton | |

* cited by examiner

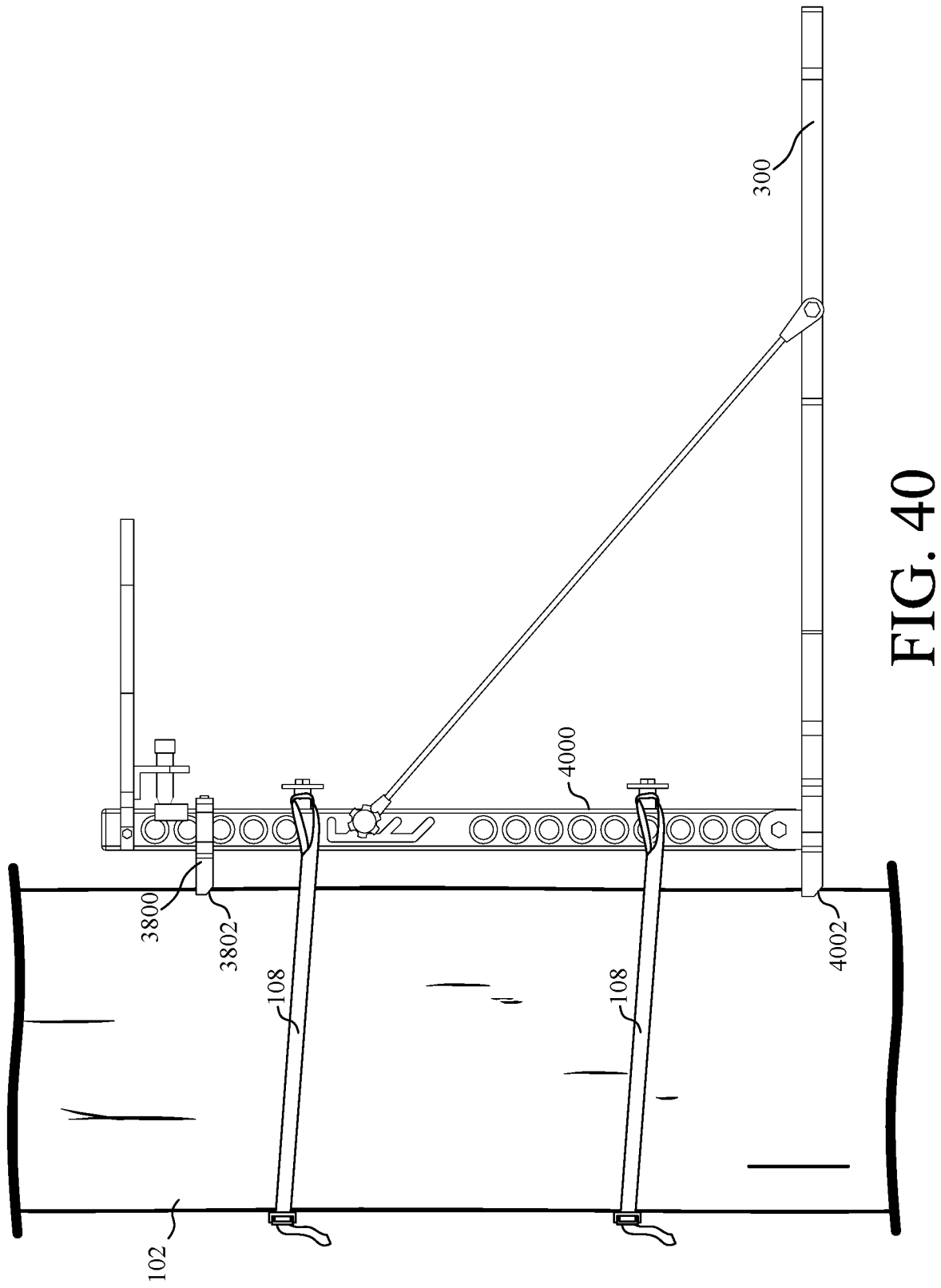

PORTABLE TREESTAND AND CLIMBING STICK SYSTEM WITH BEVELED TREE ENGAGING STRUCTURES

RELATED APPLICATIONS

This application is a continuation-in-part of co-pending U.S. patent application Ser. No. 16/141,579, filed Sep. 25, 2018, by the same inventors which is a divisional of co-pending U.S. patent application Ser. No. 15/997,463 filed Jun. 4, 2018, by the same inventors, which claims the benefit of U.S. Provisional Patent Application No. 62/548,384, filed on Aug. 21, 2017, by the same inventors, and also claims the benefit of U.S. Provisional Patent Application No. 62/622,960, filed on Jan. 28, 2018, by the same inventors, all of which are incorporated herein by reference in their respective entireties.

BACKGROUND OF THE INVENTION

Field of the Invention

This invention relates generally to elevated hunting platforms, and more particularly to portable treestand systems.

Description of the Background Art

Portable treestand systems have become commonplace in big game hunting. Typically, a portable treestand system includes a treestand and a plurality of climbing sticks. The treestand includes a platform, a frame, a seat, and a means for securing the treestand to a tree. The platform provides a flat base for the hunter to stand on while the seat provides a place for the hunter to sit. Typically, the platform and the seat are mounted on the bottom and top ends, respectively, of the frame. The securing means is typically some type of suitable fastener(s) (e.g., ratchet strap, chain, steel cable, rope, etc.) that secures the frame to the tree. Each climbing stick typically includes a set of steps, a set of tree engaging features, a frame, and a means (e.g., ratchet strap, chain, steel cable, rope, etc.) for securing the climbing stick to the tree. The steps are affixed to the frame to provide surfaces to grab and step on when ascending and descending the tree. The tree engaging features are also affixed to the frame to facilitate the mounting of the climbing stick to the tree.

In designing and manufacturing treestand systems, there are several factors that must be taken into consideration. For example, mobile hunters typically carry their treestand systems to their hunting locations, and it is, therefore, desirable to make the system as lightweight and compact as possible. Of course, in making the system as lightweight and compact as possible, it must also maintain a structural integrity sufficient for safe use. As another example, it is essential that the system be extremely quiet both when being mounted to a tree and also during the hunt so as not to alert game of the hunter's presence.

There are several prior art treestand system designs that attempt to minimize weight. For example, treestand platforms are often formed by welding metal mesh onto square stock that has been bent into the shape of the platform. Likewise, the climbing sticks are often formed from lightweight metal tube having steps and tree engaging features welded thereon. Although such an approach can provide for a lightweight treestand system, it also suffers from undesirable noise caused by flexing materials and poor welds. In attempting to address problems associated with flexing materials and poor welds, some manufacturers have developed treestands having cast metal platforms that minimize weld points. Although cast metal platforms minimize weld points, they suffer other drawbacks. For example, cast metals are inherently brittle and, therefore, the platform has to be relatively large to compensate for the undesirable mechanical properties of cast metal. Of course, the added size results in a relatively heavy and bulky treestand. In addition, the failure of brittle materials tend to be catastrophic (e.g., shattering instead of bending), therefore causing significant safety problems.

Another problem with known treestands and climbing sticks is that unexpected downward shifts of position on a tree can cause a climber to experience momentary fright, loss of balance, or even a fall from the tree. Downward shifts of even a few inches can cause such undesirable experiences.

What is needed, therefore, is a treestand system that is lighter, stronger, smaller, more silent, and/or less prone to catastrophic failure than prior treestand systems. What is also needed is a treestand system that is more stable when attached to a tree.

SUMMARY

The present invention overcomes the problems associated with the prior art by providing a portable treestand and climbing stick system that is lighter, safer, and more versatile than prior art systems.

An example method of manufacturing a treestand includes providing a seat, providing one or more tree engaging structures, and providing a monolithic platform. The monolithic platform is formed by removing portions of a solid piece of material to form openings between a top surface of the platform and a bottom surface of the platform and to form structural supports between the openings. The seat, the one or more tree engaging structures, and the monolithic platform are combined to create a treestand.

In a specific example, the method further includes subjecting the solid piece of material to a strengthening process. In a more specific example, the solid piece of material is subjected to the material strengthening process before the step of forming openings between the top surface of the platform and the bottom surface of the platform. In an even more specific example, the solid piece of material includes aluminum.

In another specific example, the step of removing portions of the solid piece of material includes cutting the solid piece of material using a computer numerical control (CNC) system. In a more specific example, the step of removing portions of the solid piece of material includes machining the solid piece of material using a computer numerical control (CNC) system.

In one specific example, the step of removing portions of the solid piece of material includes using an automated system to remove portions of the solid piece of material.

In yet another example, the step of providing one or more tree engaging structures includes removing portions of the solid piece of material to form at least one of the tree engaging structures integral with the platform as a single monolithic structure. In a more specific method, an intermediate portion of the monolithic structure between the platform and the tree engaging structure has a width, and the width of the intermediate portion of the monolithic structure is narrower than a width of the platform. The width of the intermediate portion of the monolithic structure can also be narrower than a width of the integral tree engaging structure. In an even more specific example, the method further includes providing a tubular frame structure and coupling the frame structure to the intermediate portion of the monolithic structure. The tubular frame structure has a length and a cross-sectional dimension. The width of the intermediate portion of the monolithic structure is no more than twice the cross-sectional dimension of the tubular frame structure.

Another example method further includes providing a tubular frame structure including a top end, a bottom end, and a plurality of weight reduction apertures arranged between the top end and the bottom end. The example method further includes coupling the seat to the top region of the frame structure and coupling the platform to the bottom region of the frame structure. In a more specific example, the step of coupling the platform to the bottom region of the frame structure includes providing a hinge bracket, fixably mounting the hinge bracket on the platform, and hingably coupling the frame structure to the hinge bracket.

An even more specific example further includes providing a first tensile support, a first fastener, a second tensile support, and a second fastener. The first tensile support includes a first end and a second end, and the second tensile support includes a first end and a second end. The example also includes forming a first aperture through a first peripheral sidewall of the platform. The first aperture is disposed below a top surface of the structural supports of the platform and above a bottom surface of the structural supports of the platform. The example also includes coupling the first end of the first tensile support to the first aperture with the first fastener and coupling the second end of the first tensile support to the frame structure. The example also includes forming a second aperture through a second peripheral sidewall of the platform. The second aperture is disposed below the top surface of the structural supports of the platform and above the bottom surface of the structural supports of the platform. The example also includes coupling the first end of the second tensile support to the second aperture with the second fastener and coupling the second end of the second tensile support to the frame structure.

In yet another example method, the seat is a monolithic structure formed by removing portions of a solid piece of material to form openings between a top surface of the seat and a bottom surface of the seat, forming structural supports therebetween.

Another more specific example method further includes removing a portion of the solid piece of material to form an integral bow receiving feature in the platform, providing a bow engaging device, and adjustably coupling the bow engaging device to the platform.

In another specific example method, forming the monolithic platform includes forming at least some recesses in the top surface of the platform but leaving portions of the bottom surface of the platform between adjacent structural supports formed by the recesses.

An example treestand is also described. The example treestand includes a seat, a first tree engaging structure, and a platform. The platform is coupled to the first tree engaging structure and is made of a strengthened material defining a web of structural supports that define openings between a top surface of the platform and a bottom surface of the platform.

In a particular embodiment, the strengthened material includes strengthened metal. In a more particular embodiment, the strengthened metal includes aluminum. In an even more particular embodiment, the strengthened metal includes an aluminum alloy with magnesium and silicon. In another particular embodiment, the strengthened metal is an extruded metal.

In an example embodiment, the tree engaging structure and the platform are integral parts of a monolithic structure. In a more particular embodiment, an intermediate portion of the monolithic structure between the platform and the tree engaging structure has a width, and the width of the intermediate portion of the monolithic structure is narrower than a width of the platform. The width of the intermediate portion of the monolithic structure is also narrower than a width of the tree engaging structure.

In a more particular embodiment, the treestand further includes a tubular frame having a length and a cross-sectional dimension. The frame structure is coupled to the intermediate portion of the monolithic structure, and the width of the intermediate portion of the monolithic structure is no more than twice the cross-sectional dimension of the tubular frame.

In another particular embodiment, the treestand further includes a tubular frame having a top end and a bottom end. The seat is hingably coupled to the top end of the frame, and the platform is hingably coupled to the bottom end of the frame. In a more particular example, the treestand further includes a hinge bracket hingably coupled to the frame. The hinge bracket is formed separately from, and fixed to, the platform.

In a more particular example, the treestand further includes a first tensile support, a second tensile support, a first fastener, a second fastener, a first aperture, and a second aperture. The first tensile support includes a first end and a second end. Likewise, the second tensile support includes a first end and a second end. The first aperture is disposed through a first peripheral sidewall of the platform, below a top surface of the structural supports of the platform, and above a bottom surface of the structural supports of the platform. The second aperture is disposed through a second peripheral sidewall of the platform, below the top surface of the structural supports of the platform, and above the bottom surface of the structural supports of the platform. The first end of the first tensile support is coupled to the first aperture by the first fastener, and the second end of the first tensile support is coupled to the frame structure. The first end of the second tensile support is coupled to the second aperture by the second fastener, and the second end of the second tensile support is coupled to the frame structure.

In yet another example embodiment, the seat is a monolithic structure made of a solid piece of strengthened material and includes a web of support structures defining openings between a top surface of the seat and a bottom surface of the seat.

Optionally, the treestand further includes an integral bow receiving feature defined by the platform and a bow engaging device adjustably coupled to the platform.

In yet another particular embodiment, the platform includes at least some recesses formed in the top surface of the platform but leaving portions of the bottom surface of the platform between adjacent structural supports formed by the recesses.

Example climbing sticks are also disclosed. An example climbing stick includes a frame tube, a first step, a second step, a first tree engaging structure, and a second tree engaging structure. The frame tube extends along an axis and includes a first end and a second end. The first step is mounted to the first end of the frame tube, and the second step is mounted to the second end of the frame tube. The first tree engaging structure is fixed to the first end of the frame tube, and the second tree engaging structure is fixed to the second end of the frame tube. The frame tube includes a plurality of weight reduction apertures formed therethrough.

In an example embodiment, the frame tube includes a front wall, a first side wall, a rear wall, and a second side wall. The first side wall is disposed between the front wall and the rear wall. The second side wall is also disposed between the front wall and the rear wall, on an opposite side of the front and rear walls. The plurality of weight reduction apertures include a first plurality of apertures formed in the front wall of the frame tube. The plurality of weight reduction apertures additionally includes a second plurality of apertures formed in the first side wall of the frame tube. Apertures of the first plurality of apertures formed in the front wall of the frame tube are vertically offset with respect to adjacent apertures of the second plurality of apertures formed in the first side wall of the frame tube. In a more particular embodiment, the plurality of weight reduction apertures includes a third plurality of apertures passing through the rear wall of the frame tube. Apertures of the first plurality of apertures are vertically aligned with corresponding apertures of the third plurality of apertures. The plurality of weight reduction apertures includes a fourth plurality of apertures passing through the second side wall of the frame tube. Apertures of the second plurality of apertures are vertically aligned with corresponding apertures of the fourth plurality of apertures.

In an even more particular embodiment, the climbing stick is configured to stack on a second climbing stick in a substantially horizontally aligned position, when the frame tube of the climbing stick and the frame tube of the second climbing stick are oriented horizontally. An example climbing stick is configured to engage a second climbing stick in an aligned position, with corresponding features of the climbing stick and the second climbing stick substantially aligned along an axis perpendicular to the axis of the frame tube of the climbing stick and to a corresponding axis of a frame tube of the second climbing stick. In a more particular example, the first tree engaging structure includes a frame engaging feature configured to engage the frame tube of the second climbing stick. The first step includes a restraining feature facilitating the engagement of the frame tube by a tree engaging structure of a third climbing stick and limiting relative motion between the climbing stick and the third climbing stick. The second tree engaging structure includes a frame engaging feature configured to engage the frame tube of the second climbing stick. The second step includes a restraining feature facilitating the engagement of the frame tube by a second tree engaging structure of the third climbing stick and limiting relative motion between the climbing stick and the third climbing stick.

In yet another particular example, a portion of each of the first and second steps is configured to receive a respective tree engaging structure of another climbing stick. In a more particular example, the portions of the steps each includes a restraining feature configured to prevent the tree engaging structures of the other climbing stick from sliding along the frame tube.

In one particular embodiment, at least one of said tree engaging structures includes a first tooth and a second tooth. The first tooth and the second tooth are adapted to bite into a tree, and the first tooth and the second tooth are configured together to receive a frame tube of the other climbing stick therebetween.

Optionally, at least one of the tree engaging structures defines a channel configured to seat the frame tube. The channel prevents rotation of the tree engaging structure(s) relative to the frame tube, when the tree engaging structure(s) is/are fixed to the frame tube.

A method of manufacturing a climbing stick is also disclosed. The method includes providing a frame tube, a first step structure, a second step structure, a first tree engaging structure, and a second tree engaging structure. The frame tube includes a first end, a second end, and a plurality of weight reduction apertures between the first end and the second end. The method further includes mounting the first step structure to the first end of the frame tube, mounting the second step structure to the second end of the frame tube, mounting the first tree engaging structure to the first end of the frame tube, and mounting the second tree engaging structure to the second end of the frame tube.

In a particular embodiment, the frame tube includes a front wall, a first side wall, a rear wall, and a second side wall. The first side wall is disposed between the front wall and the rear wall. The second side wall is disposed between the front wall and the rear wall, opposite the first side wall. The plurality of weight reduction apertures include a first plurality of apertures formed in the front wall of the frame tube. The plurality of weight reduction apertures additionally includes a second plurality of apertures formed in the first side wall of the frame tube. Apertures of the first plurality of apertures formed in the front wall of the frame tube are vertically offset with respect to adjacent apertures of the second plurality of apertures formed in the first side wall of the frame tube. In a more particular example, the plurality of weight reduction apertures includes a third plurality of apertures passing through the rear wall of the frame tube. Apertures of the first plurality of apertures are vertically aligned with corresponding apertures of the third plurality of apertures. In addition, the plurality of weight reduction apertures includes a fourth plurality of apertures passing through the second side wall of the frame tube, and apertures of the second plurality of apertures are vertically aligned with corresponding apertures of the fourth plurality of apertures.

An example method further includes configuring the climbing stick to stack on a second climbing stick in a substantially horizontally aligned position, when the frame tube of the climbing stick and the frame tube of the second climbing stick are oriented horizontally. A more particular example method includes configuring the climbing stick to engage a second climbing stick in an aligned position, with corresponding features of the climbing stick and the second climbing stick substantially aligned along an axis perpendicular to the axis of the frame tube of the climbing stick and a corresponding axis of a frame tube of the second climbing stick. In an even more particular example method, the first tree engaging structure includes a frame engaging feature configured to engage the frame tube of the second climbing stick. In addition, the first step includes a restraining feature facilitating the engagement of the frame tube by a tree engaging structure of a third climbing stick and limiting relative motion between the climbing stick and the third climbing stick. The second tree engaging structure includes a frame engaging feature configured to engage the frame tube of the second climbing stick. The second step includes a restraining feature facilitating the engagement of the frame tube by a second tree engaging structure of the third climbing stick and limiting relative motion between the climbing stick and the third climbing stick.

In yet another particular method, a portion of each of the first step and the second step is configured to receive a respective tree engaging structure of another climbing stick. In a more particular example embodiment, the portions of the steps each include a restraining feature configured to prevent the tree engaging structures of another climbing stick from sliding along the frame tube.

In another particular method, the tree engaging structure includes a first tooth and a second tooth. The first tooth and the second tooth are adapted to bite into a tree. In addition, the first tooth and the second tooth are configured together to receive a frame tube of another climbing stick therebetween.

In another example method, the first tree engaging structure and the second tree engaging structure each defines a channel configured to seat the frame tube. The frame tube is seated in the channel, and the channel prevents rotation of the tree engaging structure relative to the frame tube, when the tree engaging structure is fixed to the frame tube.

Example tree engaging structures that reduce erratic and unpredictable movement of tree mounted structures are also disclosed. One example tree mountable structure includes a frame, a first step, a first tree engaging structure, and a fastener. The first step is coupled to the frame and is configured to support a user standing thereon. The first tree engaging structure is coupled to the frame and includes a facing surface. The facing surface has a top edge, a bottom edge, and a ramped surface extending between the top edge and the bottom edge. The fastener is configured to attach to the frame and to draw the facing surface against a tree. The top edge of the facing surface is disposed closer to a center of the tree than the bottom edge of the facing surface when the fastener draws the facing surface against the tree. The ramped surface facilitates the sliding of the first tree engaging structure down the tree, and the top edge of the facing surface of the first tree engaging structure resists the sliding of the first tree engaging structure up the tree. One particular example tree mountable structure is a climbing stick. The example climbing stick additionally includes a second tree engaging structure. The first tree engaging structure is attached to a first end of the frame, and the second tree engaging structure is attached to an opposite second end of the frame. The second tree engaging structure includes a facing surface that has a top edge, a bottom edge, and a ramped surface extending between the top edge and the bottom edge of the second tree engaging structure. The fastener is configured to also draw the facing surface of the second tree engaging structure against the tree. The top edge of the facing surface of the second tree engaging structure is also disposed closer to the center of the tree than the bottom edge of the facing surface of the second tree engaging structure when the fastener draws the facing surface of the second tree engaging structure against the tree. The ramped surface of the second tree engaging structure facilitates the sliding of the second tree engaging structure down the tree, and the top edge of the facing surface of the second tree engaging structure resists the sliding of the second tree engaging structure up the tree. Optionally, the example climbing stick additionally includes a second step coupled to the frame and being configured to support the user standing thereon, the first step being coupled to the first end of the frame, and the second step being coupled to the second end of the frame.

Another example tree mountable structure is a treestand. In an example treestand, the step is a platform configured to support a user standing thereon. Optionally, the first tree engaging structure is an integral part of the platform.

An example treestand additionally includes a second tree engaging structure. The first tree engaging structure is attached at a first end of the frame, and the second tree engaging structure is attached at an opposite second end of the frame. The second tree engaging structure also includes a facing surface that has a top edge, a bottom edge, and a ramped surface extending between the top edge and the bottom edge of the second tree engaging structure. The fastener is configured to also draw the facing surface of the second tree engaging structure against the tree. The top edge of the facing surface of the second tree engaging structure is disposed closer to the center of the tree than the bottom edge of the facing surface of the second tree engaging structure when the fastener draws the facing surface of the second tree engaging structure against the tree. The ramped surface of the second tree engaging structure facilitates the sliding of the second tree engaging structure down the tree, and the top edge of the facing surface of the second tree engaging structure resists the sliding of the second tree engaging structure up the tree. Optionally, the first tree engaging structure and/or the second tree engaging structures are each monolithic structures. The first and/or second tree engaging structures can define a first channel configured to seat the frame. The channel prevents rotation of the tree engaging structures relative to the frame.

In some example tree mountable structures, the ramped surface of the tree engaging structure is planar. In other example devices, the ramped surfaces are curved/rounded surfaces.

In example tree engaging structures, the facing surface defines a plurality of teeth configured to penetrate the tree when the facing surface is urged against the tree. A first one of the teeth includes an apex extending vertically. A first portion of the facing surface and a second portion of the facing surface converge to form the apex of the first tooth. a second one of the teeth also includes an apex extending vertically. The first portion of the facing surface and a third portion of the facing surface converge to form the apex of the second tooth. The ramped surface extends between a lower end of the apex of the first tooth and the bottom edge of the tree engaging structure, and a second ramped surface extends between a lower end of the apex of the second tooth and the bottom edge of the tree engaging structure. Optionally, the first portion of the facing surface includes a concave surface extending between the apex of the first tooth and the apex of the second tooth.

An example tree engaging structure includes a plurality of teeth, each of the teeth including an apex, a first side face, and a second side face. The apex of each tooth extends upwardly from a bottom point to a top point. The first side face converges toward the apex, and the first side face and the ramped surface share a first common edge. The first side face is bounded at least in-part by the top edge of the facing surface, the bottom edge of the facing surface, and the first common edge. The second side face also converges toward the apex, and the second side face and the ramped surface also share a second common edge. The second side face is bounded at least in-part by the top edge of the facing surface, the bottom edge of the facing surface, and the second common edge. The ramped surfaces face in a downward direction when the climbing stick is mounted to the tree, and the first common edge and the second common edge converge upwardly toward the bottom point of the apex.

In example tree engaging structures, the first side face shares a third edge with a first portion of the top edge of the facing surface. The second side face also shares a fourth edge with a second portion of the top edge of the facing surface. The third edge and the fourth edge converge toward the top point of the apex. Optionally, the first side face includes a concave surface, and the second side face includes a concave surface.

An example treestand includes a frame, a standing platform, a first tree engaging structure, a second tree engaging structure, and a fastener. The standing platform is coupled to the frame and is configured to support a user standing thereon. The first tree engaging structure is also coupled to the frame and includes a facing surface. The facing surface has a top edge, a bottom edge, and a ramped surface extending between the top edge and the bottom edge. The second tree engaging structure is formed integrally with the platform and also includes a facing surface. The facing surface of the second tree engaging structure also has a top edge, a bottom edge, and a ramped surface extending between the top edge and the bottom edge. The fastener is configured to attach to the frame and to draw the facing surfaces of the first tree engaging structure and the second tree engaging structure against a tree. The top edges of the facing surfaces of the first and second tree engaging structures are disposed closer to a center of the tree than the bottom edges of the facing surfaces of the first and second tree engaging structures when the fastener draws the facing surface against the tree. The ramped surfaces of the first and second tree engaging structures facilitate the sliding of the first and second tree engaging structures down the tree.

An example climbing stick includes a frame, a step, a first tree engaging structure, a second tree engaging structure, and a fastener. The step is coupled to the frame and is configured to support a user standing thereon. The first tree engaging structure can be fixed at a first end the frame and includes a facing surface. The facing surface of the first tree engaging structure has a top edge, a bottom edge, and a ramped surface extending between the top edge and the bottom edge. The second tree engaging structure can be fixed at a second end the frame and includes a facing surface. The facing surface of the second tree engaging structure has a top edge, a bottom edge, and a ramped surface extending between the top edge and the bottom edge. The fastener is configured to attach to the frame and to draw the facing surfaces of the first and second tree engaging structures against the tree. The top edges of the facing surfaces of the first and second tree engaging structures are disposed closer to a center of the tree than the bottom edges of the facing surfaces of the first and second tree engaging structures when the fastener draws the facing surface against the tree. The ramped surfaces of the facing surfaces of the first and second tree engaging structures facilitate the sliding of the first tree engaging structure down the tree.

BRIEF DESCRIPTION OF THE DRAWINGS

The present invention is described with reference to the following drawings, wherein like reference numbers denote substantially similar elements:

FIG. 40 is a side plan view of an alternate treestand mounted to a tree;

DETAILED DESCRIPTION

The present invention overcomes the problems associated with the prior art, by providing a more portable treestand and climbing stick system. In the following description, numerous specific details are set forth (e.g., material types, fastener types, etc.) in order to provide a thorough understanding of the invention. Those skilled in the art will recognize, however, that the invention may be practiced apart from these specific details. In other instances, details of well-known manufacturing practices (e.g., extruding, welding, etc.) and components have been omitted, so as not to unnecessarily obscure the present invention.

Figure 1:
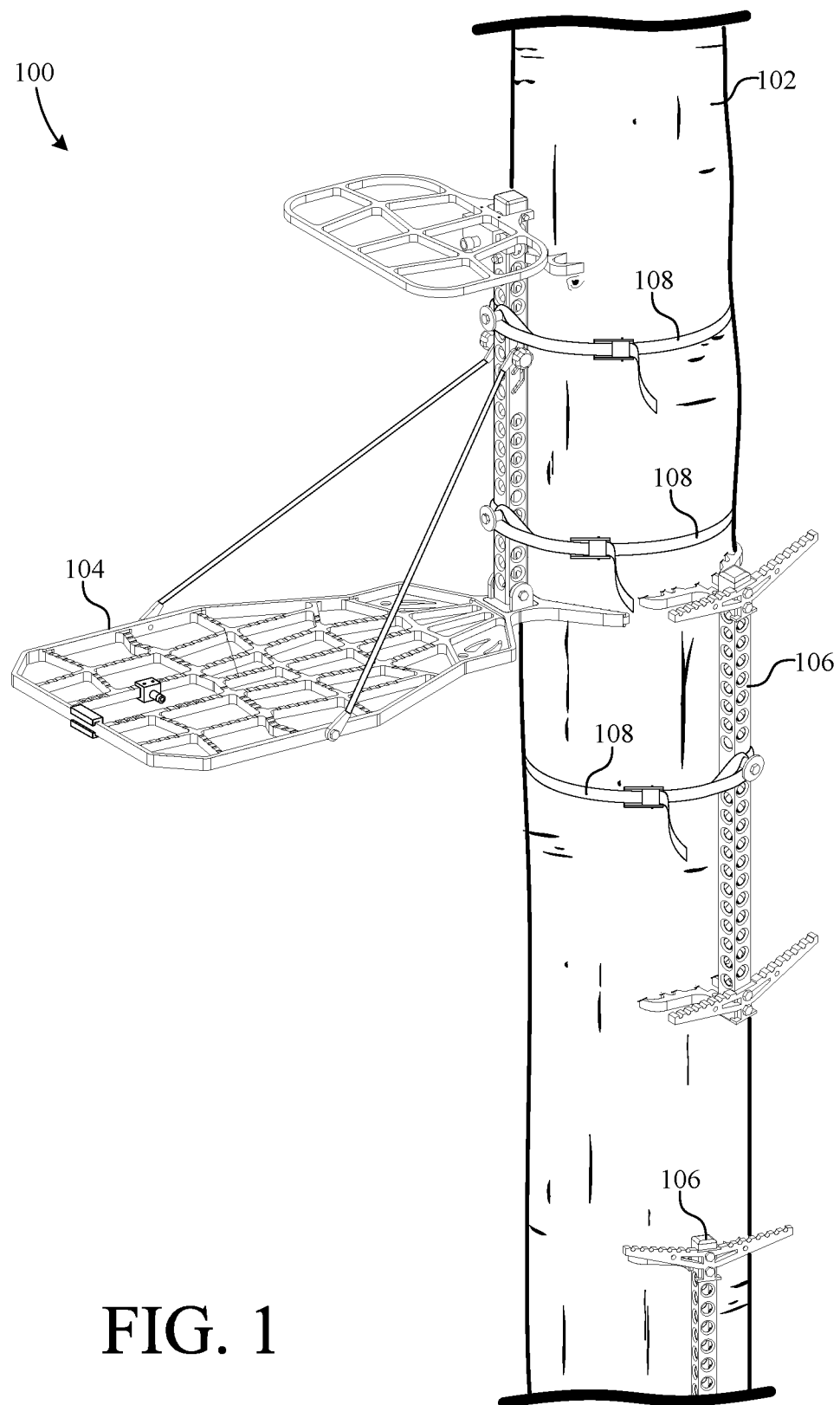
FIG. 1 is a perspective view of a portable treestand and climbing stick system mounted on a tree.

FIG. 1 shows a perspective view of a portable treestand and climbing stick system 100 mounted on a tree 102. System 100 includes a treestand 104, a plurality of climbing sticks 106, and a plurality of cam straps 108. Treestand 104 is configured to be mounted up in a tree to provide a user with a secure structure to stand and sit on. Treestand 104 is shown deployed and fastened to tree 102 with two of straps 108. Climbing sticks 106 are configured to be removably mounted to tree 102 so that a user can climb into, and out of, treestand 104. Each of climbing sticks 106 is secured to tree 102 with a respective one of straps 108. Straps 108 are, for example, lightweight nylon cam straps having an adjustable length to accommodate for trees having varying trunk diameters. Each end of strap 108 includes a closed loop adapted to easily engage and disengage small posts structures of treestand 104 and/or climbing sticks 106.

Figure 2:
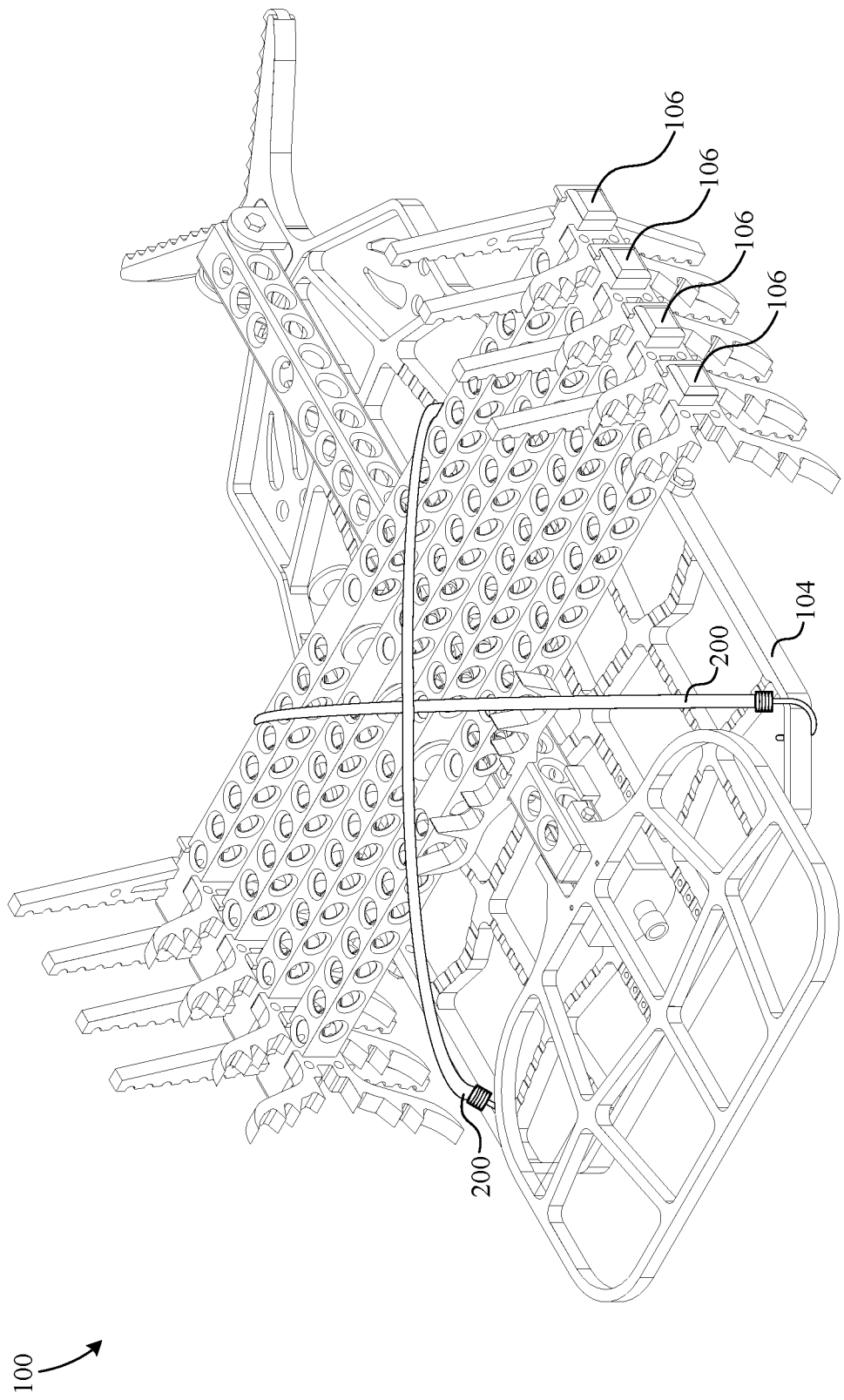
FIG. 2 is a perspective view of the system of FIG. 1 in a stowed position.

FIG. 2 shows a perspective view of system 100 in a stowed position, with treestand 104 in a collapsed position and four of sticks 106 stacked and secured to treestand 104 with a set of bungee cords 200. Alternatively, bungee cords 200 can be omitted and sticks 106 can be secured to treestand 104 using straps 108. Although not shown, backpack straps can be fastened to the bottom of treestand 104, so that system 100 can be carried on the back of a user.

Figure 3:
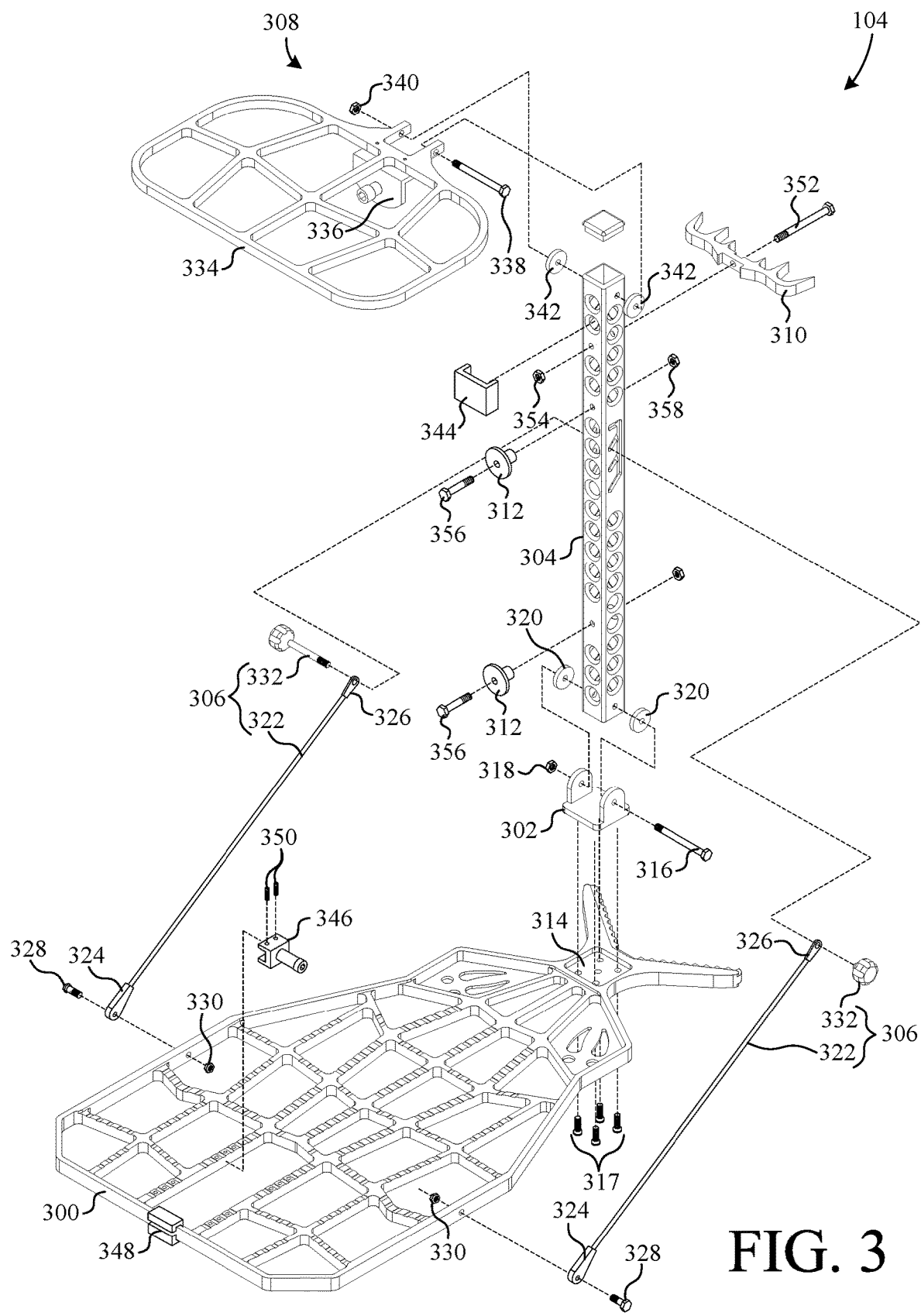
FIG. 3 is an exploded perspective view of the treestand of FIG. 1.

FIG. 3 shows an exploded perspective view of treestand 104 according to one embodiment of the present invention. Treestand 104 includes a platform 300, a hinge bracket 302, a frame 304, a cable assembly 306, a seat assembly 308, a tree engaging structure 310, and a set of posts 312.

Platform 300 provides a relatively planar surface upon which a user can stand when treestand 104 is deployed and secured to a tree.

Bracket 302 facilitates the pivoting of platform 300 with respect to frame 304. Bracket 302 is seated and fixed in a recess 314 of platform 300. In the example embodiment, bracket 302 is fixed directly to platform 300 with a set of screws 317.

Frame 304 provides structural support to treestand 104 and is hingably connected to bracket 302 with a bolt 316 and a nut 318. A set of oil-infused nylon washers 320 are disposed between bracket 302 and frame 304, to eliminate metal-on-metal contact therebetween. By eliminating metal-on-metal contact, noise is minimized when platform 300 is pivoted with respect to frame 304.

Cable assembly 306 provides tensile support to platform 300 when treestand 104 is deployed. Cable assembly 306 includes a set of steel cables 322, each having a first end 324 and a second end 326. Each of first ends 324 is fastened to platform 300 with a respective bolt 328 and a nut 330. Second ends 326 are adjustable secured to frame 304 with an adjustable shaft assembly 332, which facilitates the leveling of platform 300 with respect to frame 304.

Seat assembly 308 includes a seat 334 and a leveling system 336. Seat 334 is hingably connected to frame 304 with a bolt 338 and a nut 340. A second set of oil-infused nylon washers 342 are disposed between seat 334 and frame 304, to eliminate metal-on-metal contact therebetween. Leveling system 336 facilitates the leveling of seat 334 with respect to frame 304. A polymer pad 344 is attached to frame 304 and is adapted to abut leveling system 336.

In the example embodiment, treestand 104 further includes a bow engaging device 346 and polymer pad 348 for securing a bow (i.e., an archery bow) to platform 300. Bow engaging device 346 is adjustably secured to platform 300 with two set screws 350. Polymer pad 348 provides a soft surface that abuts the limb of the bow.

Tree engaging structure 310 is mounted to the rear side of frame 304, to facilitate the mounting of treestand 104 to a tree. Tree engaging structure 310 is configured to bite into the tree, to prevent treestand 104 from slipping against the tree. Furthermore, tree engaging structure 310 is adapted engage trees of varying sizes and also helps to secure frame 304 in a vertical position when treestand 104 is mounted to a section of a tree that is not exactly vertical. Tree engaging structure 310 is mounted directly to frame 304 with a bolt 352 and a complementary nut 354.

Posts 312 provide a structure onto which end loops of straps 108 are positioned when securing treestand 104 to a tree. Each of posts 312 is attached to frame 304 with a respective bolt 356 and complementary nut 358. In this example, each of posts 312 is machined from black DELRIN™ polymer.

Figure 4A:
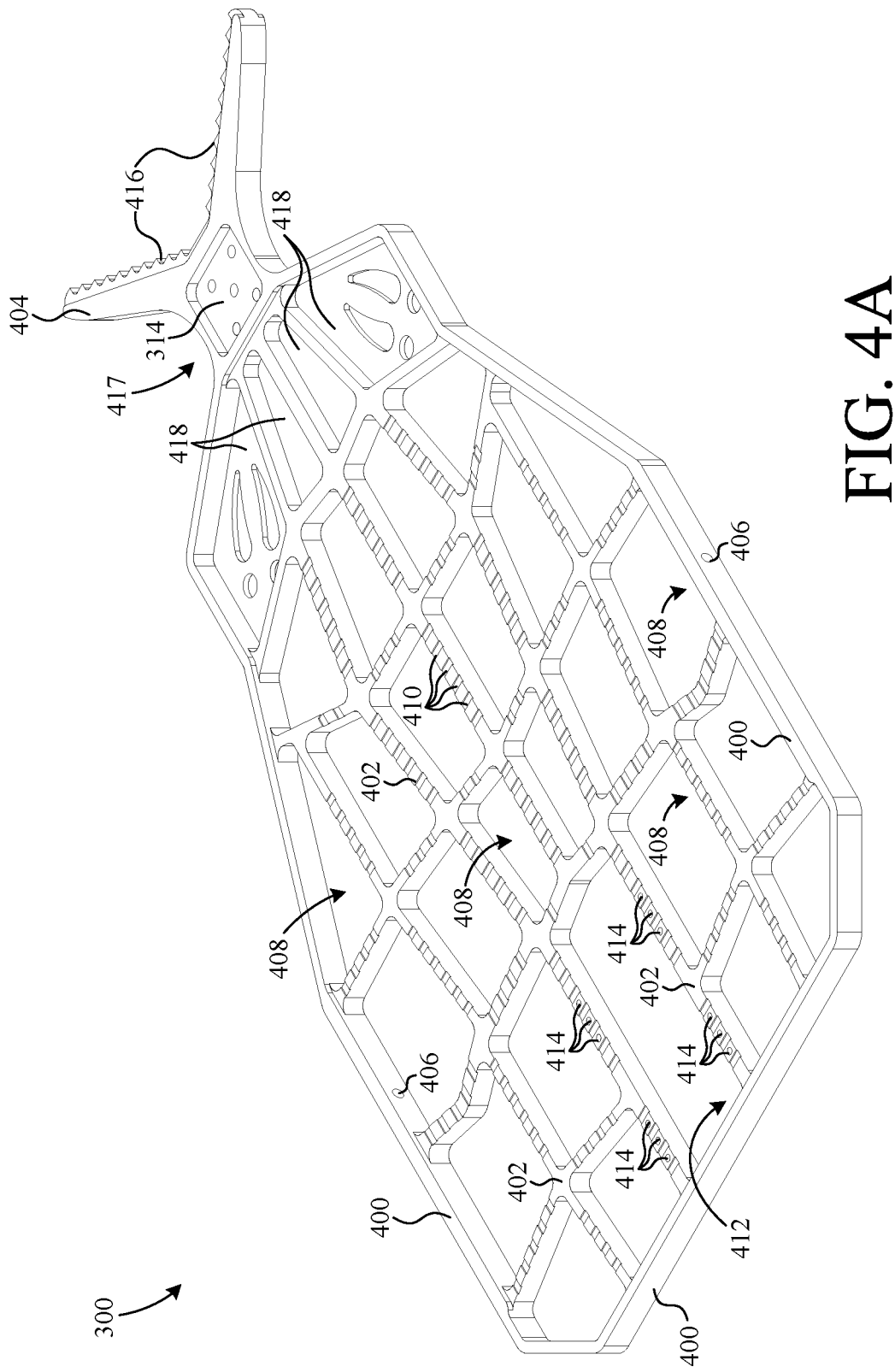
FIG. 4A is a top perspective view of the platform of the treestand of FIG. 1.

FIG. 4A is a perspective view of platform 300, which is a monolithic structure. In the example embodiment, platform 300 is computer numeric control (CNC) machined from a single solid plate of 6061 aluminum alloy. Before platform 300 is cut from the solid plate, the plate is subjected to pre strengthening and/or toughening processes including, but not limited to, metal working processes (e.g., cold working/rolling, hot working/rolling, extrusion, forging, etc.) and/or temperature treatment processes (e.g., tempering, annealing, quenching, case hardening, precipitation strengthening, normalizing, etc.). Because the plate is subjected to one or more of such processes, platform 300 has several advantages over prior art cast platforms. For example, platform 300 is lighter than cast platforms because the plate from which platform 300 is cut is pre-strengthened/toughened, thus requiring less material to support the same load. Another reason for this is that platform 300 is more ductile than a cast platform and, therefore, not as susceptible to sudden, catastrophic fracture. Because treestands support people at relatively high elevations, sudden fracture of a brittle platform is highly undesirable. To avoid such catastrophic failures, cast platforms have to be over-engineered. Platform 300, however, is more ductile and tough and, therefore, much more likely to deform (e.g., bend) before failing (e.g., shattering). This allows platform 300 to have a much more relaxed safety factor. Indeed, platform 300 is lighter, stronger, and safer than larger platforms that are cast from similar metals and designed to support the same load.

Platform 300 includes a plurality of peripheral sidewalls 400, a plurality of structural supports 402, and a tree engaging feature 404.

In the example embodiment, the height of peripheral sidewalls 400 is the same as the thickness of the plate from which platform 300 is cut from. The left and right portions of sidewalls 400 each define a respective aperture 406 passing completely therethrough. Each of apertures 406 is adapted to receive a respective one of bolts 328 to facilitate the fastening of cables 322 to platform 300. Because apertures pass through sidewalls 400, no upward projections are required to connect cables 322 to platform 300, thereby reducing the required thickness of the metal plate from which platform 300 is cut.

Structural supports 402 define a plurality openings 408 therebetween. Openings 408 pass completely through platform 300 such that structural supports 402 are arranged in a web configuration. The web configuration is intentionally irregular shaped so that platform 300 blends in with irregular shaped surrounding structures such as branches, limbs, etc. This provides a camouflage effect and prevents game from noticing the presence of treestand 104. As shown, the height of supports 402 is slightly less than the thickness of the plate from which platform 300 is formed. Each of supports 402 includes a plurality of channels 410, machined therein, to provide additional traction and prevent the foot of a user from slipping on platform 300. Structural supports 402 also define an integral bow receiving feature 412, which receives the bottom limb and cam of a compound bow. The structural supports 402 defining bow receiving feature 412 include a plurality of threaded apertures 414 passing therethrough. Apertures 414 are threaded to receive set screws 350 of bow engaging device 346. The number of apertures 414 allow bow engaging device 346 to be adjustably positioned at any two of apertures 414 to compensate for different sized bows. Furthermore, apertures 414 are positioned on both sides of bow receiving feature 412 thus allowing bow engaging device 346 to be set up for either left or right handed bows/hunters.

Tree engaging feature 404 is an integral part of platform 300 and facilitates the mounting of treestand 104 to a tree. Feature 404 is angled to accommodate for varying width trees and defines a plurality of teeth 416 configured to grip/bite into the side of a tree when treestand 104 is fastened thereto.

Recess 314 is formed in an intermediate portion 417 of platform 300, disposed between tree engaging feature 404 and the web of support structures 402. Because platform 300 is machined from a single piece of pre-strengthened/toughened metal, the width of intermediate portion can be significantly narrowed, resulting in substantial weight reduction. Indeed, in this example embodiment, intermediate portion 417 is only slightly (e.g., 10%) wider than recess 314 and significantly less than twice the cross-sectional dimension of tubular frame 304.

In the example embodiment, platform 300 further includes a plurality of recesses 418 that do not pass completely through platform 300. Retaining a thin portion of the bottom surface of platform 300 within the recesses 418 provides significant weight reduction while still maintaining a high structural strength immediately adjacent intermediate portion 417.

Figure 4B:
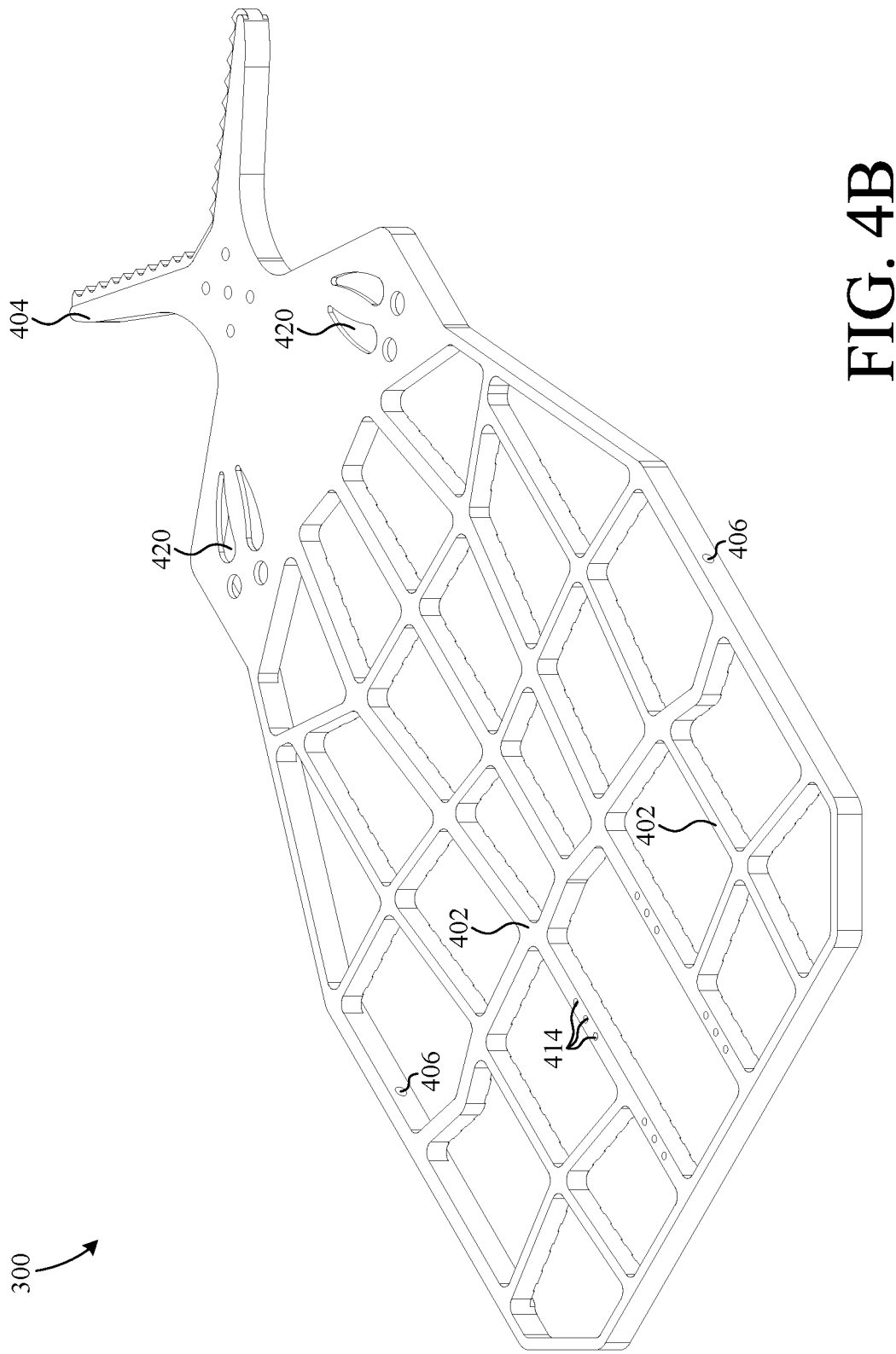
FIG. 4B is a bottom perspective view of the platform of the treestand of FIG. 1.

FIG. 4B shows a rear perspective view of platform 300. As shown, two of the four recesses 418 (shown in FIG. 4A) include hoof-shaped openings 420 passing completely therethrough. The hoof-shaped openings resemble deer tracks and are considered to be aesthetically pleasing to hunters.

Figure 5:
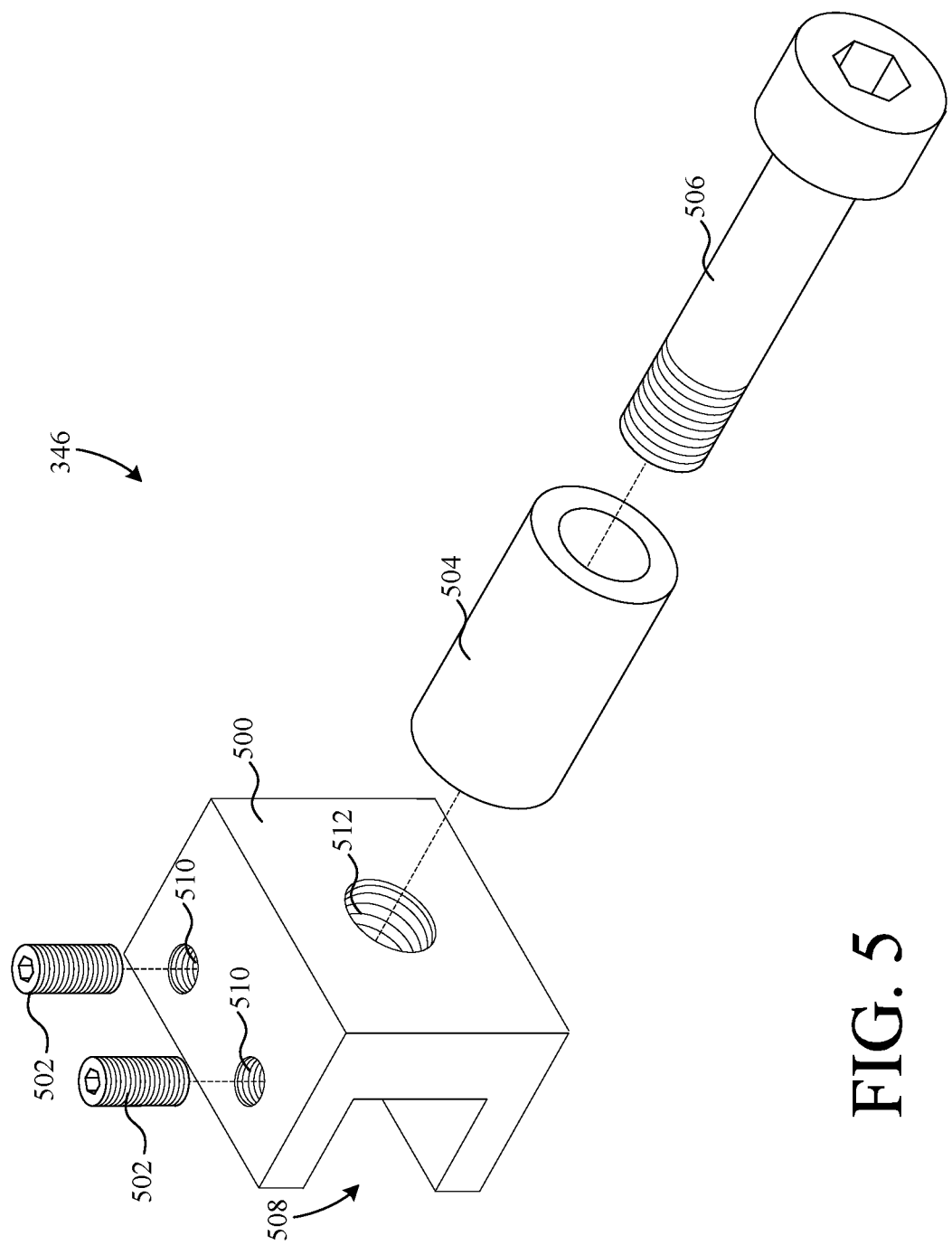
FIG. 5 is an exploded perspective view of a bow engaging device of the treestand of FIG. 1.

FIG. 5 shows an exploded perspective view of bow engaging device 346, which includes a body 500, a pair of set screws 502, a polymer tube 504, and a hex screw 506. Body 500 is a generally c-shaped metal structure defining a channel 508, a set of threaded apertures 510, and another threaded aperture 512. Channel 508 is configured to receive a structural support 402 of platform 300. Threaded apertures 510 receive set screws 350. During the mounting of body 500 to one of structural supports 402, apertures 510 are coaxially aligned with a selected pair of apertures 414. Once aligned, each of screws 502 is threaded into both a respective aperture 510 and a respective aperture 414, thereby fastening body 500 to platform 300. Accordingly, apertures 414 and 510 have the same thread specifications. Threaded aperture 512 receives screw 506. Before screw 506 is threaded into aperture 512, tube 504 is disposed around the shaft of screw 506. Tube 504 provides a relatively soft surface that effectively engages a bow without damaging it and/or causing noise.

Figure 6:
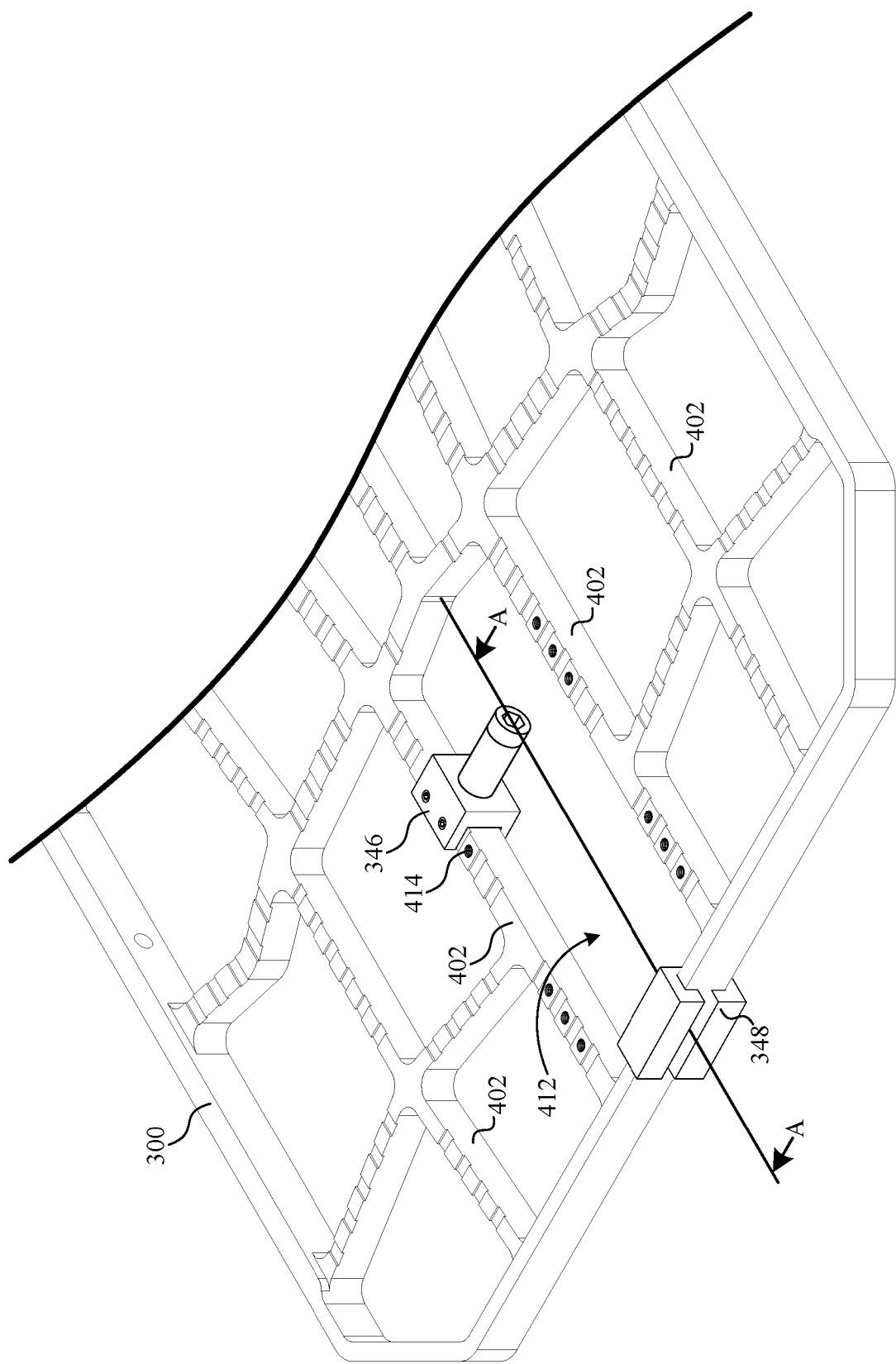
FIG. 6 is a close-up perspective view of the bow engaging device of FIG. 5.

FIG. 6 shows a close-up perspective view of bow engaging device 346 and polymer pad 348 attached to platform 300.

Figure 7:
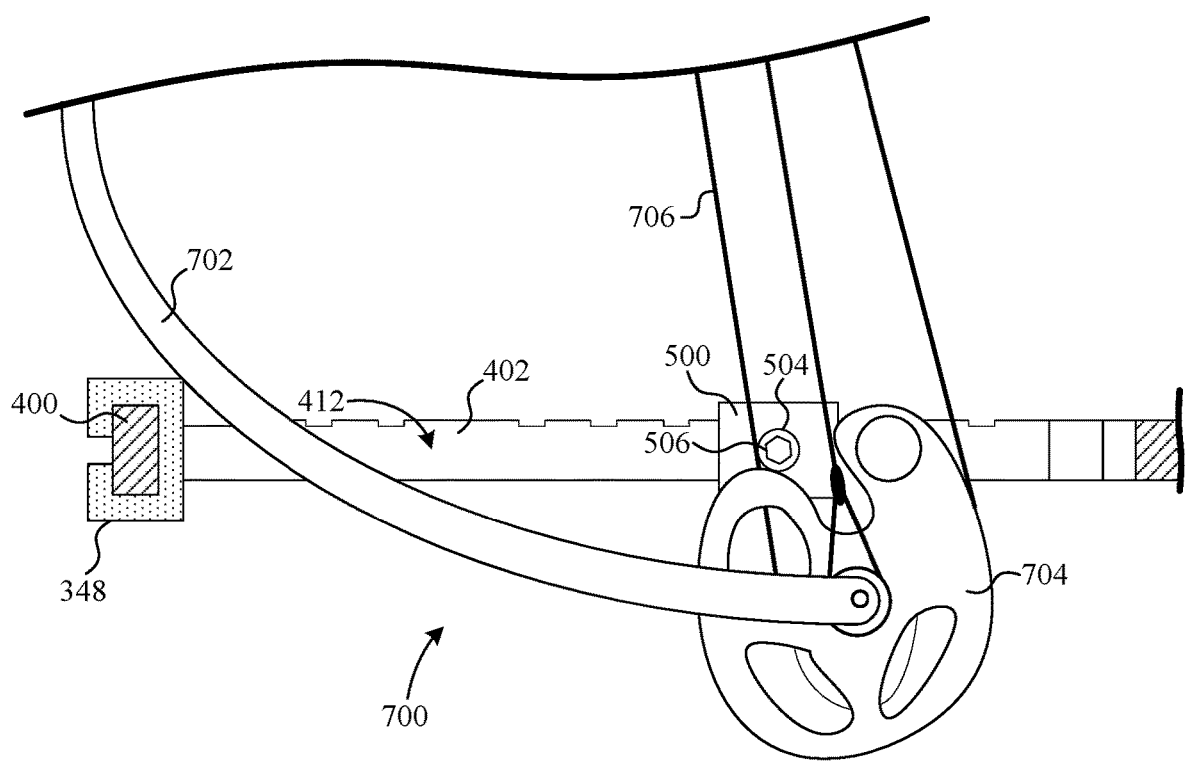
FIG. 7 is a cross-sectional view of a portion of the platform of the treestand of FIG. 1 with a bow resting therein.

FIG. 7 is a cross-sectional view of platform 300 taken along line A-A of FIG. 6 wherein a bow 700 is shown seated in bow receiving feature 412. As shown, pad 348 abuts the bottom limb 702 of bow 700 while tube 504 abuts a cam 704 and a string 706 of bow 700. The center of mass of bow 700 is in front of pad 348 and, therefore, bow 700 has a tendency to lean forward (to the left in FIG. 7). Bow 700 is prevented from tipping forward by the downward force exerted on cam 704 by tube 504.

FIGS. 8A-8D show plan views of the front wall 800, right side wall 802, rear wall 804, and left side wall 806, respectively, of frame 304. In the example embodiment, frame 304 is formed from a section of extruded aluminum square tube.

Figure 8:
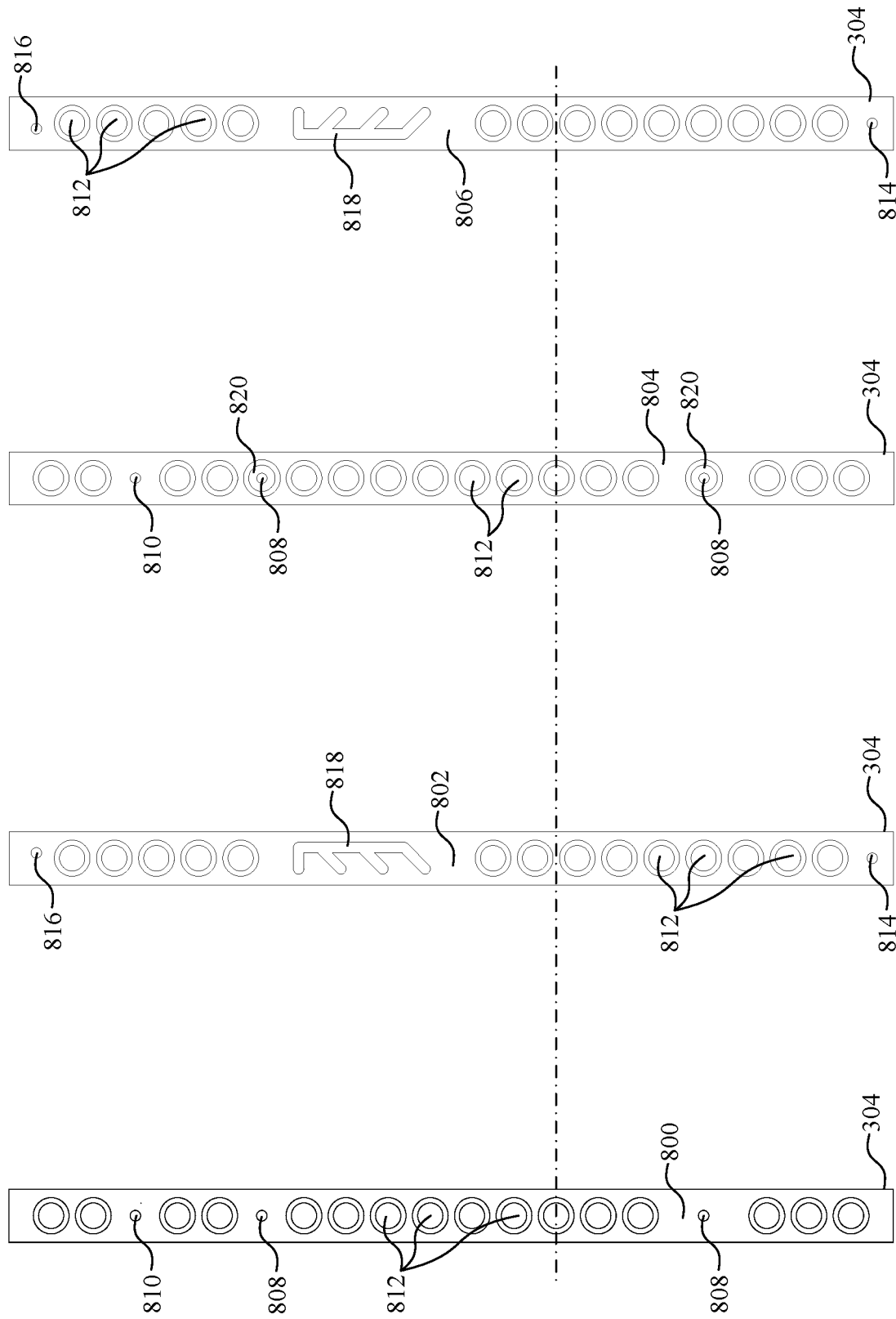
FIG. 8A is a plan view of a front wall of the frame of the treestand of FIG. 1.
FIG. 8B is a plan view of a right side wall of the frame of the treestand of FIG. 1.
FIG. 8C is a plan view of a rear wall of the frame of the treestand of FIG. 1.
FIG. 8D is a plan view of a left side wall of the frame of the treestand of FIG. 1.

Front wall 800 of frame 304, shown in FIG. 8A, includes a first set of apertures 808, a second aperture 810, and a plurality of weight reduction apertures 812, all passing completely therethrough. Apertures 808 provide passages through which bolts 356 are disposed to mount posts 312 to frame 304. Aperture 810 provides a passage through which bolt 352 is disposed to mount tree engaging structure 310 to frame 304. Apertures 812 reduce the overall weight of frame 304 while also making it more difficult for animals to see frame 304, when treestand 104 is mounted in a tree. In this example, each of apertures 812 includes a 45 degree chamfer, which further reduces the weight of frame 304.

The right side wall 802 of frame 304, shown in FIG. 8B, includes a first aperture 814, a second aperture 816, a slotted cutout 818, and additional weight reduction apertures 812, all passing completely therethrough. Aperture 814 provides a passage through which bolt 316 is disposed to hingably mount frame 304 to bracket 302. Aperture 816 provides a passage through which bolt 338 is disposed to hingably mount seat 334 to frame 304. Cutout 818 provides multiple downward angled channels that allow a user to optionally change the vertical position of adjustable shaft assembly 332, which connects cables 322 to frame 304 (FIG. 3). The vertical position of adjustable shaft assembly 332, therefore, dictates the angle of platform 300 with respect to frame 304. For example, if treestand 104 is mounted in a rear leaning tree, platform 300 can be leveled by moving adjustable shaft assembly 332 to a lower one of the downward angled channels, thereby increasing the angle between platform 300 and frame 304.

Rear wall 804 is similar to front wall 800. The only difference being that rear wall 804 includes apertures 820, which are coaxially aligned with apertures 808, respectively, but are much larger. The larger diameter of apertures 820 allow a tool (e.g. socket) to pass through rear wall 804 during the fastening of nuts 358 onto bolts 356 (FIG. 3). As shown, aperture 810 passes through both front wall 800 and rear wall 804.

Left side wall 806 is a mirror reflection of right side wall 802. As shown, aperture 814, aperture 816, slotted cutout 818, and weight reduction apertures 812 pass completely through both right side wall 802 and left sidewall 806.

One advantageous aspect of this example embodiment is that weight reduction apertures 812 are offset between adjacent walls. For example, the vertical center points of apertures 812 formed through front wall 800 and rear wall 804 are located halfway between the vertical center points of apertures 812 formed through right side wall 802 and left side wall 806. This offset allows the maximum number of weight reduction apertures 812 to be formed in frame 304, while sacrificing only minimal structural strength.

Figure 9:
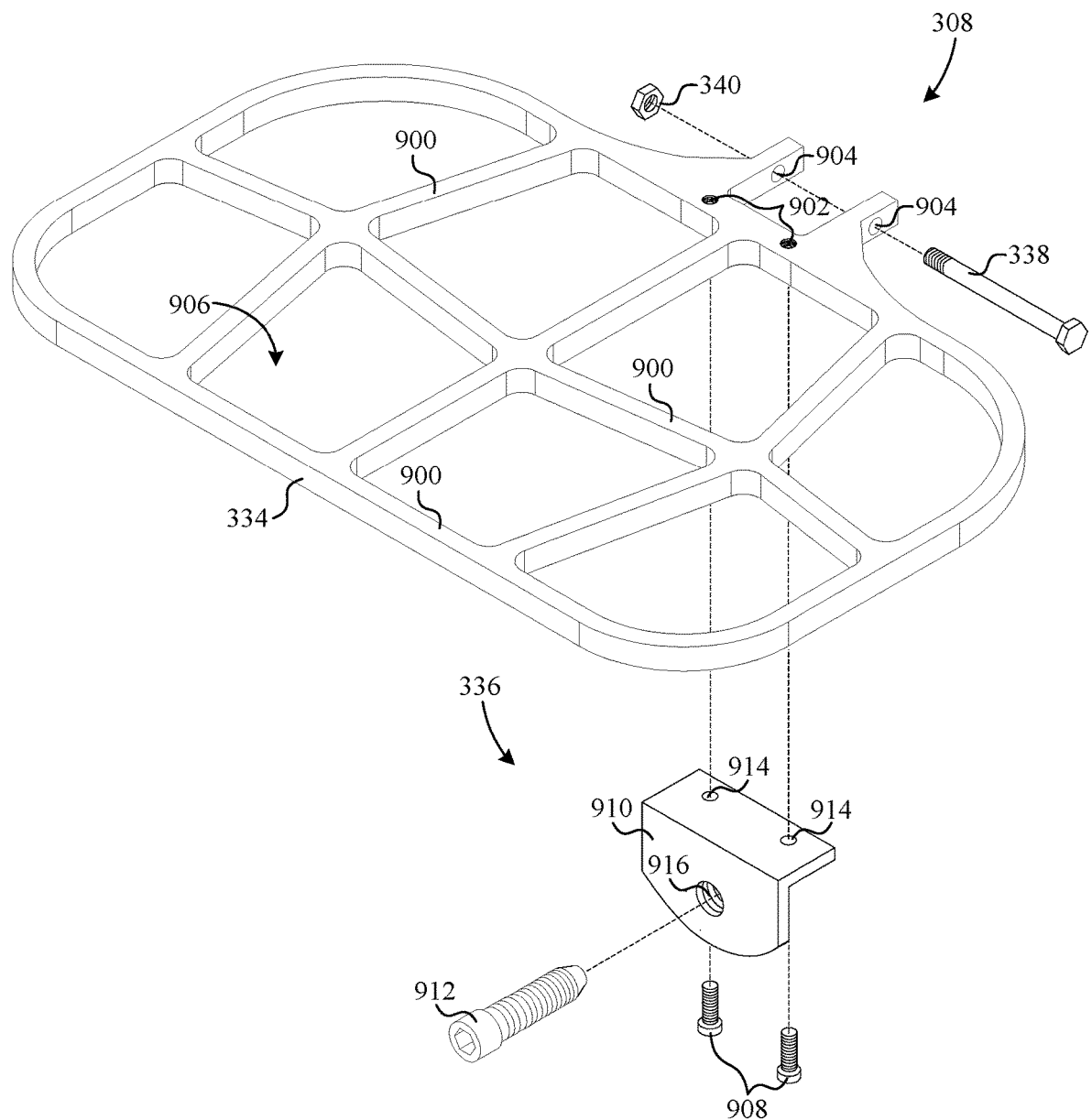
FIG. 9 is an exploded perspective view of a seat assembly of the treestand of FIG. 1.

FIG. 9 shows an exploded perspective view of seat assembly 308. In the example embodiment, seat 334 is a monolithic structure formed from a single solid plate of 6061 aluminum alloy. Before seat 334 is cut from the solid plate, the plate is subjected to a strengthening process. This allows seat to be stronger and lighter than prior art seats. As a result, seat 334 can be made thinner and lighter than prior art seats.

Seat 334 includes a plurality of structural supports 900, a set of threaded apertures 902, and a set of smooth apertures 904. Structural supports 900 are similar to structural supports 402 of platform 300 in that they define a plurality openings 906 therebetween. Openings 906 pass completely through seat 334, so that structural supports 900 are arranged in a web configuration. This allows seat 334 to be as light as possible while still having sufficient structural strength to support a user seated thereon, when treestand 104 is mounted in a tree. Threaded apertures 902 are adapted to receive a set of screws 908 which fasten leveling system 336 to the rear surface of seat 334. Smooth apertures 904 are adapted to receive the smooth exterior shaft of bolt 338 so as to hingably couple seat 334 to frame 304. Accordingly, apertures 904 coaxially align with aperture 816 of frame 304.

Leveling system 336 provides a means for changing the angle between seat 334 and frame 304, to accommodate for non-vertical trees and/or user preference. Leveling system 336 includes a bracket 910 and a screw 912. Bracket 910 includes a set of apertures 914 and a threaded aperture 916. Apertures 914 are adapted to receive screws 908 and facilitate the mounting of bracket 910 to seat 334. Aperture 916 is adapted to receive screw 912 such that threading screw 912 into aperture 916 causes the angle between seat 334 and frame 304 to increase. Oppositely, loosening screw 912 causes the angle between seat 334 and frame 304 to decrease. The tip of screw 912 urges against polymer pad 344 when a user sits in seat 334.

Figure 10:
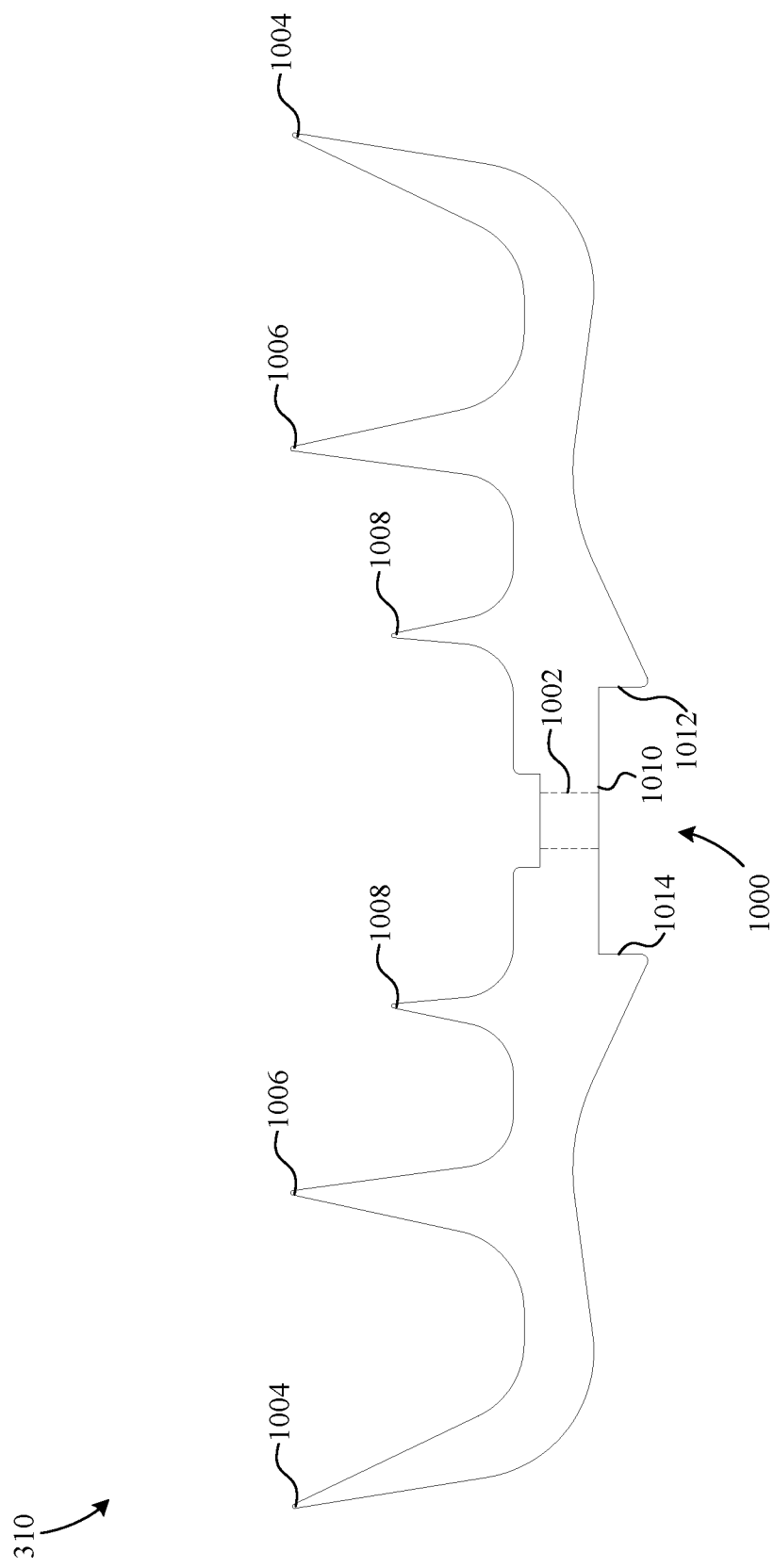
FIG. 10 is a top view of a tree engaging structure of the treestand of FIG. 1.

FIG. 10 shows a top view of tree engaging structure 310 removed from frame 304. Tree engaging structure 310 is an aluminum structure formed, for example, by first extruding the antler-shaped profile along an axis into a beam format and then cutting the beam perpendicular to the axis. Accordingly, a single beam yields multiple tree engaging structures 310.

Tree engaging structure 310 includes a channel 1000, an aperture 1002, a set of outside teeth 1004, a set of middle teeth 1006, and a set of inside teeth 1008. Channel 1000 is adapted to seat frame 304, to prevent tree engaging structure 310 from rotating about bolt 352 (FIG. 3). Channel 1000 is defined by a first surface 1010, a second surface 1012, and a third surface 1014. When tree engaging structure 310 is mounted to frame 304, first surface 1010 engages rear wall 804 of frame 304, second surface 1012 engages right sidewall 802 of frame 304, and third surface 1014 engages left sidewall 806 of frame 304. Aperture 1002 is adapted to receive bolt 352 and coaxially aligns with aperture 810 of frame 304. Teeth 1004, 1006, and 1008 are configured to bite into the bark of a tree. In the example embodiment, the points of teeth 1004 and 1006 are coplanar while the points of teeth 1008 are slightly set back closer to channel 1000. During the mounting of treestand 104 to a tree, only two of the six teeth 1004, 1006, and 1008 need to bite into the tree. The number and configuration of teeth 1004, 1006, and 1008 is such that tree engaging structure 310 can engage various size and shaped trees. This is beneficial in that tree engaging structure 310 can engage angled trees while still securing frame 304 in a vertical upright position. Optionally, teeth 1004 can be made sharper than teeth 1006, so that teeth 1004 can penetrate deeper into a tree than teeth 1006, to accommodate the round contour of a non-vertical tree, while maintaining treestand 104 in a substantially level position.

Figure 11:
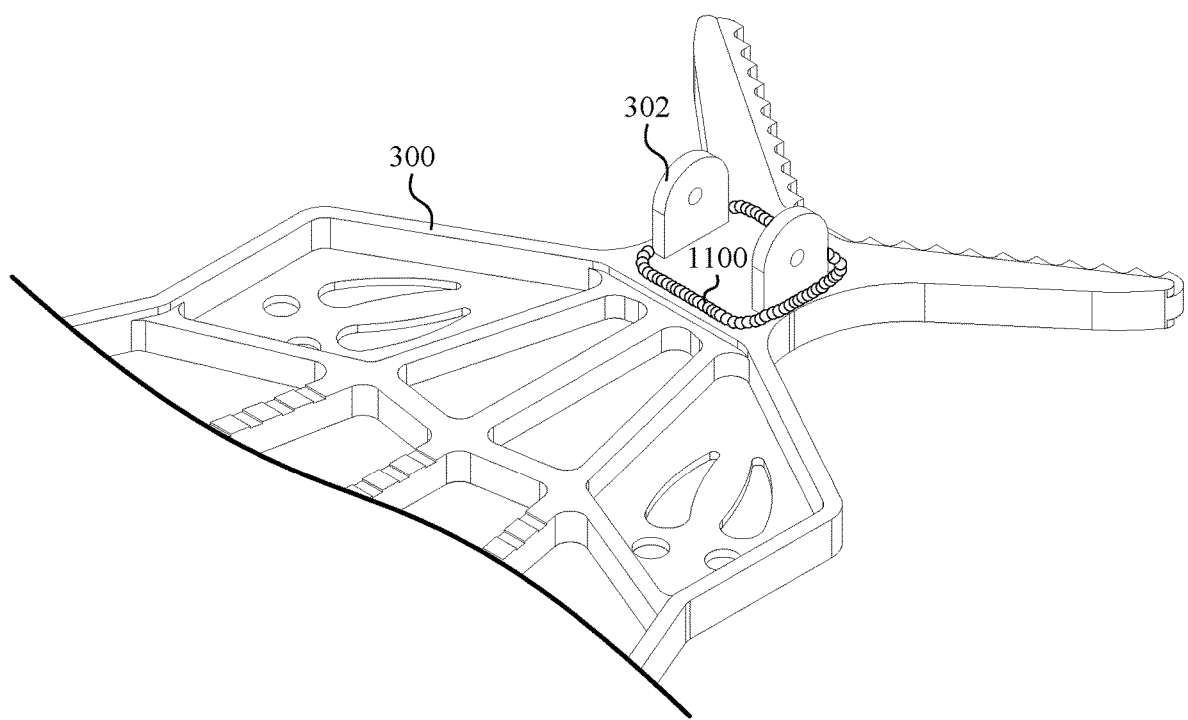
FIG. 11 a perspective view of a hinge bracket fixed to the platform of the treestand of FIG. 1 according to an alternate embodiment.

FIG. 11 shows a perspective view of hinge bracket 302 fixed to platform 300 according to another embodiment of the present invention. In this particular embodiment, bracket 302 is fixed to platform 300 via a weld joint 1100 rather than by screws 317.

Figure 12A:
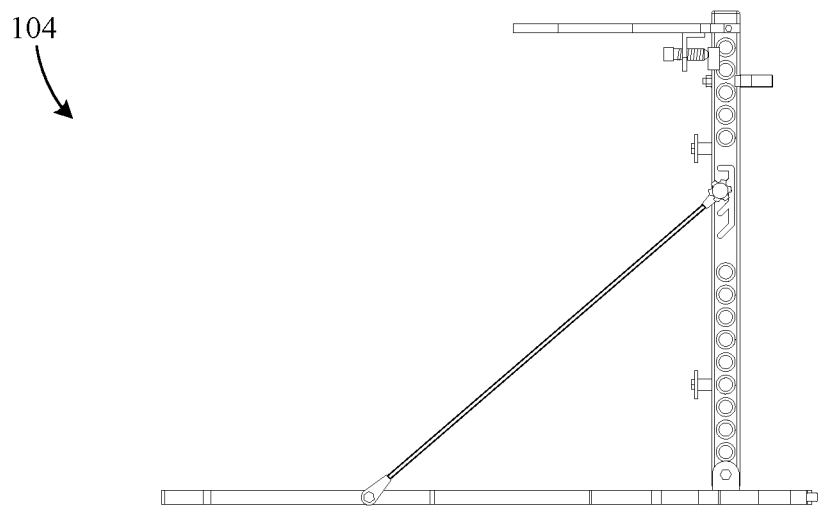
FIG. 12A is a side view of the treestand of FIG. 1 in a deployed position.
Figure 12B:
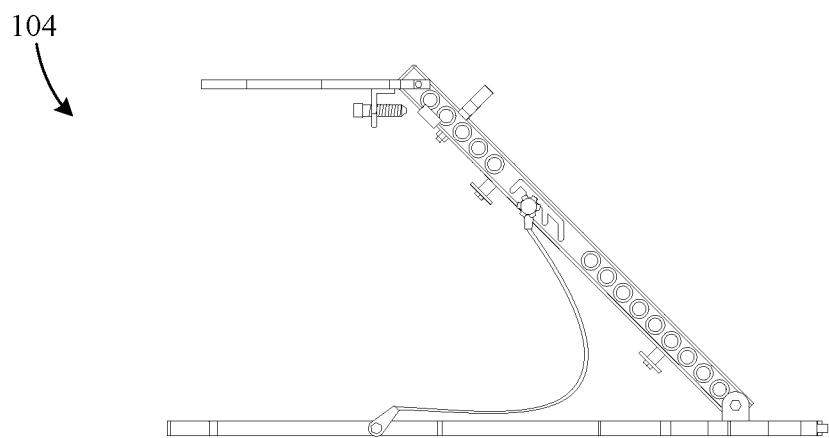
FIG. 12B is a side view of the treestand of FIG. 1 transitioning from the deployed position to a collapsed position.
Figure 12C:
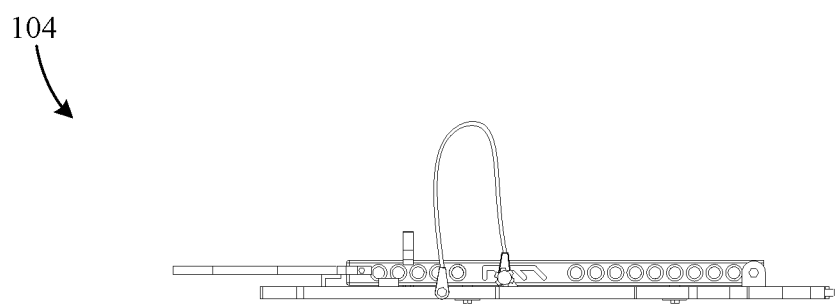
FIG. 12C is a side view of the treestand of FIG. 1 in the collapsed position.

FIGS. 12A-12C show side views of treestand 104 as it is transitioned from a deployed position to a collapsed position. More specifically, FIG. 12A shows a side view of treestand 104 in a deployed position, FIG. 12B shows a side view of treestand 104 transitioning from a deployed position to a collapsed position, and FIG. 12C shows a side view of treestand 104 in a collapsed position.

Figure 13:
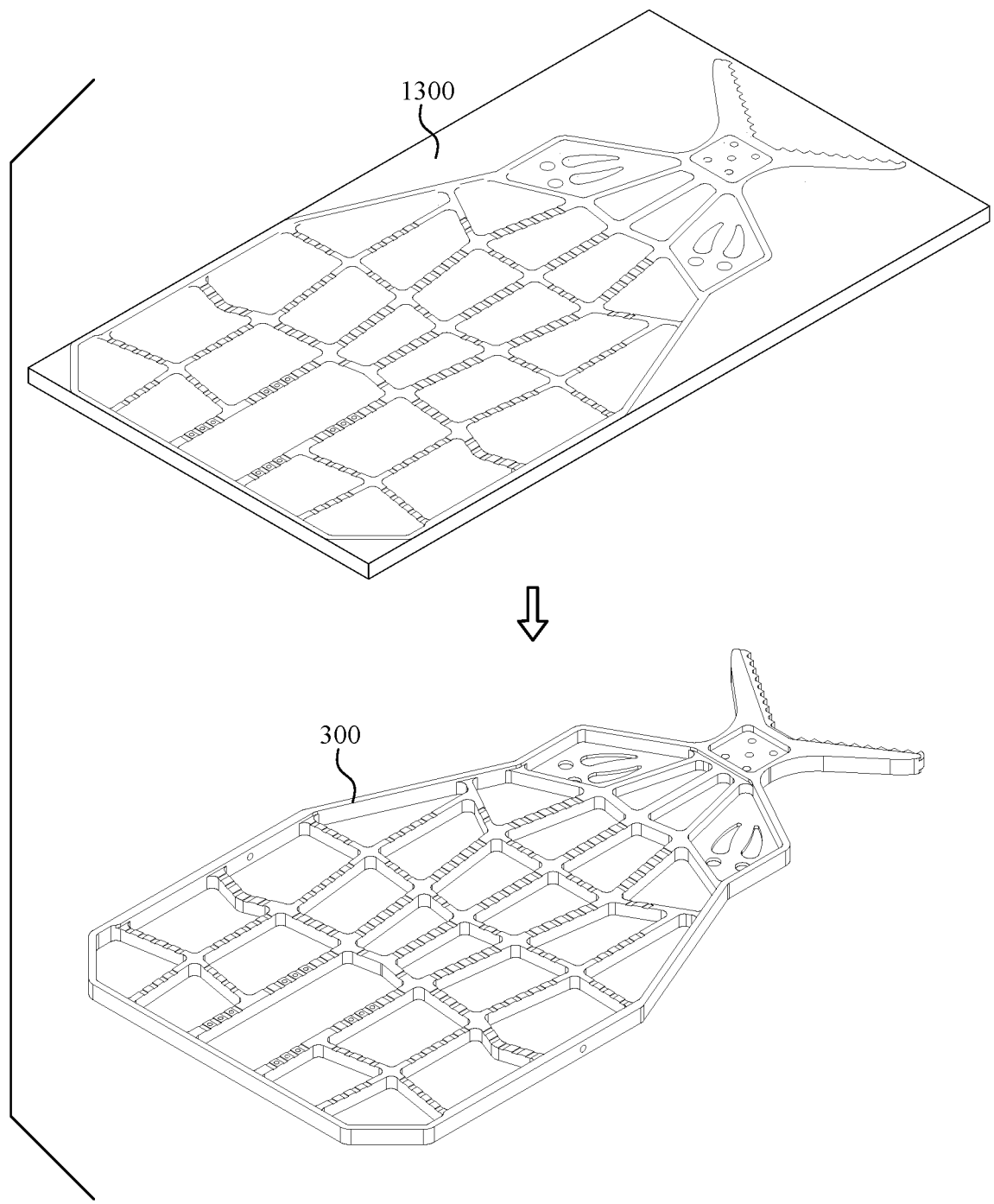
FIG. 13 illustrates the forming of the platform of FIG. 4A from a solid plate.

FIG. 13 illustrates forming of platform 300 from a solid plate 1300 of 6160 aluminum alloy. In this example, plate 1300 is strengthened/toughened before it is CNC machined into the shape of platform 300.

Figure 14:
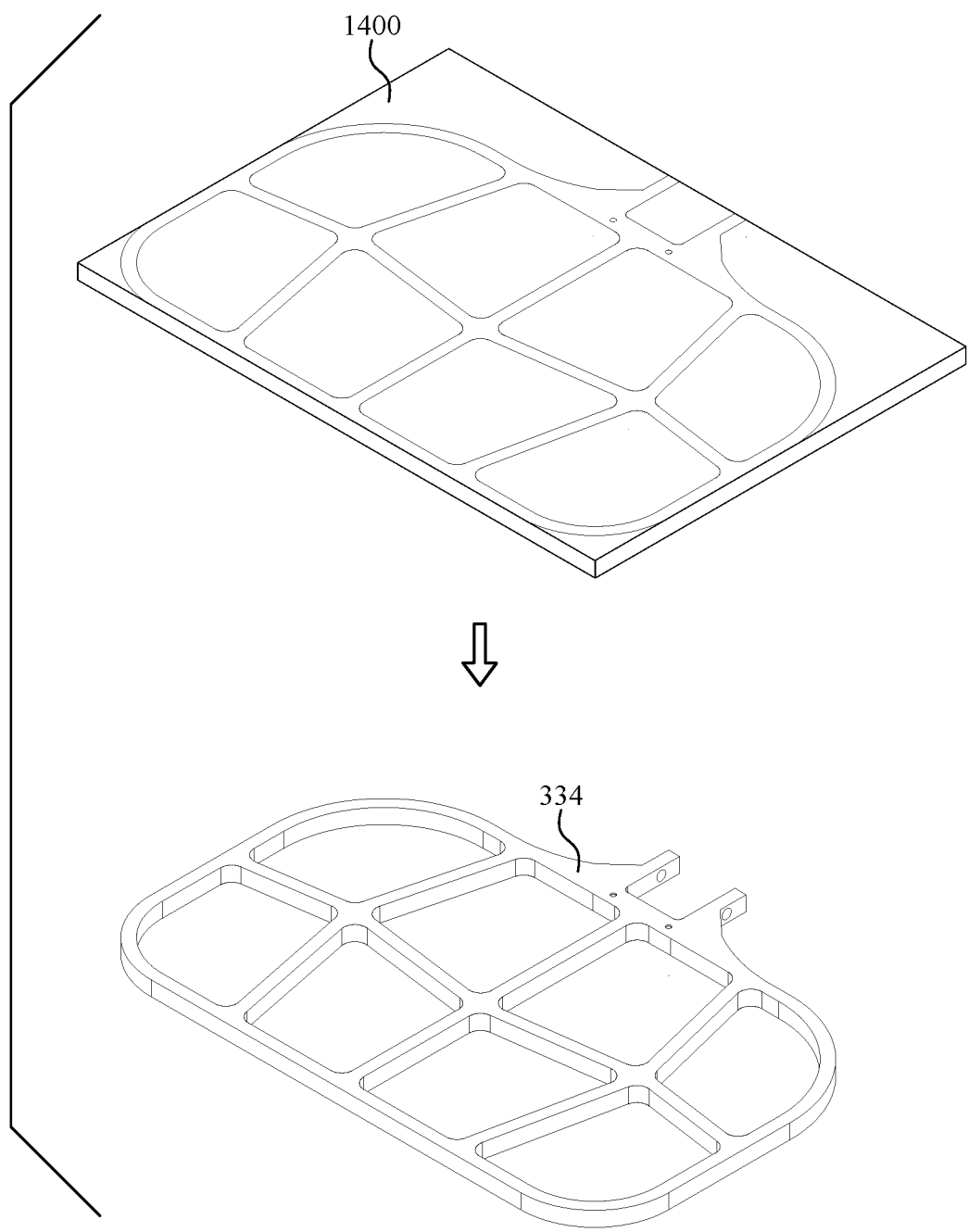
FIG. 14 illustrates the forming of the seat of FIG. 9 from a solid plate.

FIG. 14 illustrates forming of seat 334 from a solid plate 1400 of 6160 aluminum alloy. In this example, plate 1400 is CNC machined into the shape of seat 334.

Figure 15:
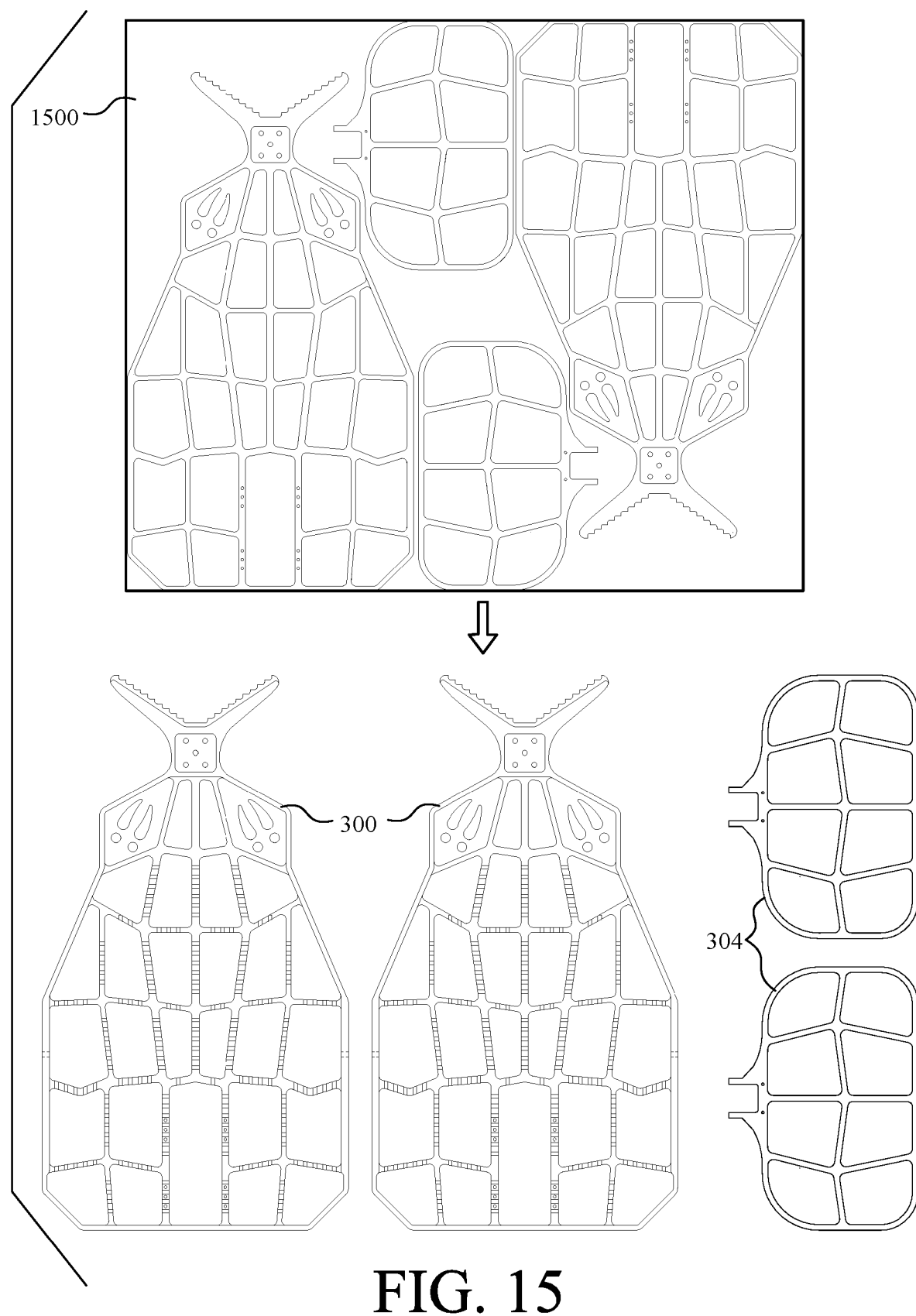
FIG. 15 illustrates the forming of two of the platforms of FIG. 4A and two of the seats of FIG. 9 from a solid plate.

FIG. 15 illustrates the forming of multiple platforms 300 and seats 334 from a single solid 6061 aluminum plate. By forming multiple platforms 300 and seats 334 from a single plate 1500, there is less scrap aluminum plate as compared to forming each part from a separate plate. This is because the platforms 300 and seats 334 can be collectively arranged to more efficiently occupy plate real-estate.

In the example embodiments shown in FIGS. 13-15, platform 300 and seat 334 are machined (milling, drilling, etc.) from plates using a CNC machine. However, other cutting means can be implemented in place of machining. For example, platform 1300 and seat 334 can be cut from a plate using other processes including, but not limited to, water jet cutting, plasma cutting, flame cutting, laser cutting, stamping/punching, drilling, and/or any other manufacturing process for removing material. Such alternate cutting processes can optionally be automated, using CNC or other systems, or manual.

Figure 16:
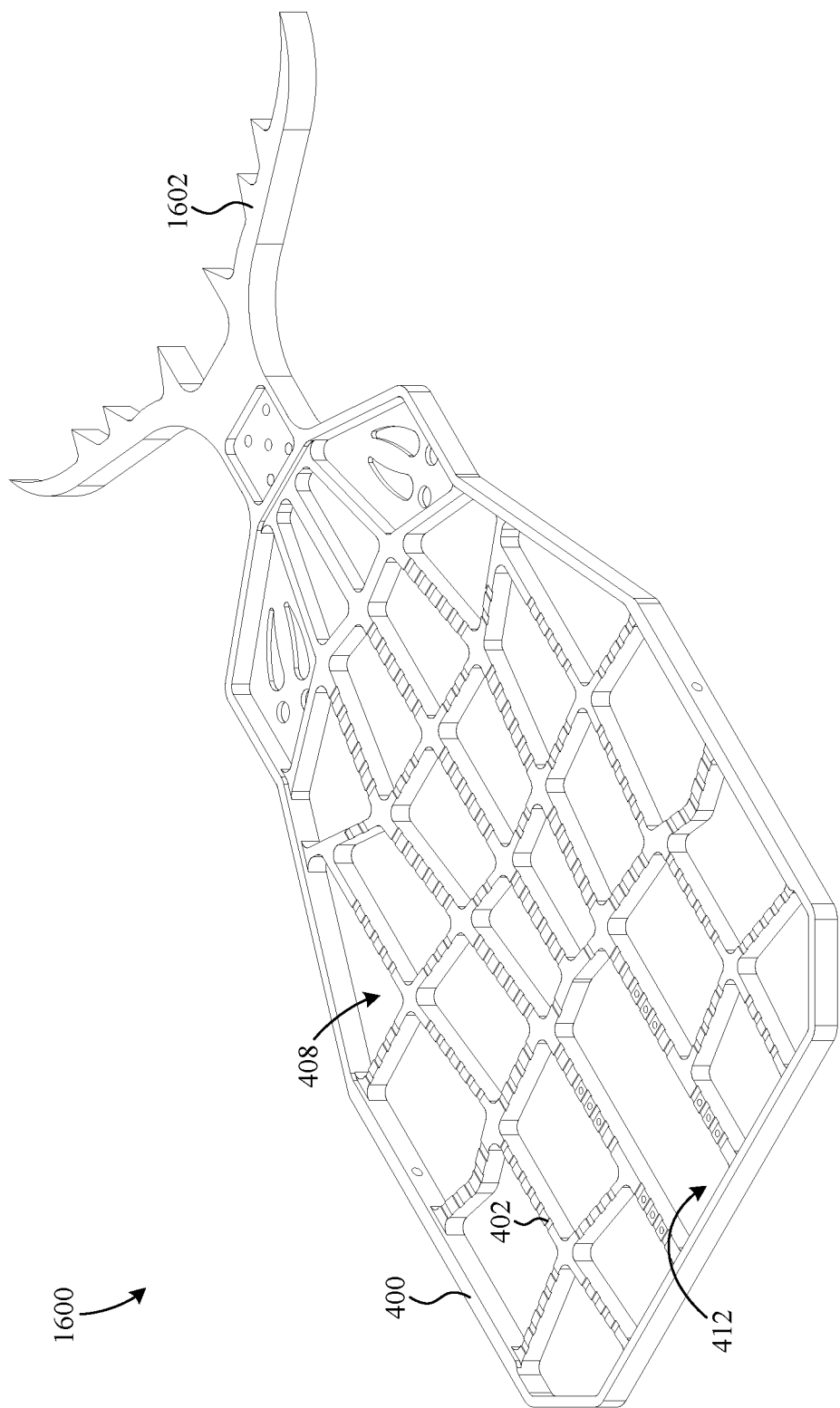
FIG. 16 is a perspective view of an alternate platform.

FIG. 16 is a perspective view of a platform 1600 according to an alternate embodiment of the present invention. Platform 1600 is substantially similar to platform 300 of treestand 100, except that platform 1600 includes an antler-shaped tree engaging feature 1602. Indeed, platform 1600 can be used in place of platform 300 in treestand 104. Features of platform 1600 that are identical to those of platform 300 are denoted with like reference numbers and their descriptions are withheld from the description of FIG. 16 to avoid redundancy.

Antler-shaped tree engaging feature 1602 (as well as tree engaging structure 310 shown in FIG. 10) includes both functional and ornamental features. In particular, the shape of tree engaging feature 1602 resembles the antlers (rack) of a deer and is, therefore, thought to be aesthetical pleasing to hunters. In addition, the tines of the antler design are effective to penetrate the bark of a tree and prevent unwanted movement with respect to the tree.

Figure 17:
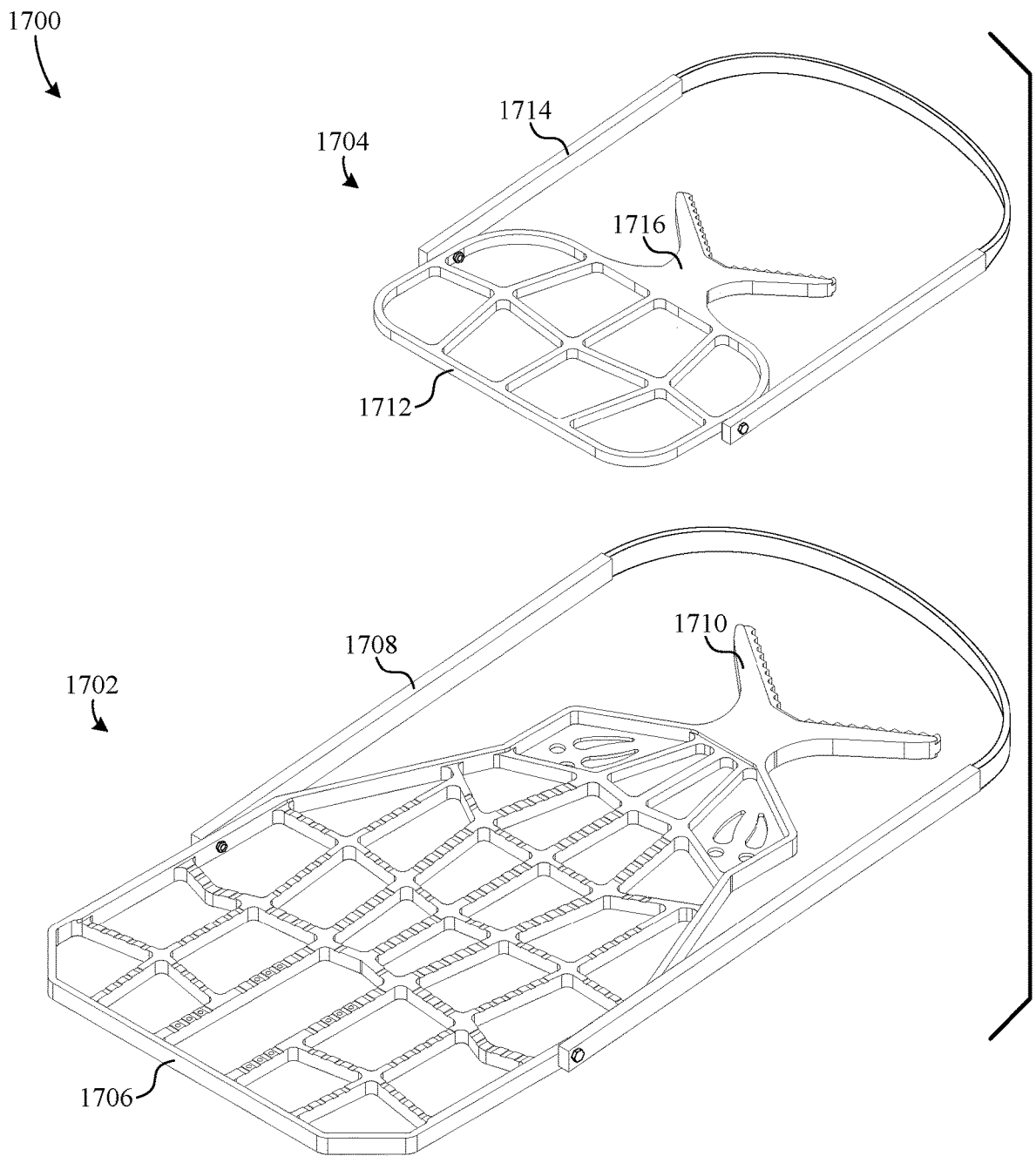
FIG. 17 is a perspective view of a climbing treestand.

FIG. 17 is a perspective view of a climbing treestand 1700 according to another alternate embodiment of the present invention. Treestand 1700 includes a platform assembly 1702 and a seat assembly 1704, both of which are configured to be fastened to a tree. Platform assembly 1702 includes a platform 1706 and an adjustable strap assembly 1708 coupled thereto. Platform 1706 includes an integral tree engaging feature 1710. Seat assembly 1704 includes a seat 1712 and an adjustable strap assembly 1714 coupled thereto. Seat 1712 also includes an integral tree engaging feature 1716. Platform 1706 and seat 1712 are each machined from a solid plate (either the same plate or different plates) of aluminum alloy or other pre-strengthened metal.

Figure 18:
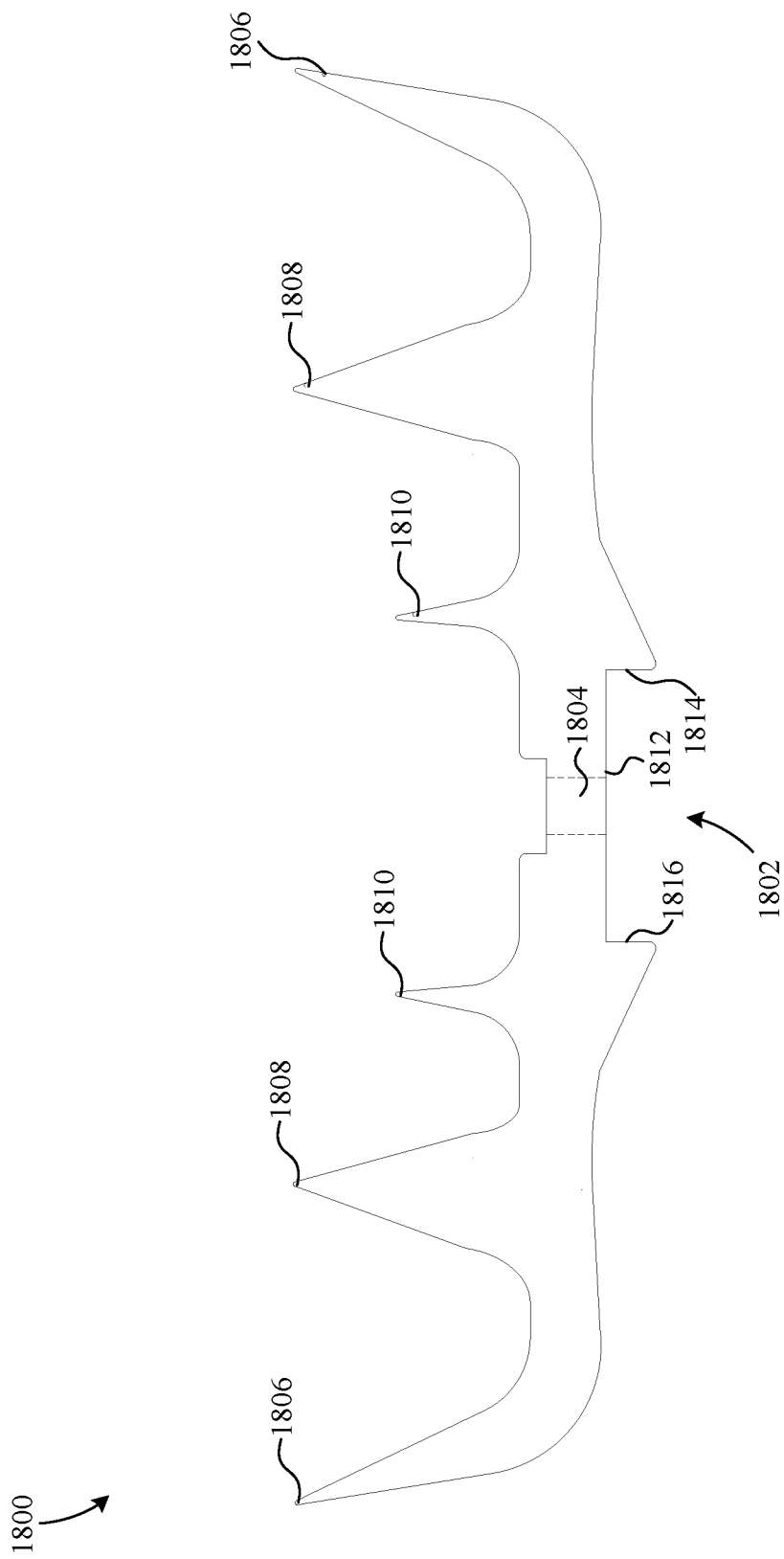
FIG. 18 is a top view of an alternate tree engaging structure.

FIG. 18 shows a top view of an alternate tree engaging structure 1800 for use with treestand 104. Tree engaging structure 1800 includes a channel 1802, an aperture 1804, a set of outside teeth 1806, a set of middle teeth 1808, and a set of inside teeth 1810. Channel 1802 is adapted to receive/seat frame 304 to prevent tree engaging structure 1800 from rotating about bolt 352. Channel 1802 is defined by a first surface 1812, a second surface 1814, and a third surface 1816. When tree engaging structure 1800 is mounted to frame 304, first surface 1812 engages rear wall 804 of frame 304, second surface 1814 engages right sidewall 802 of frame 304, and third surface 1816 engages left sidewall 806 of frame 304. Aperture 1804 is adapted to receive bolt 352 and coaxially aligns with aperture 810 of frame 304. Teeth 1806, 1808, and 1810 are configured to bite into the bark of a tree. In the example embodiment, the points of teeth 1806 and 1808 are coplanar while the points of teeth 1810 are slightly set back closer to channel 1802. It is important to note that outside teeth 1806 are substantially sharper than middle teeth 1808. Therefore, outside teeth 1806 can bite deeper into the tree than do middle teeth 1808. Because outside teeth 1806 bite deeper into the tree, tree engaging structure 1800 can engage substantially angled trees while still securing frame 304 in a vertical upright position.

Figure 19:
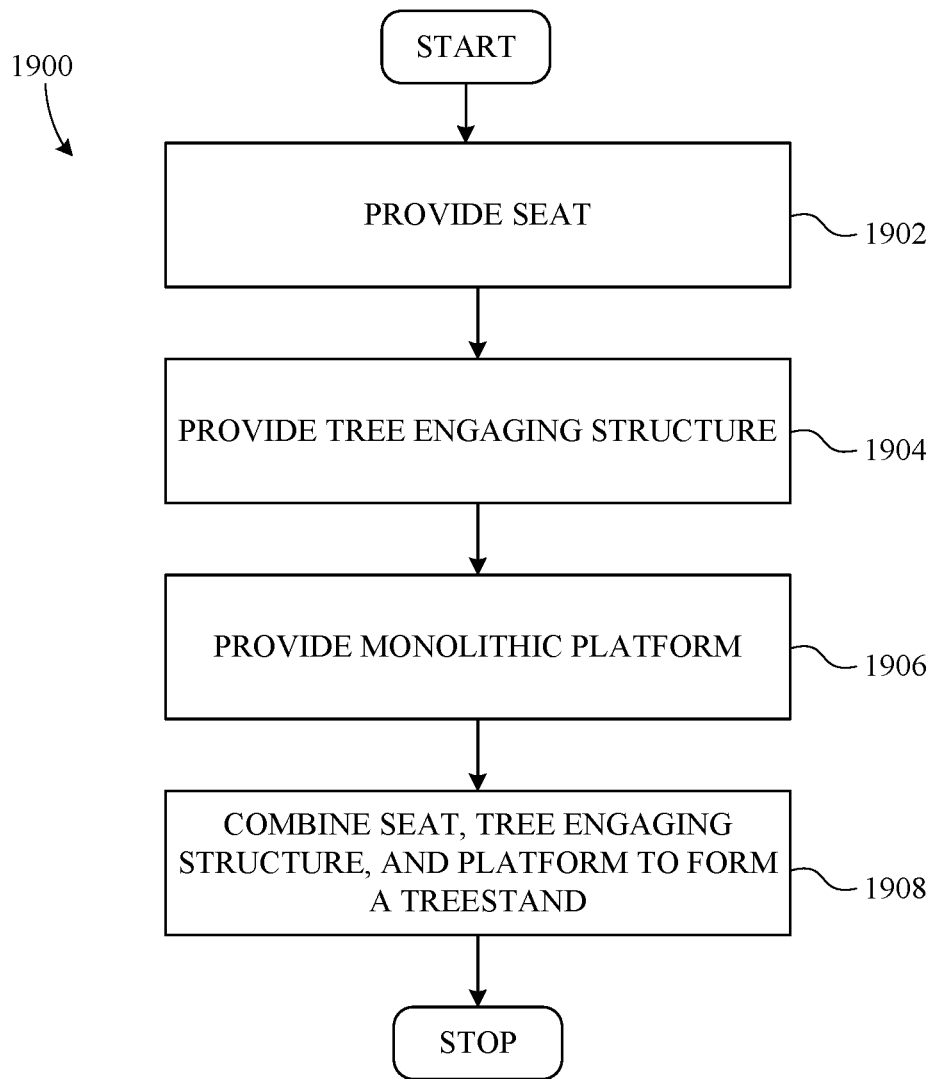
FIG. 19 is a flowchart summarizing an example method of manufacturing a treestand.

FIG. 19 is a flowchart summarizing an example method 1900 of manufacturing a treestand. In a first step 1902, a seat is provided. Then, in a second step 1904, a tree engaging structure is provided. Next, in a third step 1906, a monolithic platform is provided. Finally, in a fourth step 1908, the seat, tree engaging structure, and the monolithic platform are combined to form a treestand.

Figure 20:
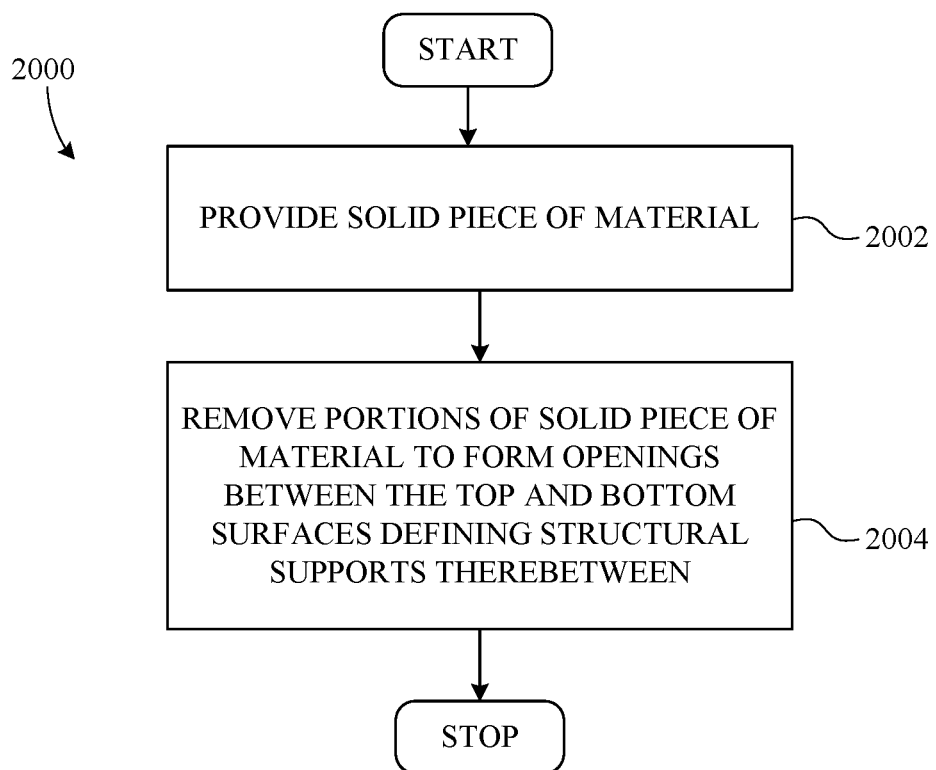
FIG. 20 is a flowchart summarizing an example method of performing the third step (provide monolithic platform) of the method of FIG. 19.

FIG. 20 is a flowchart summarizing an example method 2000 of performing third step 1906 (provide monolithic platform) of method 1900. In a first step 2002, a solid piece of material (e.g., pre-strengthened or pre-toughened metal) is provided. Then, in a second step 2004, portions of the solid piece of material are removed to form openings between a top and bottom surface of the platform defining structural supports therebetween.

Figure 21:
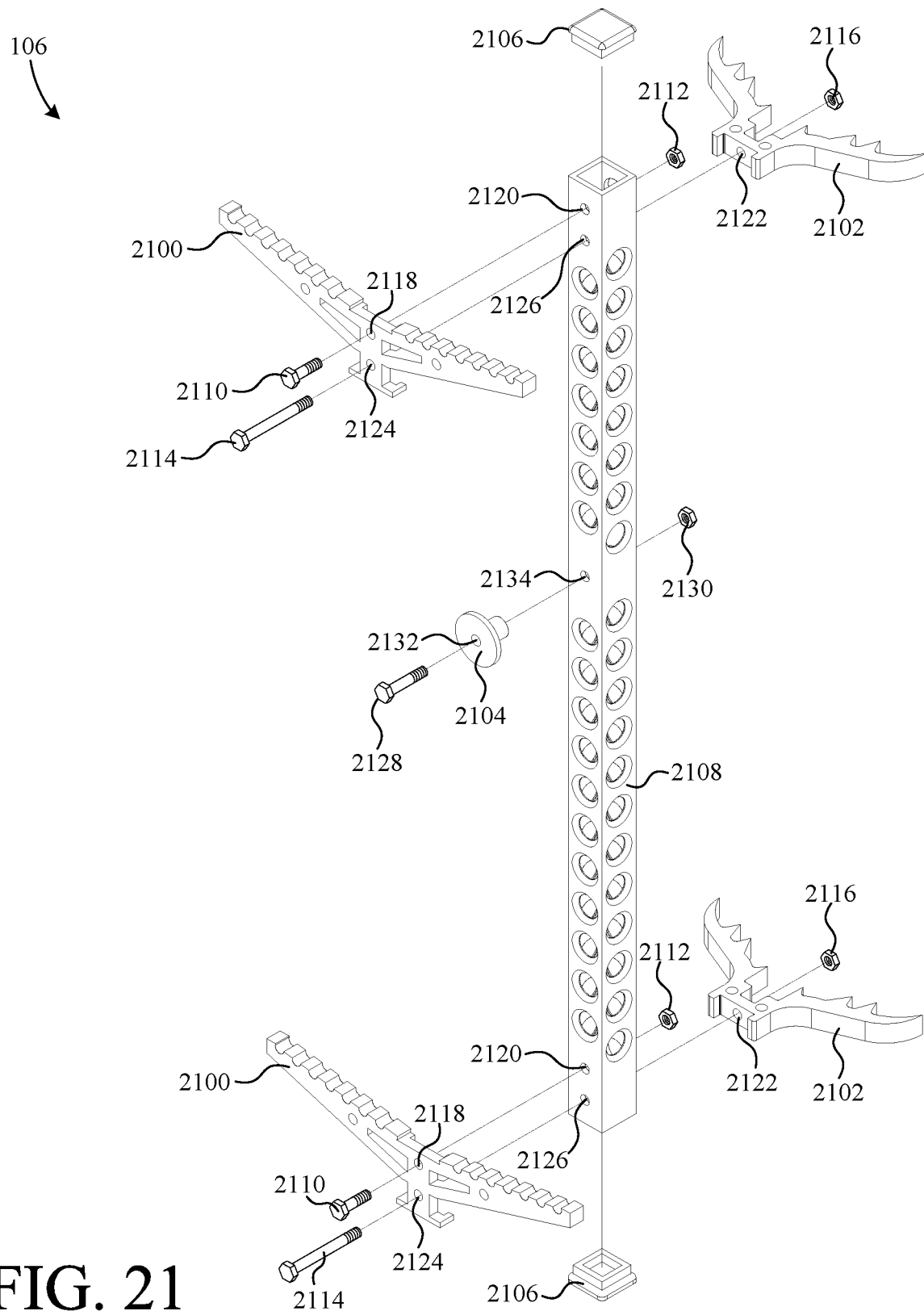
FIG. 21 is an exploded perspective view of a climbing stick of FIG. 1.

FIG. 21 shows an exploded perspective view of one of climbing sticks 106. Climbing stick 106 includes a set of step structures 2100, a set of feet 2102, a post 2104, and a set of end caps 2106 coupled to a frame 2108. Step structures 2100 provide a surface for a user to grab and stand on when ascending and descending a tree via climbing stick 106. Feet 2102 are essentially tree engaging structures which are configured to bite into a tree to maintain a fixed relationship between climbing stick 106 and the tree. Post 2104 provides a structure for a strap 108 (shown in FIG. 1) to engage when securing climbing stick 106. End caps 2106 are disposed in opposite ends of frame 2108 for aesthetic purposes and to cover the sharp edges of frame 2108. Frame 2108 is a tubular structure with a square cross-section, and provides the main structure to which all other components of climbing stick 106 are mounted.

Each of step structures 2100 is fixably mounted to frame 2108 by a top bolt 2110, a top nut 2112, a bottom bolt 2114, and a bottom nut 2116. Bolts 2110 are coaxially disposed through a top aperture 2118 of step structure 2100, an aperture 2120 of frame 2108, and finally through nut 2112. Bolts 2114 also facilitate the mounting of step structures 2100 and feet 2102 to frame 2108. Bolts 2114 are coaxially disposed through a bottom aperture 2124 of step structures 2100, an aperture 2126 of frame 2108, aperture 2122 of feet 2102 and finally through nut 2116.

Post 2104 provides a structure onto which each loop of a strap 108 engages during the mounting of climbing stick 106 to a tree. Post 2104 is mounted to frame 2108 with a bolt 2128 and nut 2130. More specifically, bolt 2128 is disposed through an aperture 2132 of post 2104, an aperture 2134 of frame 2108, and finally through nut 2130.

Figure 22:
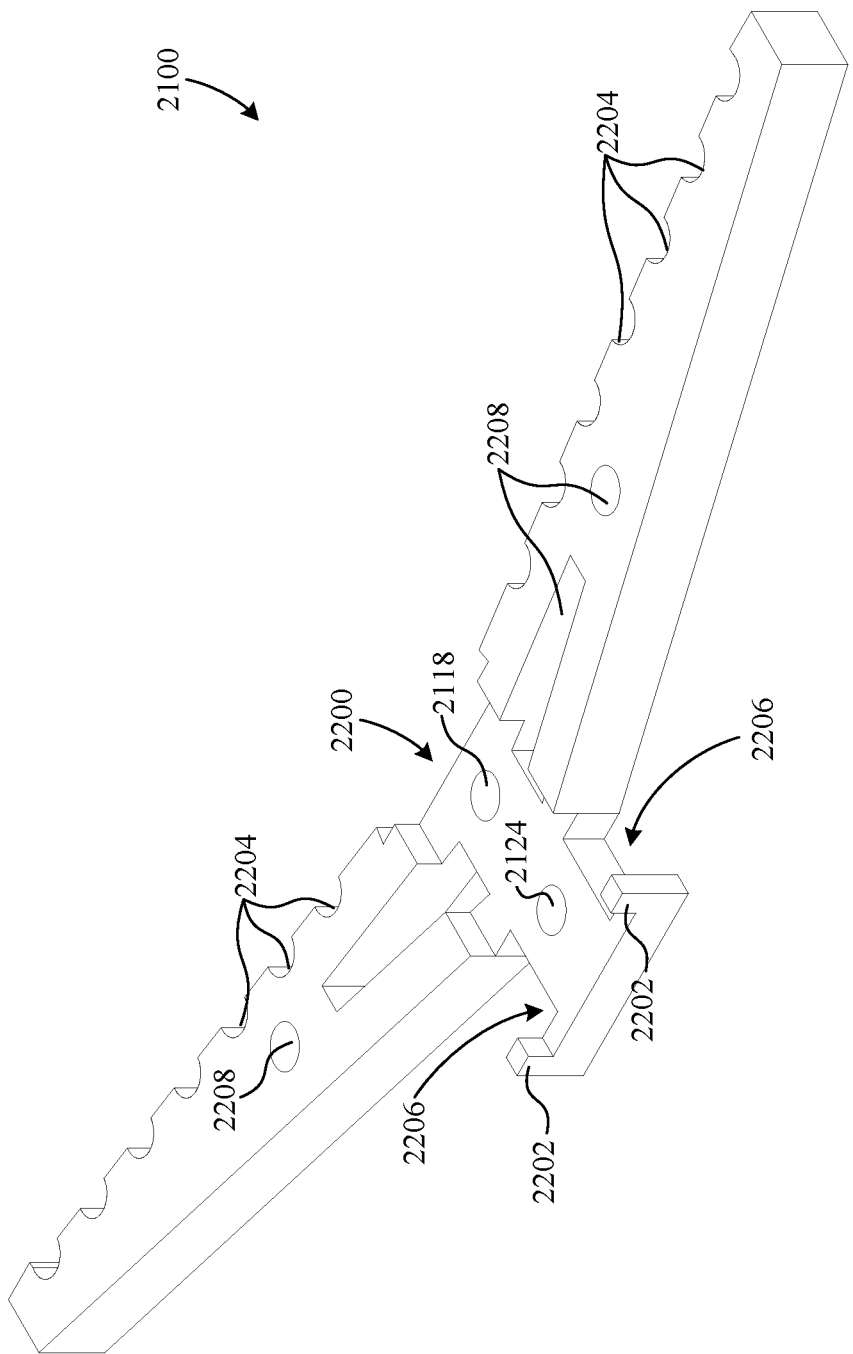
FIG. 22 is a perspective view of a step structure of FIG. 21.

FIG. 22 shows a rear perspective view of one of step structures 2100. In addition to apertures 2118 and 2124, step structure 2100 further includes a channel 2200, a set of protrusions 2202, a plurality of grooves 2204, two slots 2206, and a plurality of weight reduction apertures 2208. Channel 2200 is adapted to receive and seat the outer surface of frame 2108 so as to distribute the forces exerted by step structure 2100 on bolts 2110, 2114, and frame 2108, when a user stands on step structure 2100. Channel 2200 also prevents relative movement (e.g., rotational and/or translational movement) between step structure 2100 and frame 2108. Protrusions 2202 also engage opposite sides of frame 2108 to resist the torque exerted on step structure 2100 when a user stands on step structure 2100. Protrusions 2202 also function as restraining features configured to prevent the tree engaging structures of another climbing stick from sliding along frame 2108 when climbing sticks 106 are stacked onto one another. Slots 2206 allow feet 2102 of other climbing sticks 106 to engage frame 2108, when stacking climbing sticks 106 onto one another. Grooves 2204 provide traction to the boot of a user standing on step structure 2100, and apertures 2208 reduce the weight of step structures 2100 without sacrificing significant structural strength.

Figure 23:
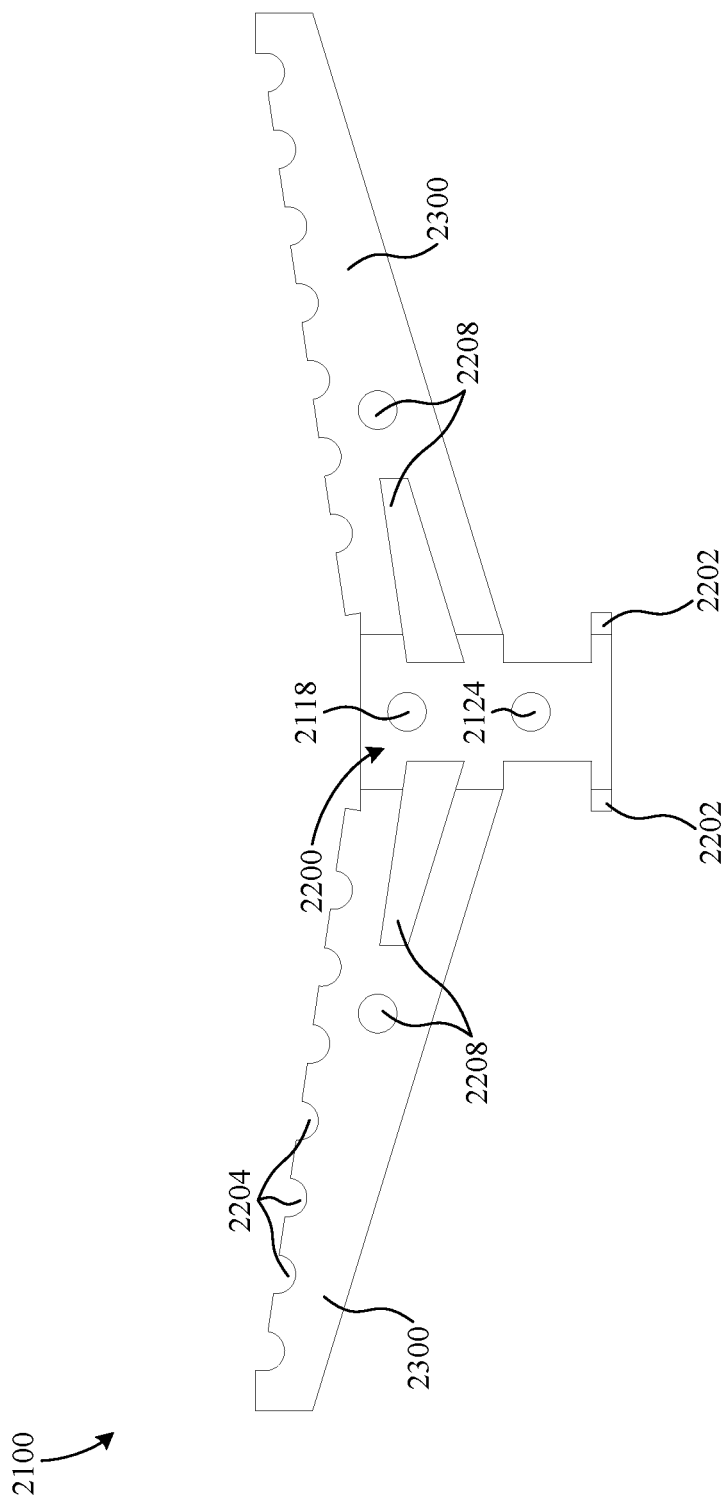
FIG. 23 is a plan view of the step structure of FIG. 22.

FIG. 23 shows a rear view of one of step structures 2100. As shown, each side 2300 of step structure 2100 is slightly pitched upward at an angle of twelve degrees with respect to the horizontal. This provides additional grip between the boot of a user and step structure 2100. In the example embodiment, each of step structures 2100 is formed first extruding an aluminum beam having a cross-sectional profile as shown in FIG. 23. Then, the beam is cut perpendicularly with respect to the extrusion axis of the beam. Finally, channel 2200 is machined into each step structure 2100.

Figure 24:
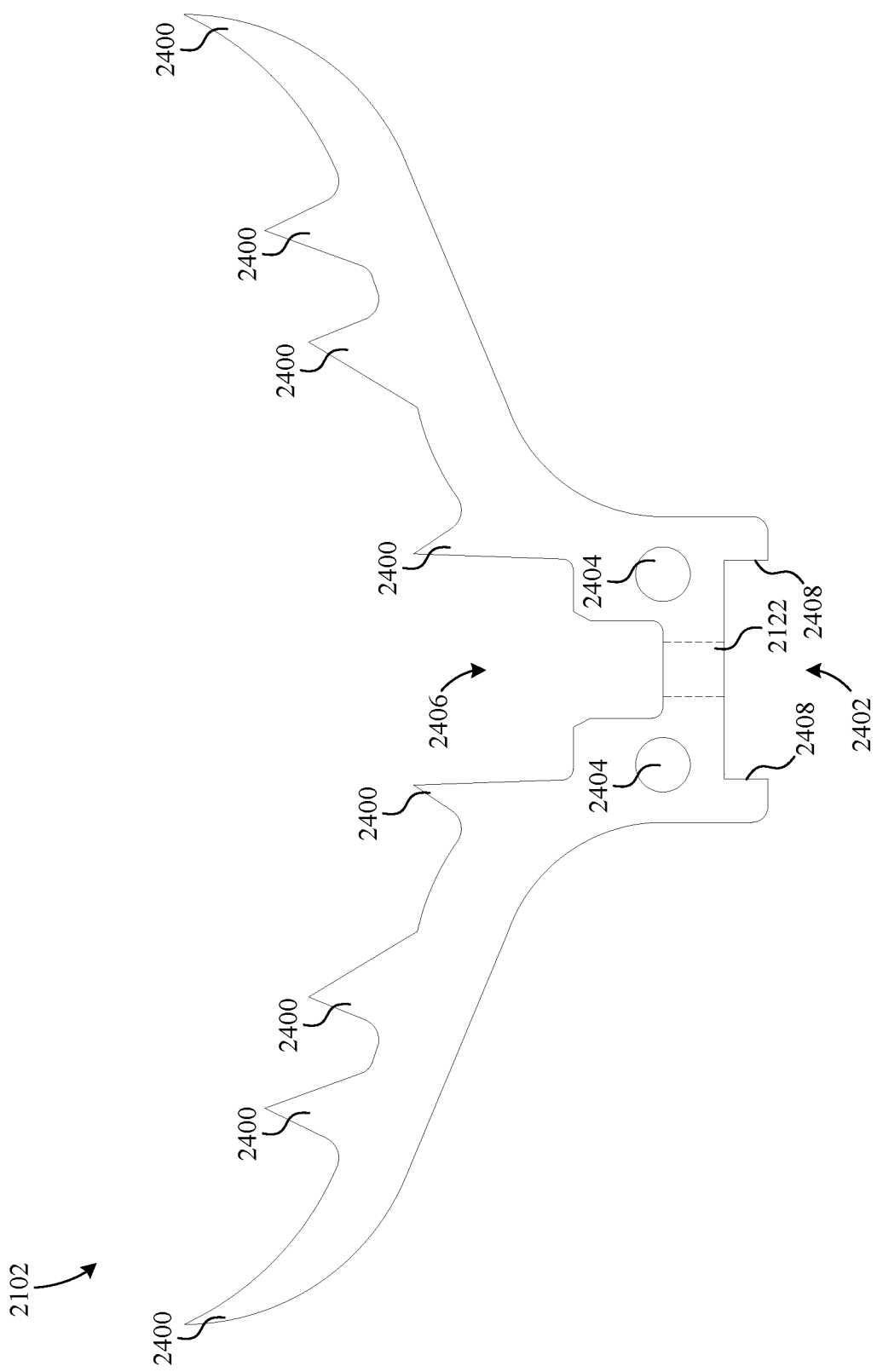
FIG. 24 is a plan view of a tree engaging feature of FIG. 21.

FIG. 24 shows a top plan view of one of feet 2102. Each of feet 2102 further includes a plurality of antler-shaped teeth 2400, a channel 2402, apertures 2404, and a channel 2406. Teeth 2400 are configured to bite into the outer surface of a tree to facilitate the mounting of climbing stick 106 to the tree. Channel 2402 is adapted to receive the outer surface of frame 2108 to prevent relative rotation of feet 2102 with respect to frame 2108. That is, each side 2408 of channel 2402 engages a respective opposite side of frame 2108. Apertures 2404 reduce the overall weight of climbing sticks 106. Channel 2406 is a frame engaging feature that is adapted to receive the frame 2108 of another climbing stick 106, when climbing sticks 106 are stacked on one another. The stacking of climbing sticks 106 will be shown in greater detail in FIG. 26.

FIGS. 25A-25D show plan views of the front wall 2500, right side wall 2502, rear wall 2504, and left side wall 2506, respectively, of frame 2108. In the example embodiment, frame 2108 is formed from a section of extruded aluminum square tube.

Figure 25:
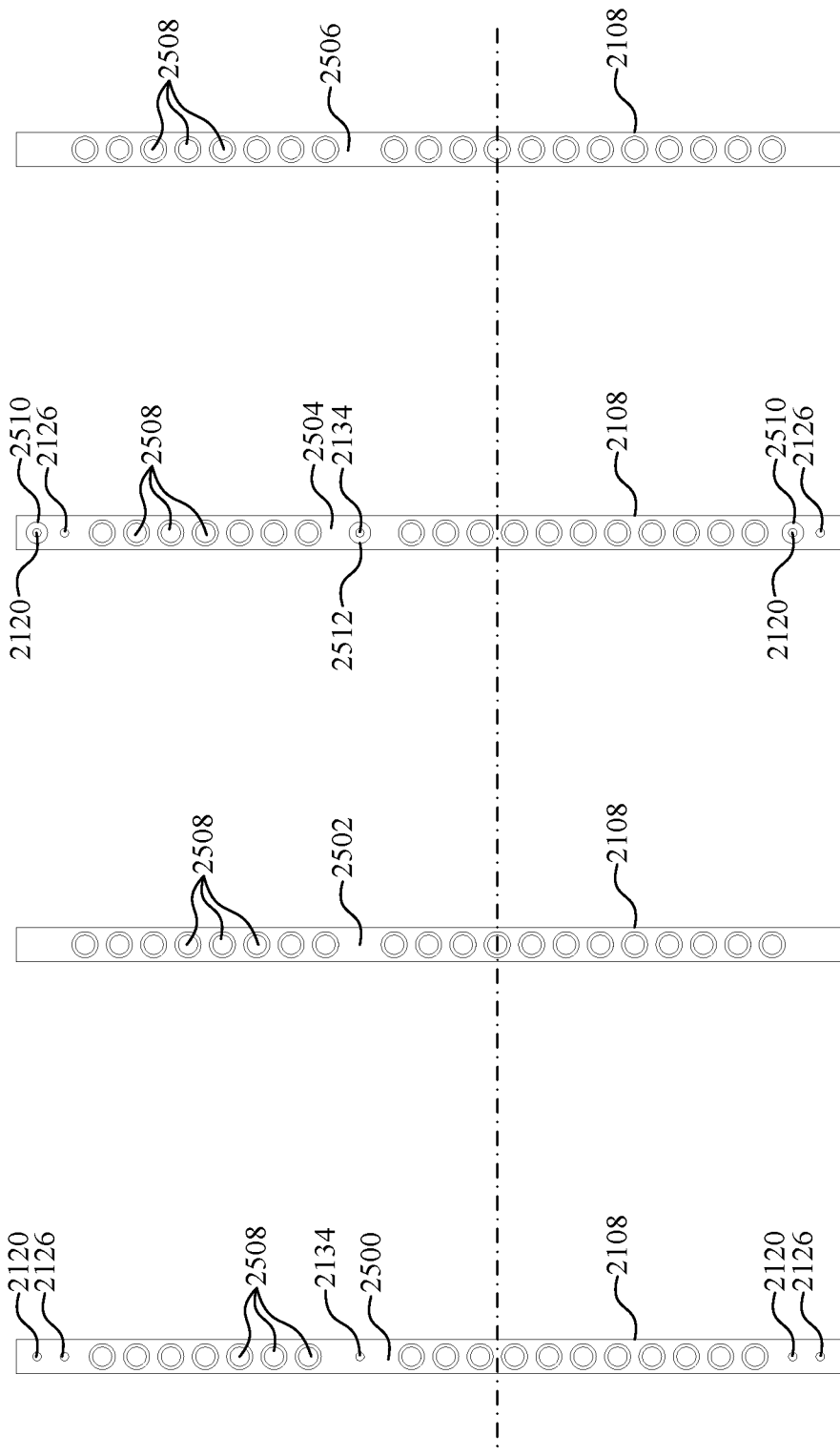
FIG. 25A is a plan view of a front wall of a frame of the climbing stick of FIG. 21.
FIG. 25B is a plan view of a right side wall of the frame of the climbing stick of FIG. 21.
FIG. 25C is a plan view of a rear wall of the frame of the climbing stick of FIG. 21.
FIG. 25D is a plan view of a left side wall of the frame of the climbing stick of FIG. 21.

Front wall 2500 of frame 2108 shown in FIG. 25A includes apertures 2120, apertures 2126, aperture 2134 and a plurality of weight reduction apertures 2508, all passing completely therethrough. Apertures 2120 provide passages through which bolts 2110 are disposed to mount step structures 2100 to frame 2108. Apertures 2126 provides a passage through which bolts 2114 are disposed to mount step structures 2100 to frame 2108 and to also mount feet 2102 to frame 2108. Aperture 2134 receives bolt 2128 to mount post 2104 to frame 2108. Apertures 2508 reduce the overall weight of frame 2108 while also making it more difficult for animals to see frame 2108 when climbing sticks 106 are mounted to a tree. In this example, each of apertures 2508 includes a 45 degree chamfer, which further reduces the weight of frame 2108. The right side wall 2502 of frame 2108 shown in FIG. 25B also includes a plurality of chamfered weight reduction apertures 2508.

Rear wall 2504 is similar to front wall 2500, except that rear wall 2504 includes apertures 2510 and 2512. Apertures 2510 and 2512 are coaxially aligned with apertures 2120 and 2134, respectively, but are larger. The larger diameter of apertures 2510 and 2512 allow a tool (e.g. socket) to pass through rear wall 2504 during the fastening of nuts 2116 and 2130 onto bolts 2110 and 2128, respectively. As shown, apertures 2126 pass through both front wall 2500 and rear wall 2504.

Left side wall 2506 is identical to right side wall 2500 and is, therefore, not explained in detail to avoid redundancy.

One important aspect of example climbing stick 106 is that weight reduction apertures 2508 are offset with respect to apertures 2508 on adjacent walls. For example, the vertical center points of apertures 2508 formed through front wall 2500 and rear wall 2504 are located halfway between the vertical center points of apertures 2508 formed through right side wall 2502 and left side wall 2506. This offset allows an increased number of weight reduction apertures 2508 to be formed in frame 2108, while sacrificing only minimal structural strength.

Figure 26:
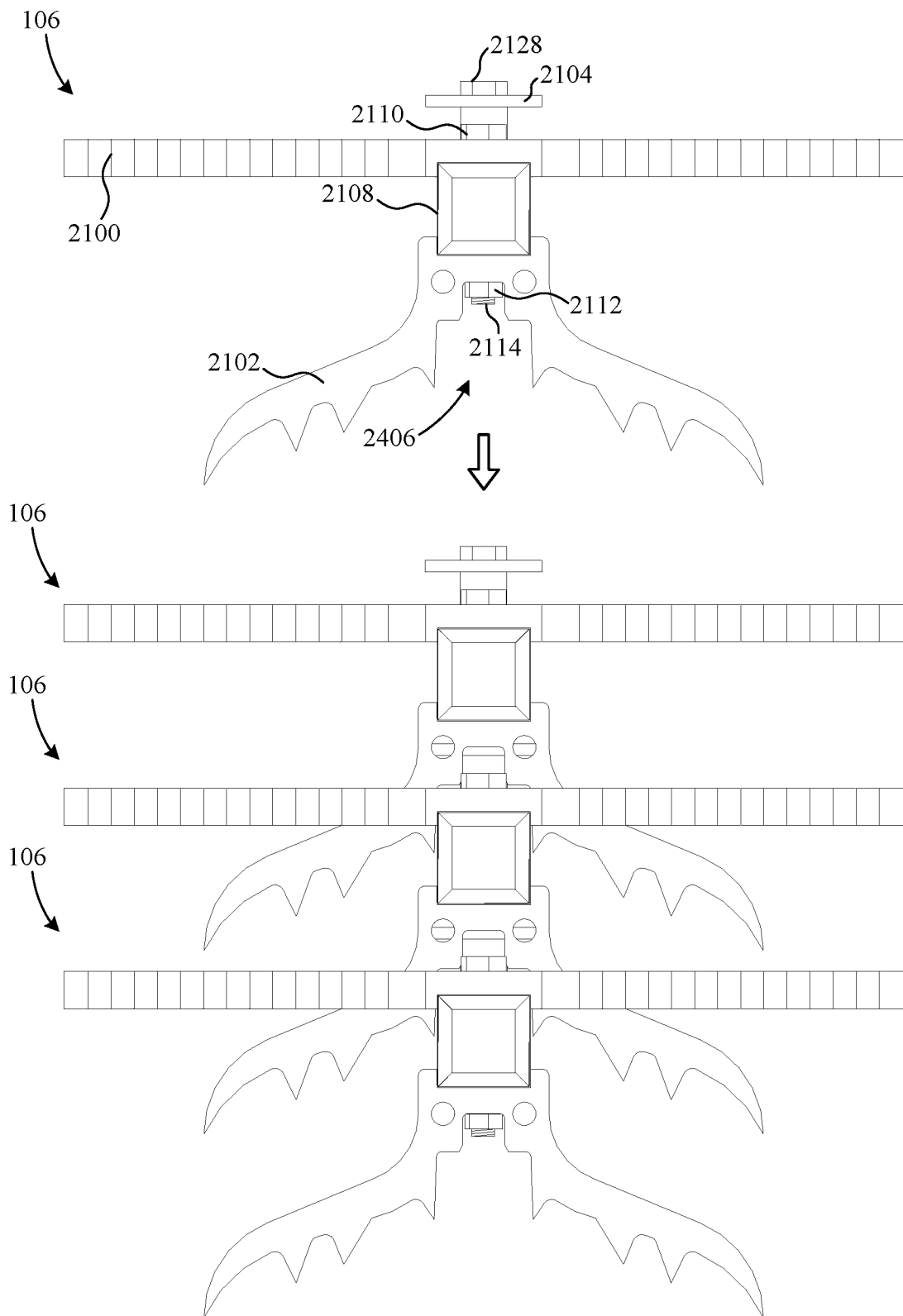
FIG. 26 is a top plan view of the climbing sticks of FIG. 21 being stacked onto one another.

FIG. 26 shows a top plan view of climbing sticks 106 being stacked onto one another. As shown, each of channels 2406 is adapted to engage the frame 2108 of an underlying one of climbing sticks 106.

Figure 27:
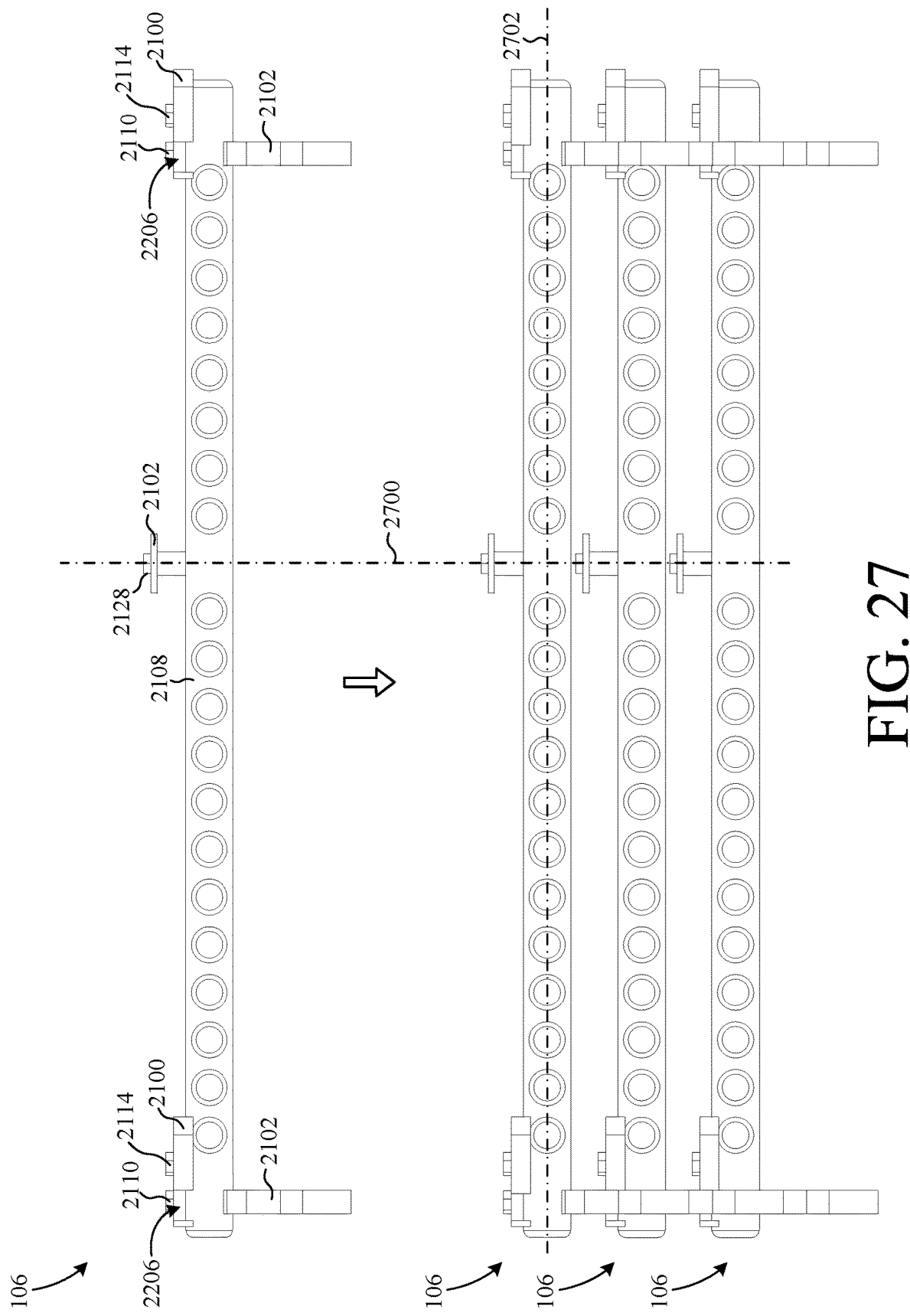
FIG. 27 is a side plan view of the climbing sticks of FIG. 21 being stacked onto one another.

FIG. 27 shows a side view of climbing sticks 106 being stacked onto one another. Climbing sticks 106 are configured to stack on to one another in a substantially horizontally aligned position, when frames 2108 are oriented horizontally. In other words, climbing sticks 106 are configured to engage one another in an aligned position such that corresponding features of climbing sticks 106 are substantially aligned along an axis 2700. Axis 2700 is perpendicular to an axis 2702 of frame 2108, as well as to the axes of the other stacked frames 2108. In this example, climbing sticks 106 stack directly on top of one another such that bolts 2114 of each respective one of climbing sticks 106 are substantially coaxially aligned with one another within a predetermined tolerance. Horizontal alignment provides an important advantage by reducing the size (e.g., the width in FIG. 27) of the stack of climbing sticks 106, making the stack of climbing sticks 106 easier to carry through thick, tangled brush.

Figure 28:
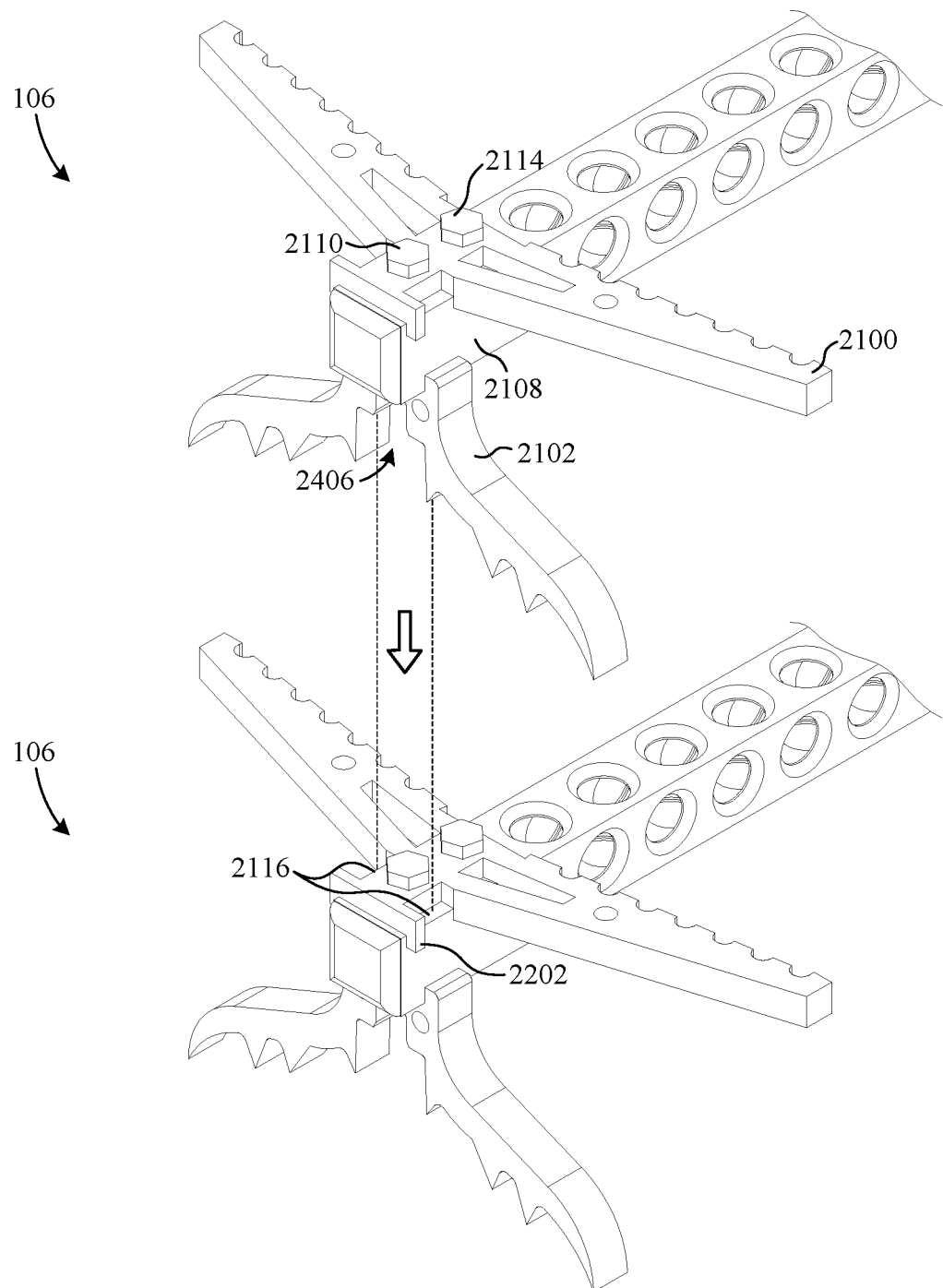
FIG. 28 is a perspective view of two of the climbing sticks of FIG. 21 being stacked onto one another.

FIG. 28 shows a perspective view of one of climbing sticks 106 being stacked onto another one of climbing sticks 106. When stacked, channel 2406 of the top climbing stick 106 engages the portion of frame 2108 that is exposed by slots 2116 of step 2000 of the underlying climbing stick 106. Protrusions 2202 of the underlying climbing stick 106 engage the tree engaging structure 2102 of the climbing stick 106 stacked thereon, thereby preventing the top climbing stick 106 from sliding along frame 2108 of the underlying climbing stick 106.

Figure 29:
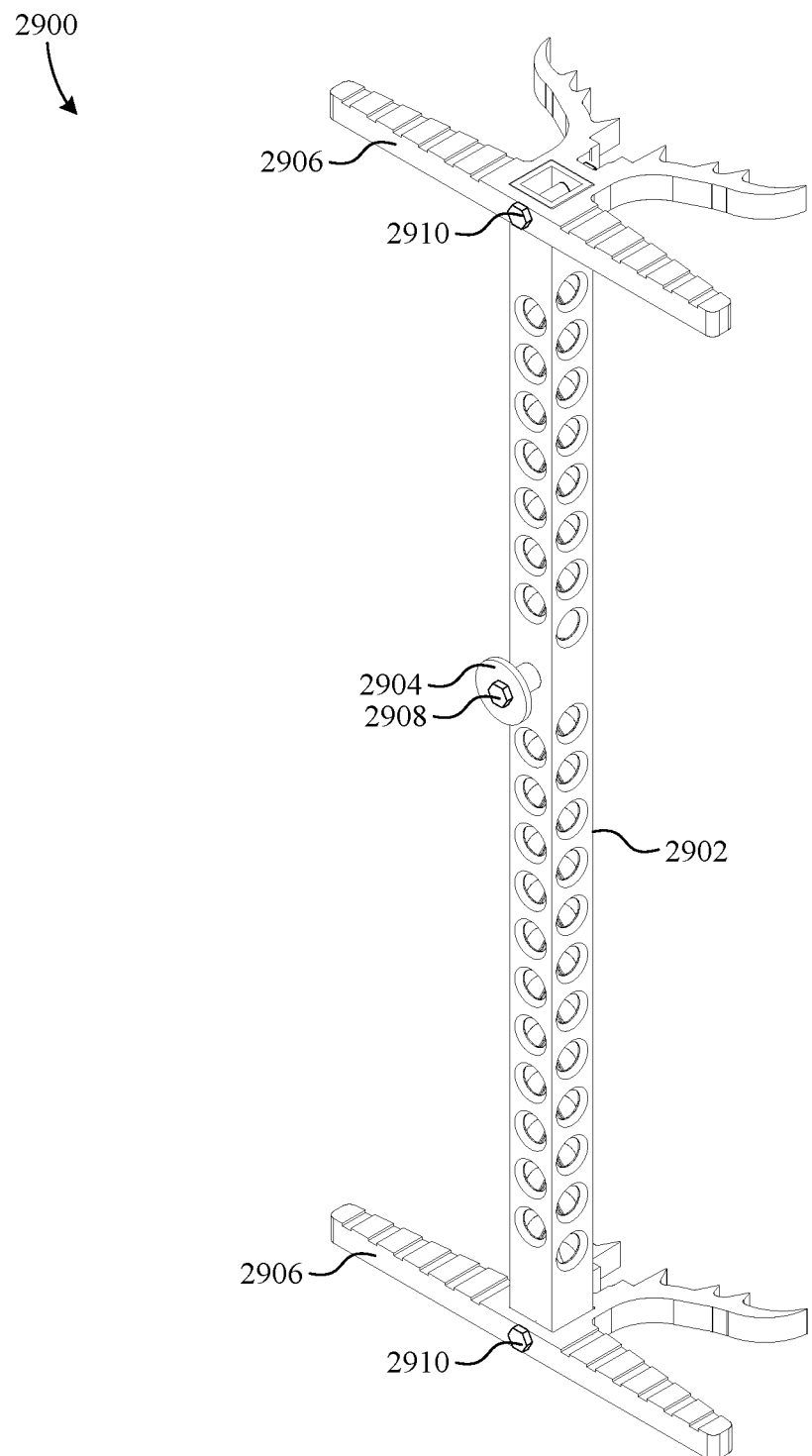
FIG. 29 is a perspective view of an alternate climbing stick.

FIG. 29 shows a perspective view of an alternate climbing stick 2900. Climbing stick 2900 includes a frame 2902, a post 2904, and a pair of step structures 2906. Post 2904 provides a structure that straps 108 can engage, when mounting climbing stick 2900 in a tree. Post 2904 is mounted to frame 2902 with a bolt 2908. Each of step structures 2906 is mounted at an opposite end of frame 2902 with a respective bolt 2910.

Figure 30:
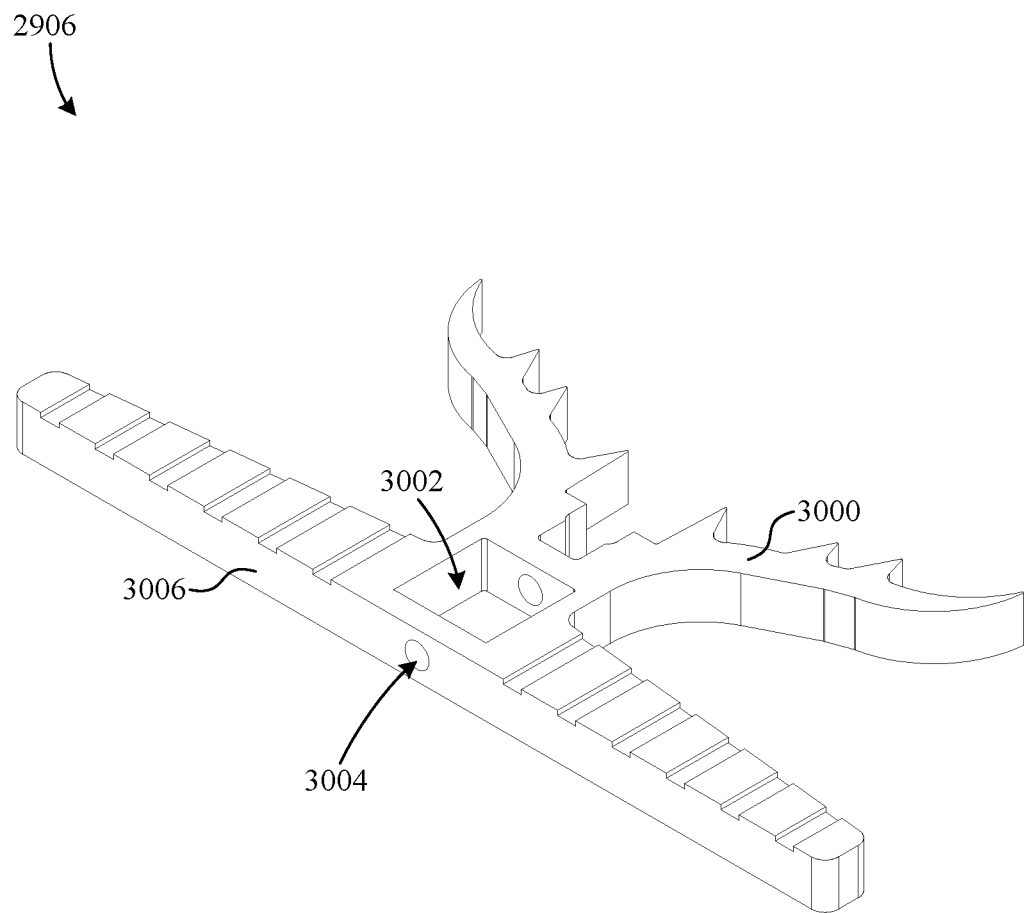
FIG. 30 is a perspective view of a step structure of the climbing stick of FIG. 29.

FIG. 30 shows a perspective view of one of step structures 2906 removed from frame 2902. Step structure 2906 includes an integral tree engaging feature 3000, a frame receiving aperture 3002, a bolt receiving aperture 3004, and a step feature 3006. Tree engaging feature 3000 is configured to bite into a tree and to facilitate the stacking of climbing sticks 2900 onto one another. Frame receiving aperture 3002 is configured to receive an end of frame 2902. Aperture 3004 passes completely through step structure 2906 such that bolt 2910 can be disposed simultaneously through both step structure 2906 and frame 2902. Step structure 2906 is a monolithic structure including tree engaging feature 3000 and step feature 3006 as integral parts thereof. The monolithic nature of step structure 2906 provides important advantages including, but not limited to, simpler assembly, fewer parts, improved stability, and increased strength.

Figure 31:
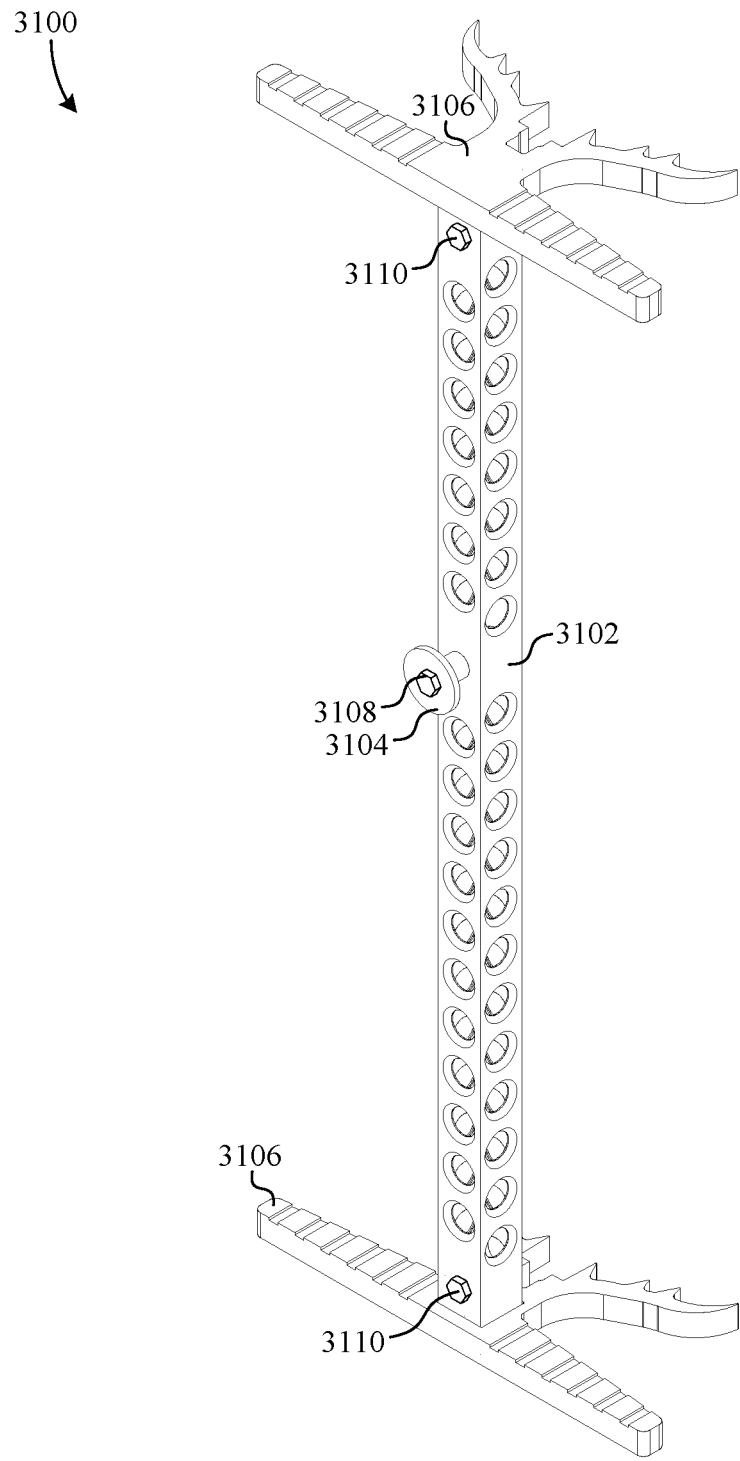
FIG. 31 is a perspective view of another alternate climbing stick.

FIG. 31 shows a perspective view of another alternate climbing stick 3100. Climbing stick 3100 includes a frame 3102, a post 3104, and a pair of step structures 3106. Post 3104 provides a structure which straps 108 can engage, when mounting climbing stick 3100 to a tree. Post 3104 is mounted to frame 3102 with a bolt 3108. Each of step structures 3106 is mounted at an opposite end of frame 3102 with a respective bolt 3110.

Figure 32:
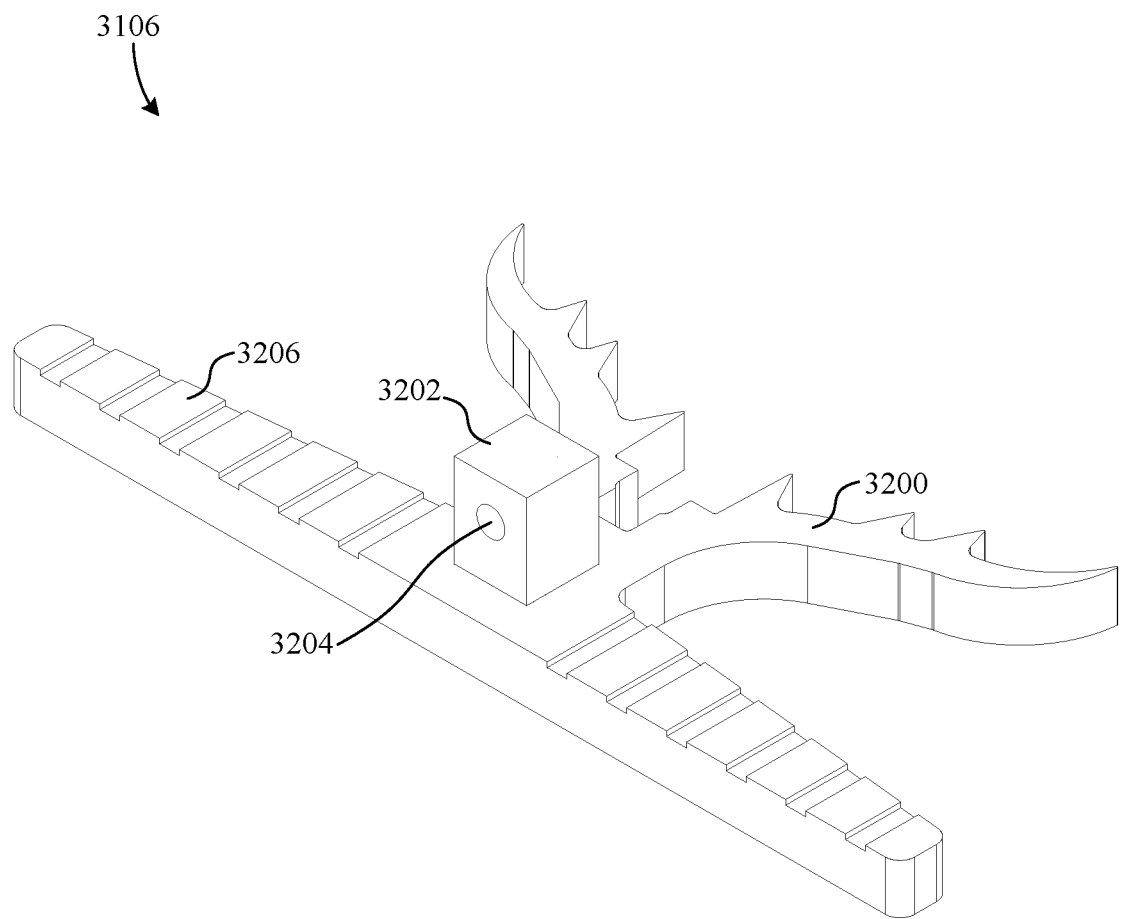
FIG. 32 is a perspective view of a step structure of the climbing stick of FIG. 31.

FIG. 32 shows a perspective view of one of step structures 3106 removed from frame 3102. Step structure 3106 includes an integral tree engaging feature 3200, a frame receiving protrusion 3202, a bolt receiving aperture 3204, and a step feature 3206. Tree engaging feature 3200 is configured to bite into a tree and to facilitate the stacking of climbing sticks 3100 onto one another. Frame receiving protrusion 3202 is adapted to slide into and fit closely within an end of frame 3102. Aperture 3204 passes completely through protrusion 3202 such that bolt 3110 can be disposed simultaneously through both step structure 3100 and frame 3102. Step structure 3106 is a monolithic structure including tree engaging feature 3200 and step feature 3206 as integral parts thereof. The monolithic nature of step structure 3106 provides important advantages similar to step structure 2906 of FIG. 30.

Figure 33:
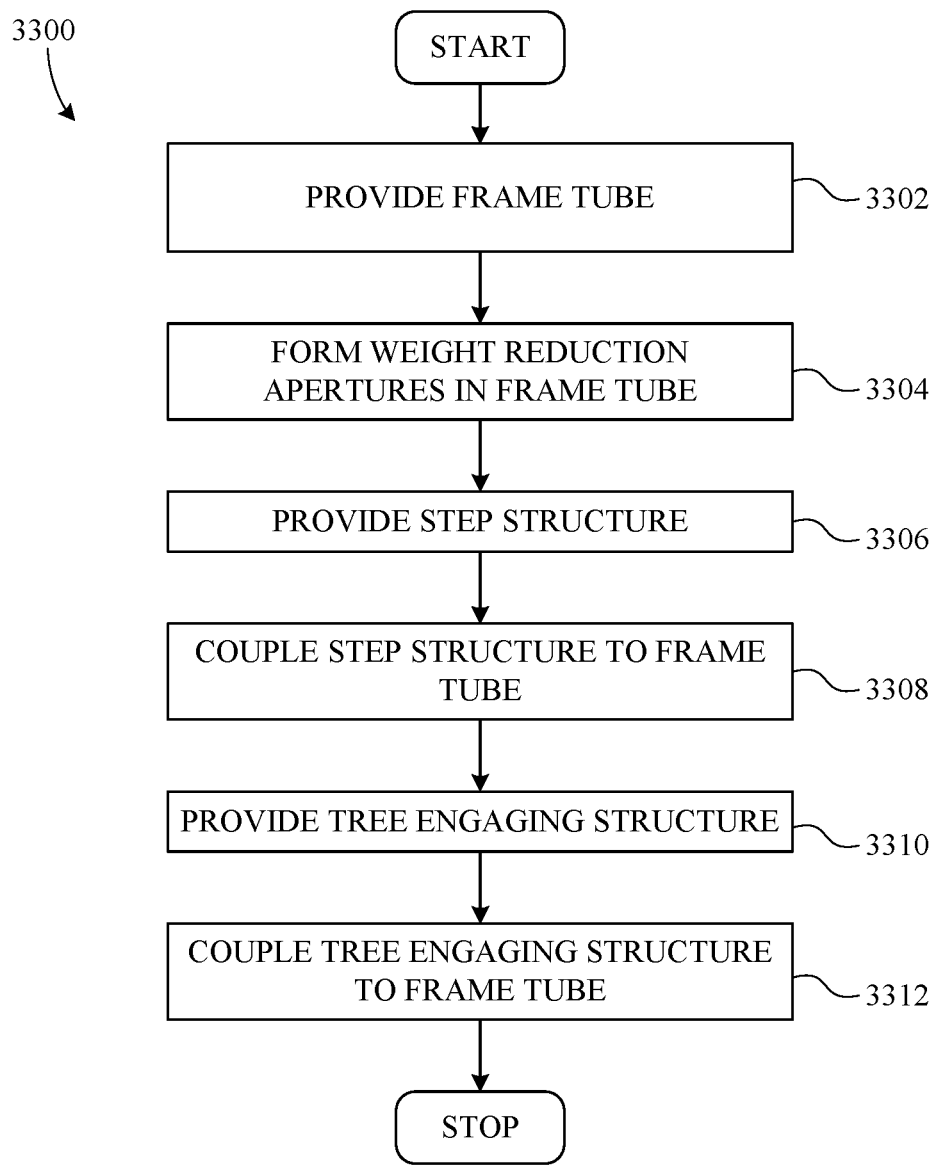
FIG. 33 is a flowchart summarizing a method of manufacturing a climbing stick.

FIG. 33 is a flowchart summarizing a method 3300 of manufacturing a climbing stick. In a first step 3302, a frame tube is provided. Then, in a second step 3304, weight reduction apertures are formed in the frame tube. Next, in a third step 3306, a step structure is provided. Then, in a fourth step 3308, the step structure is coupled to the frame tube. Next, in a fifth step 3310, a tree engaging structure is provided. Finally, in a sixth step 3312, the tree engaging structure is coupled to the frame tube. Optionally, the step structure and tree engaging feature are integral parts of a monolithic structure, and fourth step 3308 and sixth step 3313 are performed simultaneously.

Figure 34:
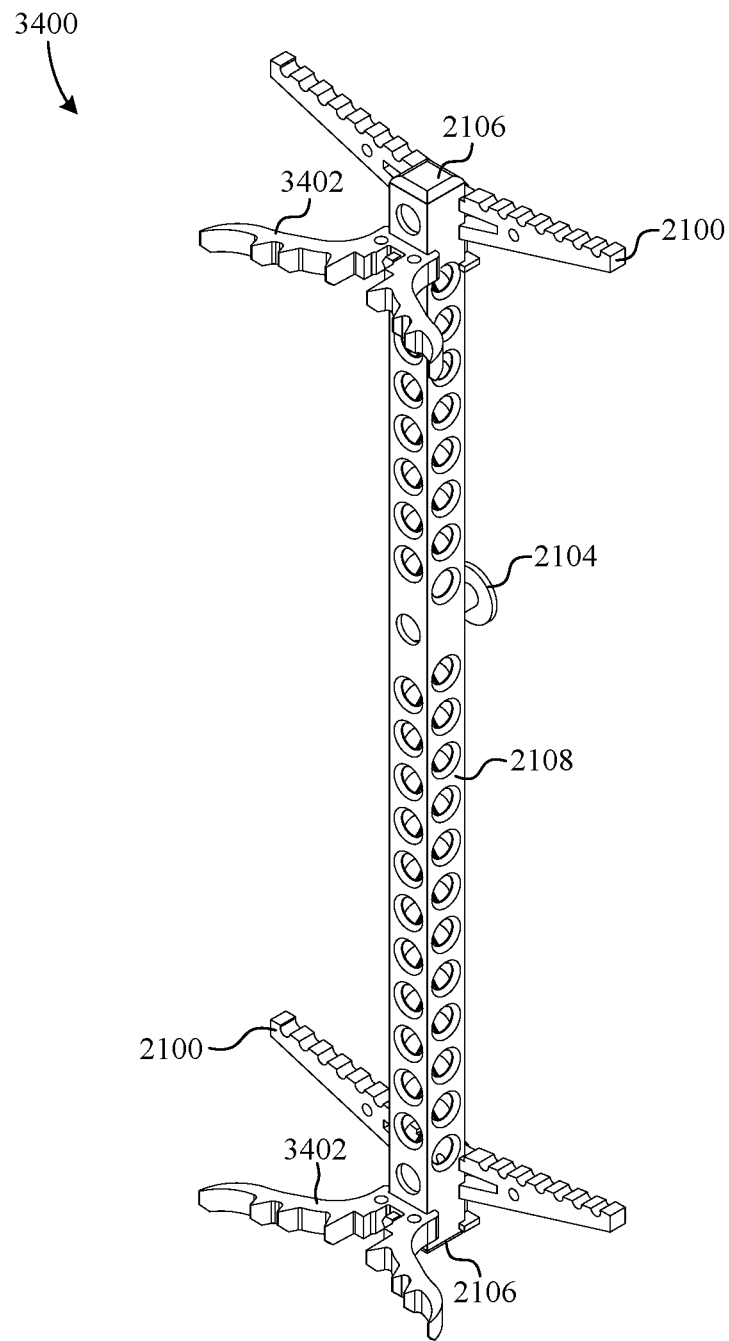
FIG. 34 is a rear perspective view of an alternate climbing stick.

FIG. 34 shows a rear perspective view of an alternate climbing stick 3400 according to another embodiment. Climbing stick 3400 is substantially similar to climbing stick 106, except that climbing stick 3400 includes an alternate set of feet 3402. Therefore, the features and elements of climbing stick 3400 that are substantially similar to those of climbing stick 106 are denoted by like reference numbers and not described again in detail the following description.

Climbing stick 3400 includes a set of step structures 2100, a post 2104, a set of end caps 2106, and a set of feet 3402 coupled to a frame 2108. Each of feet 3402 is a tree engaging structure configured to bite into the side of a tree when climbing stick 106 is strapped to the tree and weight is exerted on at least one of step structures 2100. As will be described with reference to upcoming FIGS. 35-37B, feet 3402 provide climbing stick 3400 significantly improved stability as compared to climbing stick 106.

Figure 35:
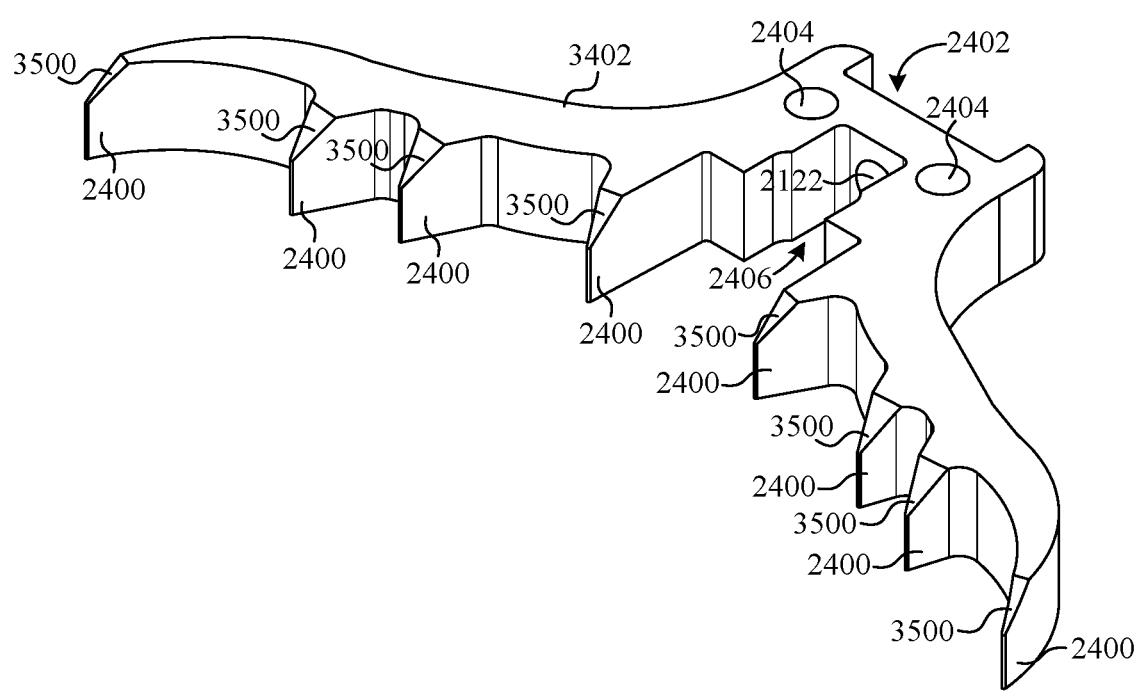
FIG. 35 is a perspective view of a bottom surface of a tree engaging structure of the alternate climbing stick of FIG. 34.

FIG. 35 shows a rear perspective view of the bottom surface of foot 3402. Foot 3402 is substantially similar to foot 2102, except that foot 3402 further includes a ramped surface 3500 formed at the tree-facing surface of each respective one of teeth 2400. Therefore, the features and elements of feet 2102 that are substantially similar to those of feet 3402 are denoted by like reference numbers and are not described again in detail to avoid redundancy. Accordingly, each of feet 3402 includes an aperture 2122, a channel 2402, apertures 2404, a channel 2406, and a plurality of antler-shaped teeth 2400 each having a respective ramped surface 3500 formed thereon.

Feet 3402 are formed by first extruding aluminum through an antler-shaped die to form an aluminum beam having an antler-shaped cross-sectional profile. Then, the extruded beam is cut into multiple sections wherein each is used to form a discrete, monolithic one of feet 3402. Next, a ramp 3500 is machine cut into each respective one of teeth 2400. Finally, each of feet 3402 undergoes a surface finishing process such as, for example, anodizing, painting, etc. As an alternative to extrusion, each of feet 3402 may be cut (e.g., water-jet cutting, machining, flame cutting, etc.) from a solid pre-strengthened/pre-worked/pre-toughened plate of aluminum (i.e. aluminum alloy) or the like before be being subjected to surface finishing. Indeed, the ramped surfaces can even provide the same benefits in tree engaging structures that are cast or formed by any other means.

Figure 36:
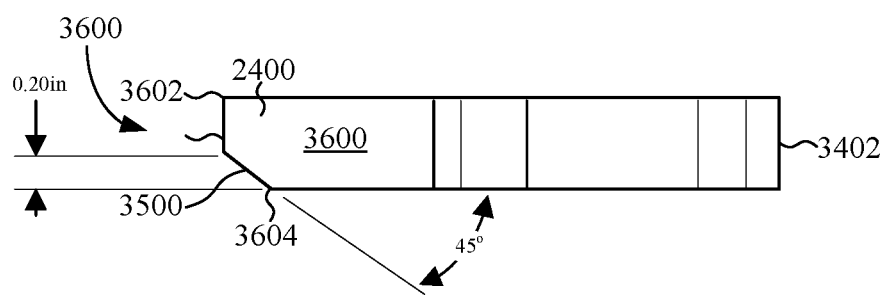
FIG. 36 is a side plan view of the tree engaging structure of FIG. 35.

FIG. 36 shows a side view of one of feet 3402, which includes a facing surface 3600 having a top edge 3602, a bottom edge 3604, and ramped surface 3500 formed therebetween. When climbing stick 3400 is attached to a tree, top edge 3602 is disposed closer to the center of the tree than bottom edge 3604. In the example embodiment, the vertical height of ramped surface 3500 is 0.20 inches and ramped surface 3500 is cut at a 45 degree angle as shown. Although only one of the eight teeth 2400 is visible in FIG. 36, each one of teeth 2400 of foot 3402 includes a facing surface 3600 having a top edge 3602, a bottom edge 3604, and ramped surface 3500 formed therebetween.

Figure 37A:
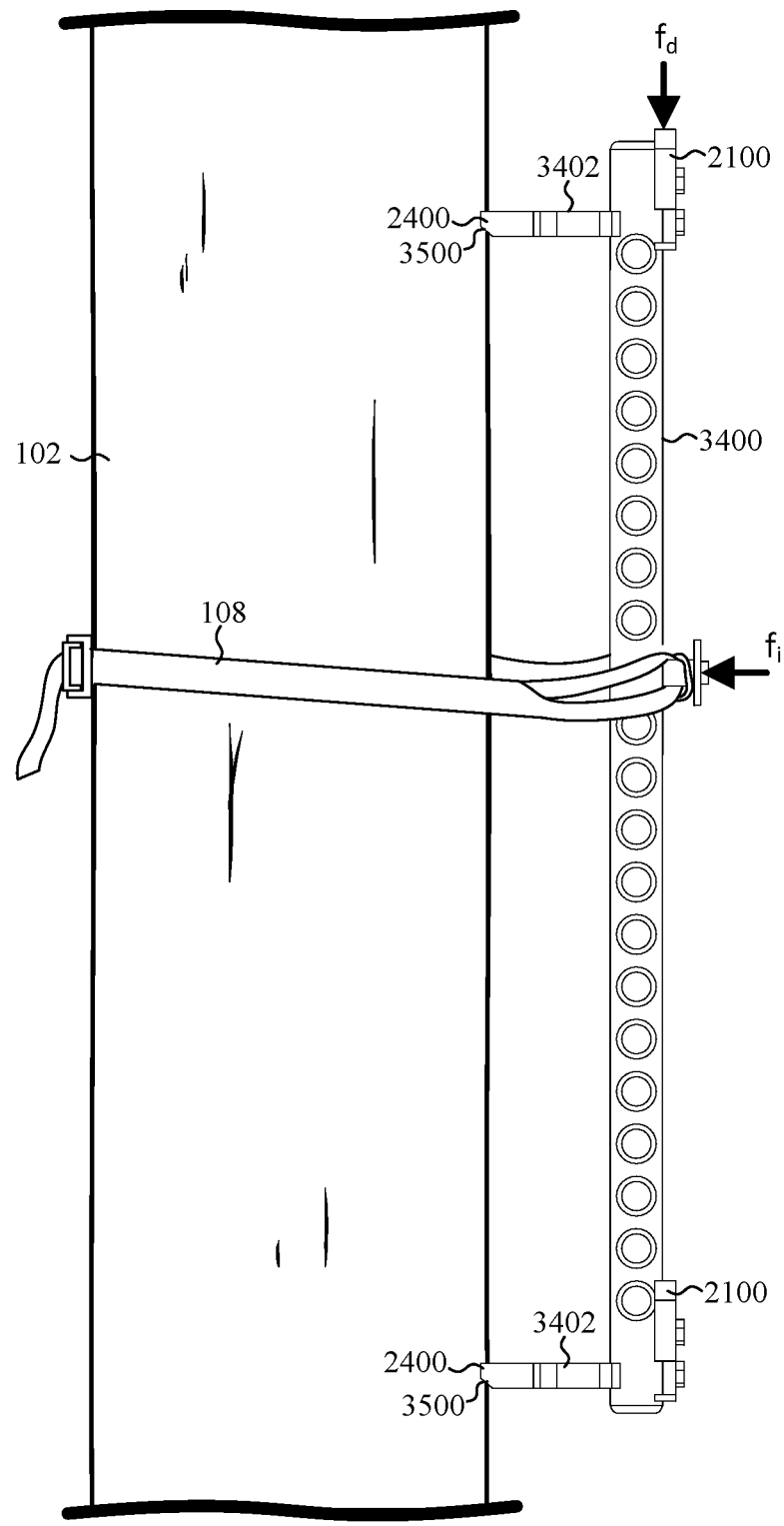
FIG. 37A is a side plan view of the alternate climbing stick of FIG. 34 mounted to a tree and having a small force imparted thereon.
Figure 37B:
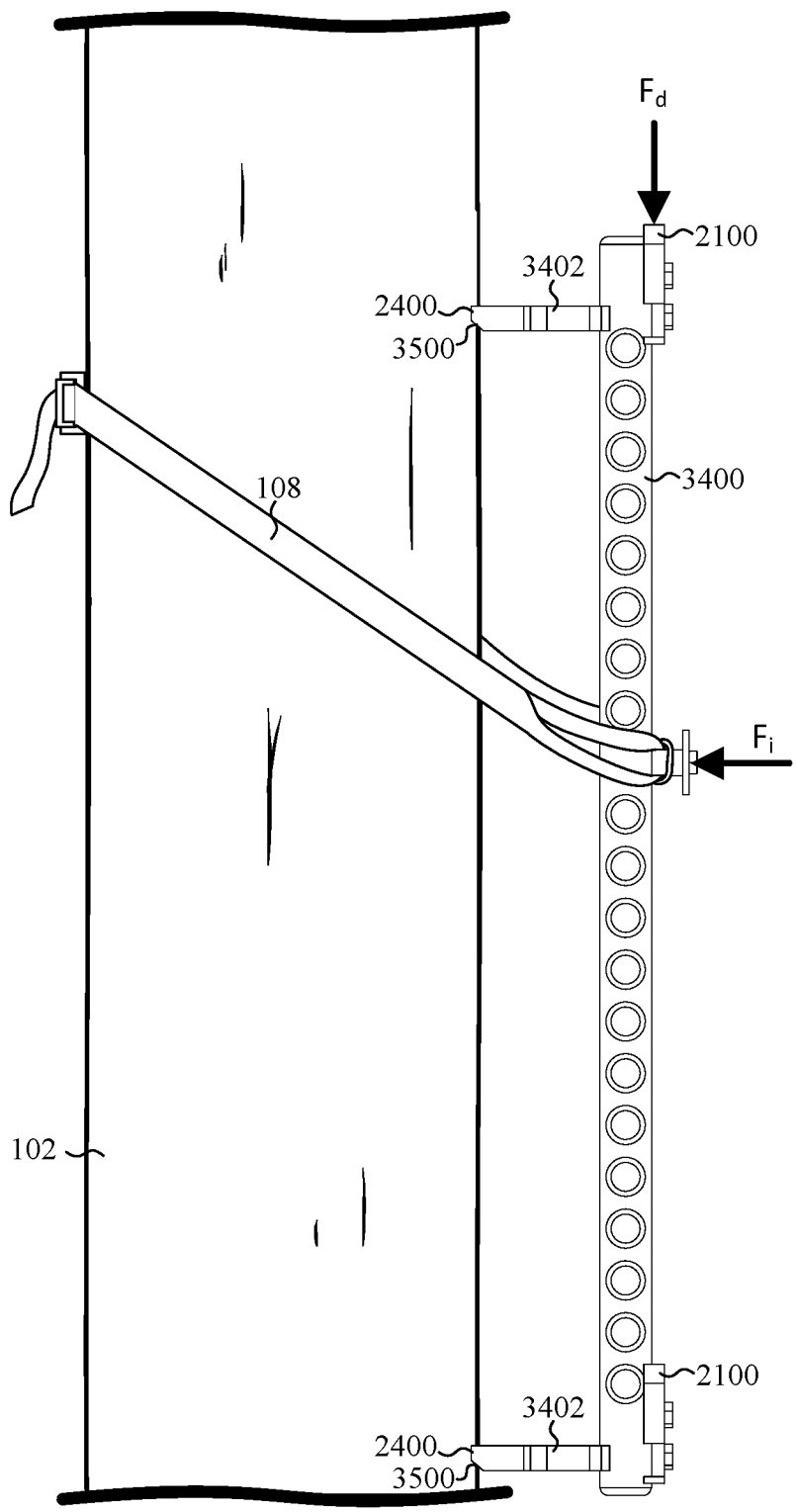
FIG. 37B is a side plan view of the alternate climbing stick of FIG. 34 mounted to a tree and having a larger force imparted thereon.

FIGS. 37A and 37B show side views of climbing stick 3400 attached to tree 102 when a small downward force $f_d$ is exerted on step(s) 2100 and a larger downward force $F_d$ is exerted on step(s) 2100, respectively. When a small force $f_d$ is exerted on steps 2100, climbing stick 3400 slides slightly down tree 102 while strap 108 remains frictionally fixed to the outer surface of tree 102. As a result, the tension in strap 108 increases thereby causing an inward horizontal force $f_i$ to be imparted on climbing stick 3400. This inward horizontal force $f_i$ causes teeth 2400 to urge into the bark of tree 102, thereby stabilizing climbing stick 3400. Of course, a larger force $F_d$ onto step 2100 (shown in FIG. 37B) causes climbing stick 3400 to slide even further down tree 102, thereby resulting in an even greater inward force $F_i$. Ramped surfaces 3500 allow climbing stick 3400 to slide even further down tree 102. As a result, ramped surfaces 3500 cause an even greater inward horizontal force on climbing stick 3400, thereby increasing the stability of climbing stick 3400.

The top edges of teeth 2400 have no slope or ramped surface. As a result, the tension in strap 108 causes teeth 2400 to dig into the bark of tree 102 and remain stable, rather than to cause climbing stick 3400 to advance back up tree 102 when the force is removed from steps 2100. The combination of the sloped bottom surface and flat top surface of teeth 2400 causes a ratchet-like effect when force is exerted onto steps 2100. That is, climbing stick 3400 may advance down tree 102 but resists moving back upward unless strap 108 is removed. Moreover, the downward motion is smooth, as opposed to the unpredictable motion of prior climbing sticks. Another advantage provided by ramped surfaces 3500 is that feet 3402 have a higher probability of sliding completely past small irregularities (i.e., knots, branches, burls, etc.) in tree 102 that could otherwise engage portions of feet 3402 and cause them to bend or twist when force is exerted on climbing stick 3400.

Figure 38:
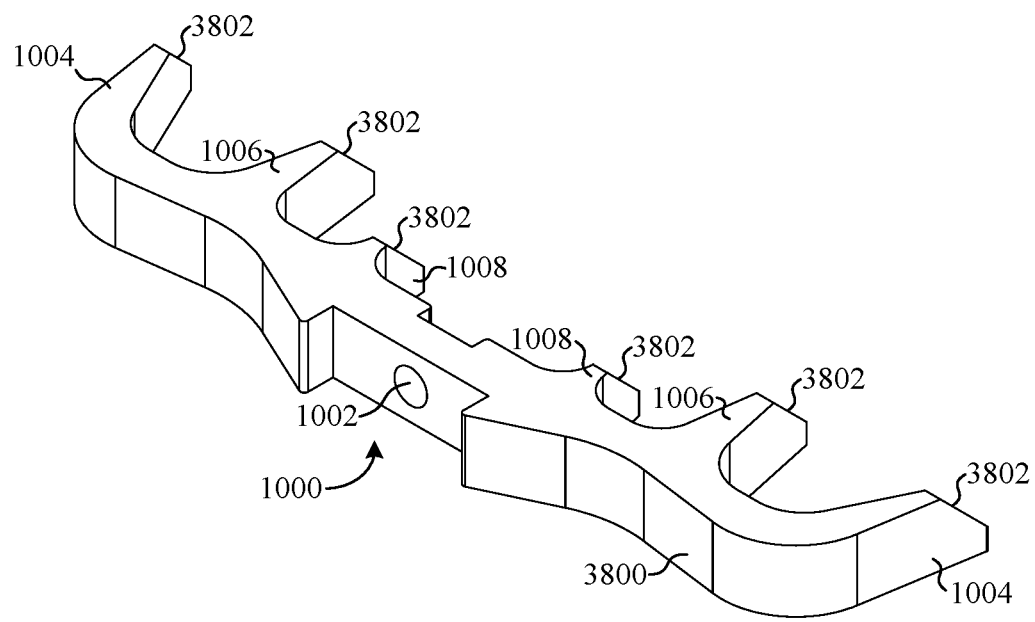
FIG. 38 is a rear perspective view of a bottom surface of an alternate tree engaging structure.

FIG. 38 shows a rear perspective view of a bottom surface of an alternate tree engaging structure 3800, which can be substituted for tree engaging structure 310. That is, tree engaging structure 310 can be removed from treestand 104 and replaced with tree engaging structure 3800. The only difference between tree engaging structure 3800 and 310 is that tree engaging structure 3800 includes ramped surfaces 3802, which provide the same function that ramped surfaces 3500 provide to feet 3402. The features and elements of tree engaging structure 3800 that are substantially identical to those of tree engaging structure 310 are denoted by like reference numbers and withheld from the following description.

Tree engaging structure 3800 includes a channel 1000, an aperture 1002, a set of outside teeth 1004, a set of middle teeth 1006, a set of inside teeth 1008, and a ramped surface 3802 formed on each respective one of teeth 1004, 1006, and 1008.

Figure 39:
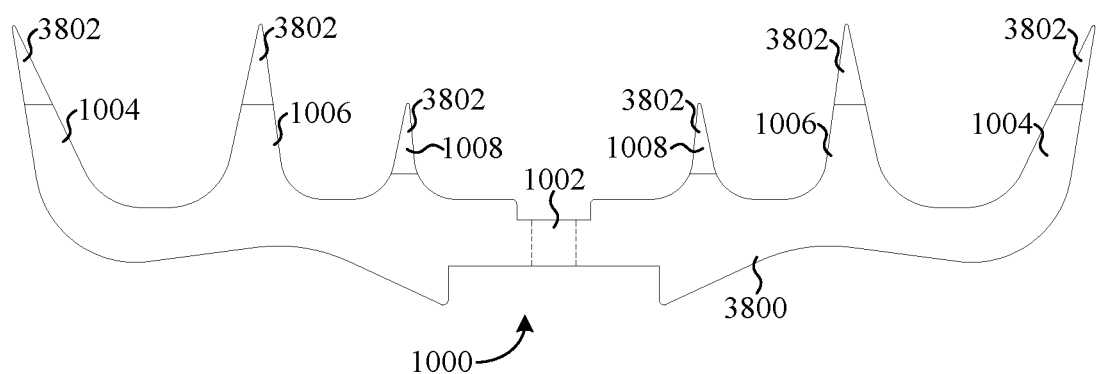
FIG. 39 is a bottom plan view of the alternate tree engaging structure of FIG. 38.

FIG. 39 shows a bottom plan view of tree engaging structure 3800. Tree engaging structure 3800 is an aluminum structure formed, for example, by first extruding the antler-shaped profile along an axis into a beam and then cutting the beam perpendicular to the axis. Accordingly, a single beam yields multiple tree engaging structures 3900. The individual tree engaging structures 3900 then undergo additional machining processes to form ramped surfaces 3802. As an alternative, tree engaging structure 3800 may be cut from a pre-strengthened plate using a plate-cutting process such as machining, water jetting, flame cutting, etc. Such plate cutting processes may be done manually and/or automatically using CNC systems. In addition, as explained above, the ramped surfaces can also provide the described advantages in tree engaging structures made by casting or any other manufacturing process.

FIG. 40 shows a side view of another example treestand 4000 attached to tree 102 by straps 108. Treestand 4000 is substantially similar to treestand 104, except that treestand 4000 includes tree engaging structure 3800 instead of tree engaging structure 310, and platform 300 additionally includes integral ramped surfaces 4002. Although only one of teeth 416 is shown in FIG. 40, all of teeth 416 include a respective ramped surface 4002 in this example embodiment. Ramped surfaces 3802 and 4002 function similarly and provide the same advantages to treestand 4000 as ramped surfaces 3500 provide to climbing sticks 3400. That is, ramped surfaces 3802 and 4002 allow treestand 4000 to slide downward over tree irregularities (e.g., knots, burls, branches, etc.) that could otherwise concentrate damaging stresses on tree engaging components of treestand 4000. Ramped surfaces 3802 and 4002 also allow treestand 4000 to slide smoothly down tree 102, but the top edges of tree engaging structure 3800 and platform 300 also resist the sliding of treestand 4000 back up tree 102 due to the tension in straps 108. As previously mentioned, the further the tree mountable structure (e.g., treestand, climbing stick, etc.) slides down the tree, the greater the tension in straps 108 becomes and, therefore, the higher the inward force that pulls the tree mountable structure toward the center of the tree. Further, the greater the force pulling the tree mountable structure toward the center of the tree, the more stable the tree mountable structure becomes.

FIGS. 41A-41E show various alternate ramped surface shapes that may be substituted for ramped surfaces 3500 of foot 3402. Furthermore, any of the ramped surfaces shown in FIGS. 41A-41E may also be substituted for ramped surfaces 3802 and/or 4002.

Figure 41A:
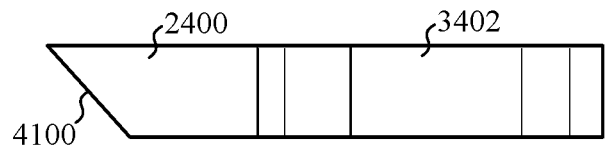
FIG. 41A is a side plan view of an alternate tree engaging structure.

FIG. 41A shows a side view of foot 3402 wherein a linear/planar ramped surface 4100 of foot 3402 extends completely from the top edge of foot 3402 to the bottom edge of foot 3402.

Figure 41B:
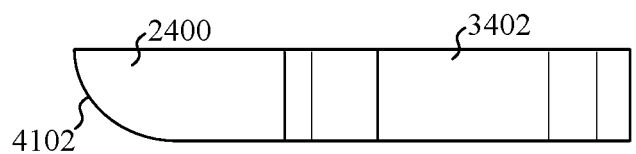
FIG. 41B is a side plan view of another alternate tree engaging structure.

FIG. 41B shows a side view of foot 3402 wherein a rounded/curved ramped surface 4102 of foot 3402 extends completely from the top surface of foot 3402 to the bottom surface of foot 3402. In each of the examples of FIGS. 41A and 41B, the apex of the tooth 2400 extends from the top surface of foot 3402 to the bottom surface of foot 3402.

Figure 41C:
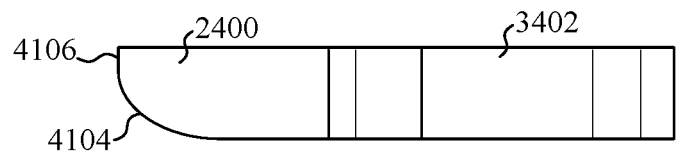
FIG. 41C is a side plan view of yet another alternate tree engaging structure.

FIG. 41C shows a side view of foot 3402 wherein a rounded/curved ramped surface 4104 of foot 3402 extends from a bottom of edge of the apex 4106 of tooth 2400 to the bottom surface of foot 3402.

Figure 41D:
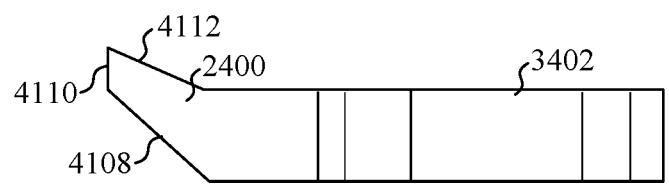
FIG. 41D is a side plan view of yet another alternate tree engaging structure.

FIG. 41D shows a side view of foot 3402, wherein a linear/planar ramped surface 4108 of foot 3402 extends from the bottom edge of a straight front facing apex surface 4110 of tooth 2400 to the bottom surface of foot 3402. Furthermore, a second linear/planar ramped surface 4112 extends downward from the top edge of flat front facing surface 4110 to the top surface of foot 3402.

Figure 41E:
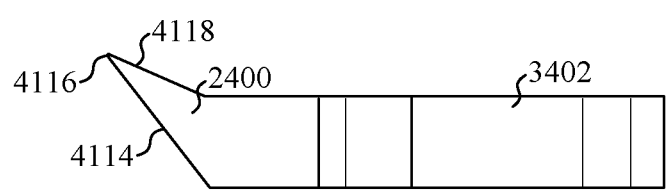
FIG. 41E is a side plan view of yet another alternate tree engaging structure.

FIG. 41E shows a side view of foot 3402 wherein a linear/planar ramped surface 4114 of foot 3402 extends from a point 4116 to the bottom surface of foot 3402. A second linear/planar ramped surface 4118 extends downward from point 4116 to the top surface of foot 3402. Ramped surfaces 4112 of FIG. 41D and 4118 of FIG. 41E each increase the resistance to upward movement on the tree.

The description of particular embodiments of the present invention is now complete. Many of the described features may be substituted, altered or omitted without departing from the scope of the invention. For example, alternate treestand and/or climbing stick mounting straps (e.g. rope), may be substituted for the cam straps. As another example, alternate material types (e.g., plastic and/or other polymers, titanium and/or other metals/alloys, etc.), may be substituted for the 6061 aluminum plates from which the example platform and/or seat are/is formed. These and other deviations from the particular embodiments shown will be apparent to those skilled in the art, particularly in view of the foregoing disclosure.

We claim:

1. A tree mountable structure comprising:
   a frame;
   a first step coupled to said frame and being configured to support a user standing thereon;
   a first tree engaging structure coupled to said frame, said first tree engaging structure including a facing surface, said facing surface having a top edge, a bottom edge, and a ramped surface extending between said top edge and said bottom edge; and
   a fastener configured to attach to said frame and to draw said facing surface against a tree; and wherein
   said top edge of said facing surface is disposed closer to a center of said tree than said bottom edge of said facing surface when said fastener draws said facing surface against said tree;
   said ramped surface facilitates the sliding of said first tree engaging structure down said tree; and
   said top edge of said facing surface of said first tree engaging structure resists the sliding of said first tree engaging structure up said tree.

2. The tree mountable structure of claim 1, wherein said tree mountable structure is a climbing stick.

3. The tree mountable structure of claim 2, further comprising a second tree engaging structure, and wherein
   said first tree engaging structure is attached to a first end of said frame;
   said second tree engaging structure is attached to an opposite second end of said frame;
   said second tree engaging structure includes a facing surface, said facing surface having a top edge, a bottom edge, and a ramped surface extending between said top edge and said bottom edge of said second tree engaging structure;
   said fastener is configured to draw said facing surface of said second tree engaging structure against a tree;

said top edge of said facing surface of said second tree engaging structure is disposed closer to a center of said tree than said bottom edge of said facing surface of said second tree engaging structure when said fastener draws said facing surface of said second tree engaging structure against said tree;

said ramped surface of said second tree engaging structure facilitates the sliding of said second tree engaging structure down said tree; and said top edge of said facing surface of said second tree engaging structure resists the sliding of said second tree engaging structure up said tree.

4. The tree mountable structure of claim 3, further comprising a second step coupled to said frame and being configured to support a user standing thereon, said first step being coupled to said first end of said frame and said second step being coupled to said second end of said frame.

5. The tree mountable structure of claim 1, wherein said tree mountable structure is a treestand.

6. The tree mountable structure of claim 5, wherein said first step is a platform configured to support a user standing thereon, and said first tree engaging structure is an integral part of said platform.

7. The tree mountable structure of claim 6, further comprising a second tree engaging structure, and wherein said first tree engaging structure is attached at a first end of said frame;

said second tree engaging structure is attached at an opposite second end of said frame;

said second tree engaging structure includes a facing surface, said facing surface having a top edge, a bottom edge, and a ramped surface extending between said top edge and said bottom edge of said second tree engaging structure;

said fastener is configured to draw said facing surface of said second tree engaging structure against a tree;

said top edge of said facing surface of said second tree engaging structure is disposed closer to a center of said tree than said bottom edge of said facing surface of said second tree engaging structure when said fastener draws said facing surface of said second tree engaging structure against said tree;

said ramped surface of said second tree engaging structure facilitates the sliding of said second tree engaging structure down said tree; and said top edge of said facing surface of said second tree engaging structure resists the sliding of said second tree engaging structure up said tree.

8. The tree mountable structure of claim 5, wherein:
said first step is a platform configured to support a user standing thereon;
said platform is coupled to a first end of said frame; and
said first tree engaging structure is coupled to a second end of said frame, opposite said first end of said frame.

9. The tree mountable structure of claim 1, wherein:
said first tree engaging structure is a monolithic structure;
said first tree engaging structure defines a first channel configured to seat said frame; and
said channel prevents rotation of said first tree engaging structure relative to said frame.

10. The tree mountable structure of claim 1, wherein said ramped surface is planar.

11. The tree mountable structure of claim 1, wherein said ramped surface is rounded.

12. The tree mountable structure of claim 1, wherein:
said facing surface defines a plurality of teeth configured to penetrate said tree when said facing surface is urged toward said tree;
a first one of said teeth includes an apex extending vertically, a first portion of said facing surface and a second portion of said facing surface converging to form said apex of said first tooth;
a second one of said teeth includes an apex extending vertically, said first portion of said facing surface and a third portion of said facing surface converging to form said apex of said second tooth;
said ramped surface extends between a lower end of said apex of said first tooth and said bottom edge of said tree engaging structure; and
a second ramped surface extends between a lower end of said apex of said second tooth and said bottom edge of said tree engaging structure.

13. The tree mountable structure of claim 12, wherein said first portion of said facing surface includes a concave surface extending between said apex of said first tooth and said apex of said second tooth.

14. The tree mountable structure of claim 1, wherein said first tree engaging structure includes a plurality of teeth, each of said teeth comprising:
an apex extending upwardly from a bottom point to a top point;
a first side face converging toward said apex, said first side face and said ramped surface sharing a first common edge, said first side face being bounded at least in-part by said top edge, said bottom edge, and said first common edge; and
a second side face converging toward said apex, said second side face and said ramped surface sharing a second common edge, said second side face being bounded at least in-part by said top edge, said bottom edge, and said second common edge; and wherein
said ramped surface faces in a downward direction when said climbing stick is mounted to said tree; and
said first common edge and said second common edge converge upwardly toward said bottom point of said apex.

15. The tree mountable structure of claim 14, wherein said first side face shares a third edge with a first portion of said top edge of said facing surface;
said second side face shares a fourth edge with a second portion of said top edge of said facing surface; and
said third edge and said fourth edge converge toward said top point of said apex.

16. The tree mountable structure of claim 14, wherein:
said first side face includes a concave surface; and
said second side face includes a concave surface.

17. A treestand comprising:
a frame;
a standing platform coupled to said frame and being configured to support a user standing thereon;
a first tree engaging structure coupled to said frame, said first tree engaging structure including a facing surface, said facing surface having a top edge, a bottom edge, and a ramped surface extending between said top edge and said bottom edge;
a second tree engaging structure formed integrally with said platform, said second tree engaging structure including a facing surface, said facing surface having a top edge, a bottom edge, and a ramped surface extending between said top edge and said bottom edge; and a fastener configured to attach to said frame and to draw said facing surfaces of said first tree engaging structure and said second tree engaging structure against a tree; and wherein said top edges of said facing surfaces of said first and second tree engaging structures are disposed closer to a center of said tree than said bottom edges of said facing surfaces of said first and second tree engaging structures when said fastener draws said facing surface against said tree; and said ramped surfaces of said first and second tree engaging structures facilitate the sliding of said first and second tree engaging structures down said tree.

18. A climbing stick comprising:
a frame;
a step coupled to said frame and being configured to support a user standing thereon;
a first tree engaging structure fixed at a first end said frame, said first tree engaging structure including a facing surface, said facing surface having a top edge, a bottom edge, and a ramped surface extending between said top edge and said bottom edge; and
a second tree engaging structure fixed at a second end said frame, said second tree engaging structure including a facing surface, said facing surface having a top edge, a bottom edge, and a ramped surface extending between said top edge and said bottom edge; and
a fastener configured to attach to said frame and to draw said facing surfaces of said first and second tree engaging structures against a tree; and wherein
said top edges of said facing surfaces of said first and second tree engaging structures are disposed closer to a center of said tree than said bottom edges of said facing surfaces of said first and second tree engaging structures when said fastener draws said facing surface against said tree; and
said ramped surfaces of said facing surfaces of said first and second tree engaging structures facilitate the sliding of said first tree engaging structure down said tree.

* * * * *